US009245241B2

(12) United States Patent
Kite et al.

(10) Patent No.: US 9,245,241 B2
(45) Date of Patent: Jan. 26, 2016

(54) METHODS, SYSTEMS AND COMPUTER PROGRAM PRODUCTS FOR PLANNING RESOURCES BASED ON PRIMARY AND ALTERNATE LOCATION RELIEF STRATEGIES

(75) Inventors: Joshua Kite, Atlanta, GA (US); Lynn B. Horton, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2837 days.

(21) Appl. No.: 10/885,191

(22) Filed: Jul. 6, 2004

(65) Prior Publication Data

US 2005/0149372 A1 Jul. 7, 2005

Related U.S. Application Data

(60) Provisional application No. 60/518,606, filed on Nov. 7, 2003.

(51) Int. Cl.
*G06Q 10/00* (2012.01)
*G06Q 10/06* (2012.01)

(52) U.S. Cl.
CPC .......... *G06Q 10/06* (2013.01); *G06Q 10/06312* (2013.01); *G06Q 10/06315* (2013.01)

(58) Field of Classification Search
USPC ................................................ 705/7.11, 7.12
See application file for complete search history.

(56) References Cited

U.S. PATENT DOCUMENTS

| 6,049,774 | A  | * | 4/2000  | Roy .................................. 705/8 |
| 6,681,231 | B1 | * | 1/2004  | Burnett ...................... 707/104.1 |
| 6,779,030 | B1 | * | 8/2004  | Dugan et al. .................. 709/223 |
| 6,990,458 | B2 | * | 1/2006  | Harrison et al. .................. 705/8 |
| 7,181,302 | B2 | * | 2/2007  | Bayne ............................. 700/96 |
| 7,409,356 | B1 | * | 8/2008  | Geddes et al. ............... 705/7.25 |
| 8,311,865 | B2 | * | 11/2012 | Vogel et al. .................. 705/7.12 |
| 2002/0156917 | A1 | * | 10/2002 | Nye ............................. 709/238 |
| 2002/0194045 | A1 | * | 12/2002 | Shay et al. ....................... 705/8 |
| 2002/0198898 | A1 | * | 12/2002 | Werner ......................... 707/200 |
| 2004/0008125 | A1 | * | 1/2004  | Aratow et al. ........... 340/870.07 |
| 2004/0174835 | A1 | * | 9/2004  | Godwin et al. ............... 370/316 |

OTHER PUBLICATIONS

Bailey, "Problems with Using Overlay Mapping for Planning and Their Implications for Geographic Information Systems", Environmental Management, vol. 12, No. 1, pp. 11-17, 1988.*

* cited by examiner

*Primary Examiner* — Thomas L Mansfield, Jr.
(74) *Attorney, Agent, or Firm* — Myers Bigel Sibley & Sajovec, PA

(57) ABSTRACT

In a computer-based method of planning resources, a plurality of Location Relief Strategy (LRS) plan data sets are imported into a resource planning application. The LRS plan data sets are associated with a resource need. One of the LRS plan data sets is defined as a primary LRS plan and at least one other one of the LRS plan data sets is defined as an alternate LRS plan. A resource plan is generated within the resource planning application based on the primary LRS plan and the alternate LRS plan. The primary LRS plan and the alternate LRS plan may each correspond to a plan for at least one of installing and retiring resources in a geographic area. The resources may, for example, be resources for carrying telecommunications in a geographic area.

19 Claims, 18 Drawing Sheets

Location Relief Strategy

*State Transition Diagram -
Primary LRS*

Location Relief Strategy

*State Transition Diagram -
Alternate LRS*

METHODS, SYSTEMS AND COMPUTER PROGRAM PRODUCTS FOR PLANNING RESOURCES BASED ON PRIMARY AND ALTERNATE LOCATION RELIEF STRATEGIES

RELATED APPLICATION

This application claims the benefit of and priority to U.S. Provisional Patent Application No. 60/518,606, filed Nov. 7, 2003, the disclosure of which is hereby incorporated herein by reference as if set forth in its entirety.

FIELD OF THE INVENTION

The present invention relates to computer systems and more particularly to methods, systems, and computer program products for computer based resource planning.

BACKGROUND OF THE INVENTION

Planning resources, such as telephone network resources, generally involves determining what resource needs are expected over time, and examining the resources that are presently available and/or that need to be installed to satisfy the expected needs. Such planning once exclusively involved rendering resources that may be installed (i.e., planned resources) as mark-ups on transparent sheets, which were overlaid on paper geographic resource maps that included illustrations of existing resources. The transparent sheets and paper geographic maps then formed a location relief strategy for how existing and planned resources could be used to satisfy a resource need. Digital representations of geographic maps have increasingly become available through, for example, Geographic Information System (GIS) tools. Some GIS tools allow users to define and associate resources with geographic features of the digitized maps.

SUMMARY OF THE INVENTION

Some embodiments of the present invention provide computer-based methods of planning resources based on a resource need. A plurality of Location Relief Strategy (LRS) plan data sets are imported into a resource planning application. The LRS plan data sets are associated with a resource need. One of the LRS plan data sets is defined as a primary LRS plan and at least one other one of the LRS plan data sets is defined as an alternate LRS plan. A resource plan is generated within the resource planning application based on the primary LRS plan and/or the alternate LRS plan.

In some further embodiments of the present invention, the LRS plan data sets can be prioritized. The highest priority LRS plan data set can be selected as the primary LRS plan, and at least one other of the LRS plan data sets can be designated as the alternate LRS plan(s). The primary LRS plan may be changed to be an alternate LRS plan, and the alternate LRS plan may be changed to be a primary LRS plan. The primary LRS plan and/or the alternate LRS plan may be selectively displayed based on selections from a user. A plurality of LRS plan data sets may be associated with a plurality of resource needs, with one of the LRS plan data sets for each of the plurality of resource needs being defined as a primary LRS plan. A resource plan for each of the resource needs may be generated, and may be displayed to a user.

In some other embodiments of the present invention, the primary LRS plan and the alternate LRS plan may each correspond to a plan for installing and/or retiring resources in a geographic area. The resources may include resources for carrying telecommunications in a geographic area. A LRS plan may include, for example, a plan for installing a number of fiber optic communication lines and/or electrical communication lines at a geographic location.

Accordingly, more than one LRS plan may be associated with a resource need. When more than one LRS plan is associated with a resource need, one of the plans may be defined as a primary LRS plan and the other plan(s) may be defined as alternate LRS plan(s). The primary LRS plan may correspond to what a Long Term Planner perceives as a preferred way of satisfying the associated resource need, while the alternate LRS plans may correspond to what are perceived as less preferred ways. Such association of a preferred LRS plan and alternate LRS plans with a resource need may allow a Long Term Planner to define many different resource plans for meeting a resource need, and to designate a preferred resource plan while maintaining the other LRS plans for further use (e.g., documentation and/or analysis).

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
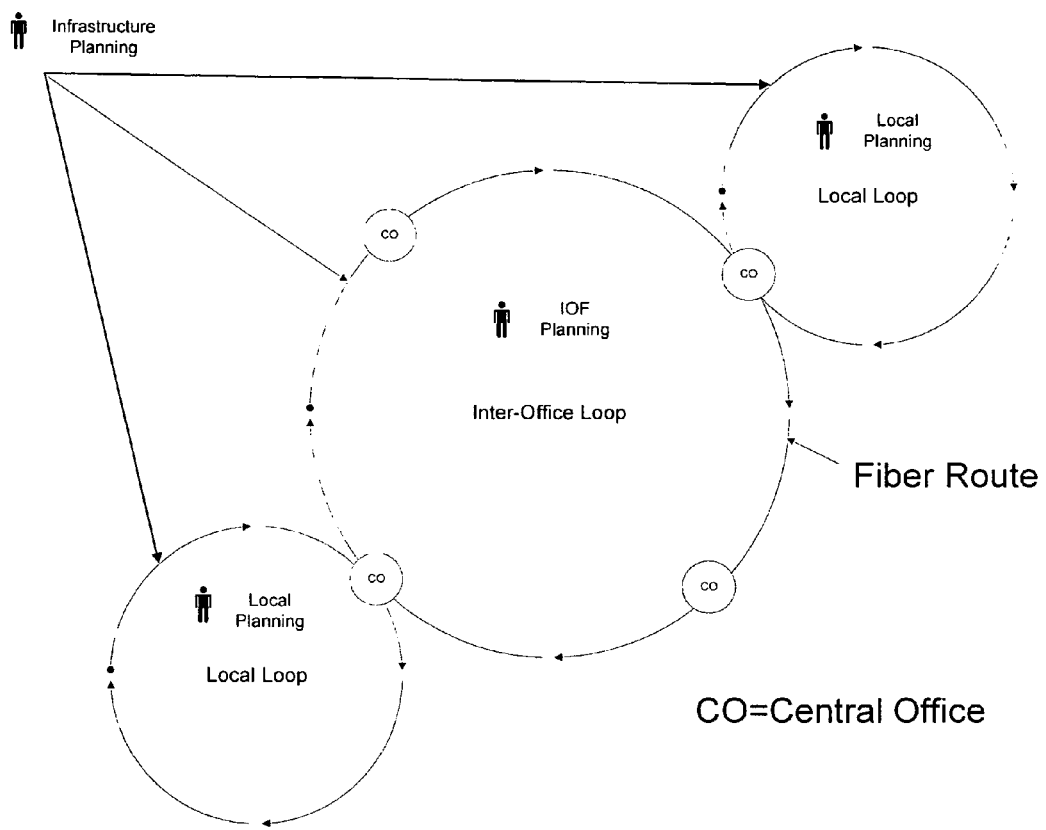
FIG. 1 is a high-level view of the responsibilities of the exemplary user groups that may use a Fiber Management Tool (FMT) according to embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The detailed description of embodiments of the present invention is organized as follows:
1 Overview
2 Introduction
3 Description of Users and Information Needs
3.1 Local Planners (Facility Planners)
3.2 Long-Term Planners
3.3 Infrastructure Inter-Office (IOF) Planners
3.4 Construction
4 Baseline Systems and Data
5 Diagrams
5.1 High Level Relationship
5.2 Comparison of Systems
6 Client Application Layer
6.1 Login/Password
6.2 Graphical and Tabular Fiber Capabilities
6.2.1 Search/Find, View Graphical Elements
6.2.1.1 Provide Views and Functions in a Seamless Environment
6.2.1.2 Provide Default Views
6.2.1.3 Specify Scaling Capability
6.2.1.4 Specify Search Criteria
6.2.1.5 Provide Additional Search Functions
6.2.1.6 Format Query Results
6.2.1.7 Display Multiple Query Results
6.2.1.8 Define Default Views
6.2.1.8.1 Default View by User Type
6.2.1.8.2 Nine State Region
6.2.1.8.3 Multi State
6.2.1.8.4 Single State
6.2.1.8.5 District
6.2.1.8.6 Wire Center
6.2.8.1.7 Street Level
6.2.2 Select and Query Visible Graphical and Network Facility Items
6.2.2.1 List Attributes of a Fiber Sheath
6.2.2.2 List Attributes of a Fiber Splice
6.2.2.3 List Attributes of a Fiber Strand
6.2.2.4 List Attributes of an Equipment Location
6.2.2.5 Display Data Attributes of a Conduit
6.2.2.6 Display Data Attributes of Landbase Features
6.2.3 Provide Fiber Calculation Tools
6.2.3.1 Determine Number of Splices in a Strand
6.2.3.2 Provide Distance Between Points on a Fiber Strand
6.2.3.3 Provide Distance Between Geographic Points
6.2.3.4 Calculate and Display Anticipated dB Loss of Fiber Strand Path
6.2.3.5 Input Loss and Locate Fiber Cut
6.2.3.6 Generate Restoration Order Based On System/User
6.2.4 Generate Fiber Schematics
6.2.4.1 Use Automatic Schematics Tool
6.2.4.2 Use Manual Schematics Tool
6.2.5 Integrate Fiber Related Data
6.2.5.1 Add Fiber Strand and Derived Wavelength Data
6.2.5.2 Provide Connectivity Between Fiber Strand and Equipment Slot
6.2.5.3 Provide SCID Relationships to Fiber Strand and Equipment Slot
6.2.5.4 Provide LEAD and TIRKS Circuit IDs
6.2.5.5 Capture Fiber Diversity Information
6.2.5.6 Capture Fiber Connections from FOX
6.2.5.7 Capture a LOC/CLLI and Address from LOC/CLLI System
6.2.5.8 Capture Easement/ROW Information for Locations from BETS
6.2.5.9 Generate Land Base For Non-OPEDS Converted Wire Centers
6.2.5.10 Develop Mechanized Processes From Legacy System Sources
6.2.5.11 Manage Out of Franchise Fiber and Equipment
6.2.5.12 Display and Identify CLEC Sheaths and Equipment
6.2.5.13 Allow Entry of Fiber Loss Data
6.2.5.13.1 Allow Manual Entry of Fiber Loss Data
6.2.5.13.2 Allow Automatic Entry of Fiber Loss Data
6.2.5.14 Display Measured Loss
6.2.6 Provide Fibers and Related Equipment Search and Display
6.2.6.1 Display Cabinets for Specified Equipment Location
6.2.6.2 Display Devices for Selected Structure—Filter by Type
6.2.6.3 Display Selected Device Attributes
6.2.6.4 Display Device Slots and Related Circuits
6.2.6.5 Locate Equipment by Address
6.2.7 Provide Fibers and Equipment Utilization Monitoring
6.2.7.1 Provide CSA Utilization by Service Type
6.2.7.2 Provide CSA Alerts to FACILITY PLANNERS
6.2.7.3 Determine Fiber Strand Utilization
6.2.7.3.1 Determine Whether Physical Strand is Assigned
6.2.7.3.2 Determine Physical and Derived Fiber Strand Utilization
6.2.7.3.3 Determine Carrier Signal Level Utilization for a Strand
6.2.7.3.4 Determine DS0 Equivalent Utilization for Virtual and Physical Fiber Strands
6.2.7.4 Determine Fiber Sheath Utilization
6.2.7.5 Determine Utilization Trend Analysis
6.2.7.6 Determine Fiber Cross-Section Alerts
6.2.7.7 Determine MUX Utilization
6.2.7.8 Monitoring Point
6.2.7.9 Xbox and CSA History and Trending
6.2.8 Provide Fiber Tools and Reports
6.2.8.1 Generate Equipment Site Activity Log
6.2.8.2 Allow User to Determine Fiber Strand Diversity
6.2.8.3 Assign Restoration Priority for a System Assembly
6.2.8.4 Assign Reservation for a Fiber Strand
6.2.8.5 Provide Numbering Administration Tools
6.2.8.5.1 Add System Numbering Tool
6.2.8.5.2 Add SCID Administration Tool 6.2.8.6 Enhance Existing Database, Posting & Viewing Tools
6.2.8.7 Develop Tools to Populate the Facility Data Enhancements
6.2.8.8 Develop Tools to Add Existing Fiber and CSA Locations
6.2.8.9 Allow User To Perform Fiber Traces
6.3 Planning Layer Functionality
6.3.1 LRS Overview
6.3.1.1 LRS States
6.3.1.2 Primary LRS State Transitions
6.3.1.3 Alternate LRS
6.3.1.4 Alternate LRS State Transitions
6.3.2 Provide Location Relief Strategy Administration Tool
6.3.2.1 Create a LRS and Associated Administrative Data
6.3.2.2 Create Alternative LRS and Associate for a Route
6.3.2.3 Modify LRS Administrative Data
6.3.2.4 Save and Retrieve LRS and Administrative Data
6.3.2.5 Logically Delete LRS and Associated Data
6.3.2.6 Purge LRS and Associated Data
6.3.2.7 Create, Modify, and Delete LRS Notes by User
6.3.2.8 Provide LRS Reports by User Selection Filters
6.3.2.9 Close a LRS Manually
6.3.2.10 Alert Overage Service Dates on LRS
6.3.2.11 Dependent LRS Clone
6.3.3 Provide Graphical and Tabular Planning Tools
6.3.3.1 Generate LRS Schematics From Existing Fiber Data
6.3.3.2 Provide Drawing Tools, Symbols, and Attribute Creation Functions
6.3.3.3 Document Future Location Relief Strategy, and/or DLE Locations
6.3.3.4 Retrieve and Display LRS
6.3.3.5 Display Multiple LRS Graphically
6.3.3.6 Copy Existing LRS to New LRS
6.3.3.7 Modify LRS
6.3.3.8 Publish LRS
6.3.3.9 View LRS and DLE Plans
6.3.3.10 View Multiple LRS for Same Geographic Area
6.3.3.11 Capture LRS Notes Associated with a Graphical Feature by User
6.3.3.12 Manage Graphical Feature LRS Notes by User
6.3.3.13 Link to Tabular LRS Data at Location Features
6.3.3.14 Measure Strand Distances
6.3.3.15 Provide View Printing
6.3.3.16 Create an Equipment Plan Associated to a LRS and Location
6.3.3.17 Create Fiber Strand Plans Associated to LRS and Sheath
6.3.3.18 Provide Summary Reports
6.3.3.19 Create Ad Hoc Monitoring Queries and Reports
6.3.3.20 LRS Handoff Package
6.3.3.21 Monitor Facility and Fills
6.3.3.22 Provide Inventory Tasks on Equipment/Site Details
6.3.3.23 Maintain Editing History
6.3.3.24 Create "Publish" Pop-Up Window
6.4 Exit, Session, Recovery, and Cleanup
6.5 Performance
6 External System
7.1 External Systems Communications
7.1.1 LECIII
7.1.1.1 LEC III Data Embodiments
7.1.2 LOC/CLLI
7.1.3 LFACS
7.1.4 FOX/DSX/TEOPS
7.1.4.1 FOX/DSX Data Embodiments
7.1.5 TIRKS
7.1.6 LEIM
7.1.7 BCM
7.1.8 PM TOOL
7.1.8.1 PM Tool Data Embodiments
7.1.9 TEOPS
7 Data Embodiments
8.1 LRS & Hand-Off Package
8.2 LRS Search
8.3 Facility Route Search
8.4 Equipment Attributes
8.5 MUX
8.6 DSX
8.7 LGX
8.8 ONU
8.9 NMLI
8.10 DLC
8.11 Fiber Splice
8.12 Switch
8.13 Repeater Shelf
8.14 Fiber Strand
8.15 Fiber Sheath
8.16 Equipment Location
8.17 Conduit
9 Use Case Modeling
9.1 Use Case Descriptions
9.1.1 Use Case: Login and Password
9.1.1.1 Description
9.1.1.2 Actors
9.1.1.3 Normal Sequence
9.1.1.4 Alternative Sequence
9.2.2 Use Case: Search/Find, View Graphical Elements
9.2.2.1 Description
9.2.2.2 Actors
9.2.2.3 Normal Sequence
9.2.2.4 Alternate Sequences
9.2.3 Use Case: Query Network Facility Items
9.2.3.1 Description
9.2.3.2 Actors
9.2.3.3 Normal Sequence
9.2.3.4 Alternative Sequence
9.2.4 Use Case: Provide Calculation Tools
9.2.4.1 Description
9.2.4.2 Actors
9.2.4.3 Normal Sequence
9.2.4.4 Alternative Sequence
9.2.5 Use Case: Integrate Fiber Related Data
9.2.5.1 Description
9.2.5.2 Actors
9.2.5.3 Normal Sequence
9.2.5.4 Alternative Sequence
9.2.6 Use Case: Provide Fiber Tools and Reports
9.2.6.1 Description
9.2.6.2 Actors
9.2.6.3 Normal Sequence
9.2.6.4 Alternative Sequence
9.2.7 Use Case: Create, Read, Update, Delete LRS
9.2.7.1 Description
9.2.7.2 Actors
9.2.7.3 Normal Sequence
9.2.7.4 Alternate Sequences
9.2.8 Use Case: View Cross Box Data for Planning
9.2.8.1 Description
9.2.8.2 Actors
9.2.8.3 Normal Sequence
9.2.8.4 Alternative Sequence 10 Technical
10.1 General
10.2 Computing Architecture
10.3 Computer Asset Protection Guidelines
10.4 SDLC
10.5 Other Standards And Guides
10.5.1 GUI Style Guide
10.5.2 Capability Maturity Model
10.5.3 Metrics
10.5.4 Configuration Management
10.6 Technical Design
10.6.1 Design
10.6.2 Open Systems
10.6.3 Open APIs
10.6.4 Interfaces
10.6.5 PC Client Data Access
10.6.6 Portability
10.6.7 Software Development Tools
10.6.8 Naming Conventions
10.6.9 Information Modeling
10.6.10 Data
10.6.11 Data Movement
10.6.12 User Interface Design
10.6.13 On-line Help
10.6.14 Security Embodiments
10.6.15 User Identification
10.6.16 Security Audit
10.6.17 Operations
10.6.18 Backup and Recovery
10.6.19 Application Management
10.6.20 Error Resolution
10.6.20.1 Client Application/User Errors
10.6.20.2 Technical Errors
10.6.21 Timing Embodiments
10.6.22 Load Projections
10.6.23 Software Delivery
10.6.24 Work Center Application Integration Group
10.7 Current OPEDS Architecture
10.7.1 Overview
10.7.1.1 External System Data
10.7.1.2 OPEDS
10.7.2 Workstation Specifications
10.7.3 Server/Database Specifications
10.7.4 System Diagram
10.8 Computing Architecture
10.8.1 OPEDS Data Repositories
10.8.1.1 Landbase
10.8.1.2 Facilities
10.8.2 Network Information Services
10.8.3 Domain Name System (DNS)
10.8.4 OPEDS Process/Data Management Layer
10.8.5 Wide Area Network
10.8.6 External System Data
10.9 OPEDS Topology
10.9.1 Data Center
10.9.2 Typical District/RLAC
11 Reference Items
11.1 Glossary of Terms for the FMT and Systems
12 Further Details With Respect to Methods, Systems and Computer Program Products for Planning Resources Based on Primary and Alternate Location Relief Strategies 1 Overview As will be appreciated by one of skill in the art, the present invention may be embodied as a method, data processing system, or computer program product. Accordingly, the present invention may take the form of entirely software embodiments or embodiments combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be implemented using programmable aspects of existing application programs such as, for example, application programs that may interface to, or be at least partially integrated with, Geographical Information System (GIS) tools and/or databases that can store geographic and resource information. Aspects of the computer program code may also be written in an object oriented programming language such as Java®, Smalltalk or C++ and/or using a conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Various embodiments of the present invention provide computer-based resource planning using a resource planning application. For purposes of illustration only, some of these embodiments are described herein in the context of planning communication resources, such as fiber optic communication lines and/or electrical communication lines. In particular, some embodiments of the present invention are described with regard to a Fiber Management Tool (FMT). It will be understood, however, that the present invention is not limited to planning of communication resources. Indeed, other resources, such as, but not limited to, gas lines, water lines, electrical lines, and/or television lines may be planned by other embodiments of the present invention. In general, the present invention is intended to encompass any technology and/or configuration capable of carrying out the operations described herein.

2 Introduction

Resource planning systems, methods and computer program products according to some embodiments of the invention, referred to herein, may be embodied in a Fiber Management Tool (FMT). The FMT can be a computer-based application that may provide an integrated view and monitoring of utilization of an existing fiber optic network and associated digital loop electronics, and may make this information more readily accessible to Network FACILITY PLANNERSs, Designers, Long Term Planners, and Construction Repair technicians, which may shorten information research time. The FMT may use land, facility, and equipment data stores. The FMT may run as an application on one or more servers, such as HP Unix servers that include Oracle for managing database attributes, and may include a DGN format for graphical files. The FMT application may display a graphical as well as a tabular view of data. The graphical layer may graphically display fiber network elements (ex. Fiber routes, remote terminals, central offices, equipment), supporting structures (ex. Conduit, manholes, poles) at defined geographical levels (ex. Wire center, state, district), and/or associated landbase features (ex. Streets, parcels, lakes, rivers).

The FMT may include the functionality of, or integrate with, existing Mechanized Facility Management databases, posting tools, and viewing tools to support additional fiber functionality: Inter-wire center connector, fiber splice feature, graphical location of fiber in Underground records, and CSA/Equipment Location feature. It may provide a development tools to automatically populate the facility data enhancements. The FMT may include tools to add existing fiber and CSA locations, along with key structure and connectivity features/attributes to the FMT SDO Database; both automatically from mechanized wire centers, and manually for non-mechanized wire centers. In addition to the IOF and feeder fiber network, FMT can also include distribution fiber.

The FMT may include a central repository for documenting Location Relief Strategies (LRS) plans created by FACILITY PLANNERSs and Long Term Planners. The FMT may include a planned data layer that allows definition of FACILITY PLANNERS, and tool for creating and maintaining future LRSs including fiber network, fiber strands, and associated DLE information. The FMT may include create a planning schematic from the existing network data, and may allow an automated "hand-off" of a selected LRS to a PM Tool system for the design process. Searches may be performed for primary and/or alternate LRSs.

The FMT may generate a land base for non-OPEDS converted wire centers with the location of central offices, equipment sites and x-boxes from the existing OPEDS land base data. It may provide mechanized processes and rules to load data and manage data conflicts from separate legacy system sources and user input from local records, and determine appropriate source to use to provide existing fiber and equipment attributes.

Potential users of the system and their basic needs are now described below, followed by a detailed discussion of various embodiments of the invention. The subsequent sections discuss the various embodiments in further detail and provide information about data, relationships, applicable business rules, and standards.

3 Description of Users and Information Needs

Purpose: The following section describes the various user groups that FMT can serve. Each section gives a brief overview of each user group's responsibility and their information needs.

Discussion: FMT's target users comprise of four groups. These groups are:

Local Planners (FACILITY PLANNERSs)
Infrastructure Loop Planners
Infrastructure Inter-Office (IOF) Planners
Construction FIG. 1 provides a high-level view of the major user group's responsibilities.

3.1 Local Planners (Facility Planners)

FACILITY PLANNERS often answer requests for information from Marketing, Long Term Planners, and Inter-Office Planners. Local Planners have access to several sources of data. These include OPEDS Facility Database (MapViewer), LEIM, TIRKS, LFACS, and personal records, which makes them a de facto data repository for almost all of a telecommunication company's fiber optic assets. FMT can aggregate the information supplied by these external systems, providing Local Planners with a synchronized, consistent view of the data.

3.2 Long Term Planners

This group is responsible for high-level business planning, and analyzing metro-area and surrounding infrastructure. This group maintains information in personal records, stored primarily in spreadsheets (Microsoft Excel) and local databases (Microsoft Access). Long Term Planners provide Marketing with information. They also share information with Local Planning and Inter-Office Planners. Often, Long Term Planners require additional information, and personnel must contact Local Planning or Inter-Office Planners. FMT can provide Long Term Planners with timely information and eliminate the need for them to contact the other groups directly.

3.3 Infrastructure Inter-Office (IOF) Planners

Inter-Office Planners are responsible for designing the architecture for closed system, fiber-optic networks for businesses. A significant amount of their work revolves around the provisioning of advanced telephony services. Inter-Office Planners often rely on Long Term Planners and Local Planners to fulfill their information needs. Inter-Office Planners desire fiber route records, but have may only high-level schematics and assignment data. They often coordinate with Local Planners to make ring-routing decisions. FMT can provide Inter-Office Planners with fiber routing information and detailed schematics and streamline their interaction with other planning groups.

3.4 Construction

The Construction group has little direct involvement with managing fiber optic assets and is not involved in the information flow among the other groups. However, Construction is responsible for repair and splicing work. The Splicing Technicians in Construction deal with major problems (a cut cable) and minor problems (a missing jumper in a Light Cross Connect (LGX). Splicing Technicians currently have the ability to determine fault distances using an Optical Time Domain Reflectometer (OTDR). FMT can help them complete the "picture" of the problem by correlating this OTDR distance data with a geographic location. With geographic data available, Splicing Technicians can resolve problems more quickly.

4 Baseline Systems and Data

For the purpose of developing/implementing Fiber Management Tool, the following systems and data sets are assumed to exist:

Landbase

A landbase is a representation of streets, rights of ways, and various boundaries. This data may be stored in an Oracle database utilizing GIS software such as that provided by ESRI.

Facility

A mechanized facility database is a representation of the various facilities which comprise the telephone network. Facilities represented include, but are not limited to, poles, manholes, copper cables, terminals, and fiber cables. This graphical representation may be stored in a GIS database or in graphics files such as .dgn files.

Land & Facility Data Exchange

A Land and Facility Exchange is a means of synchronizing the two data stores to ensure that the facilities represented are shown in proper relation to the streets and rights of ways.

Equipment Database

The Equipment Database reconciles records of telephone equipment and assignment records from various databases. The reconciled records may be from systems such as LEIM, LFACS, and TIRKS.

5 Diagrams 5.1 High Level Relationship

Figure 2:
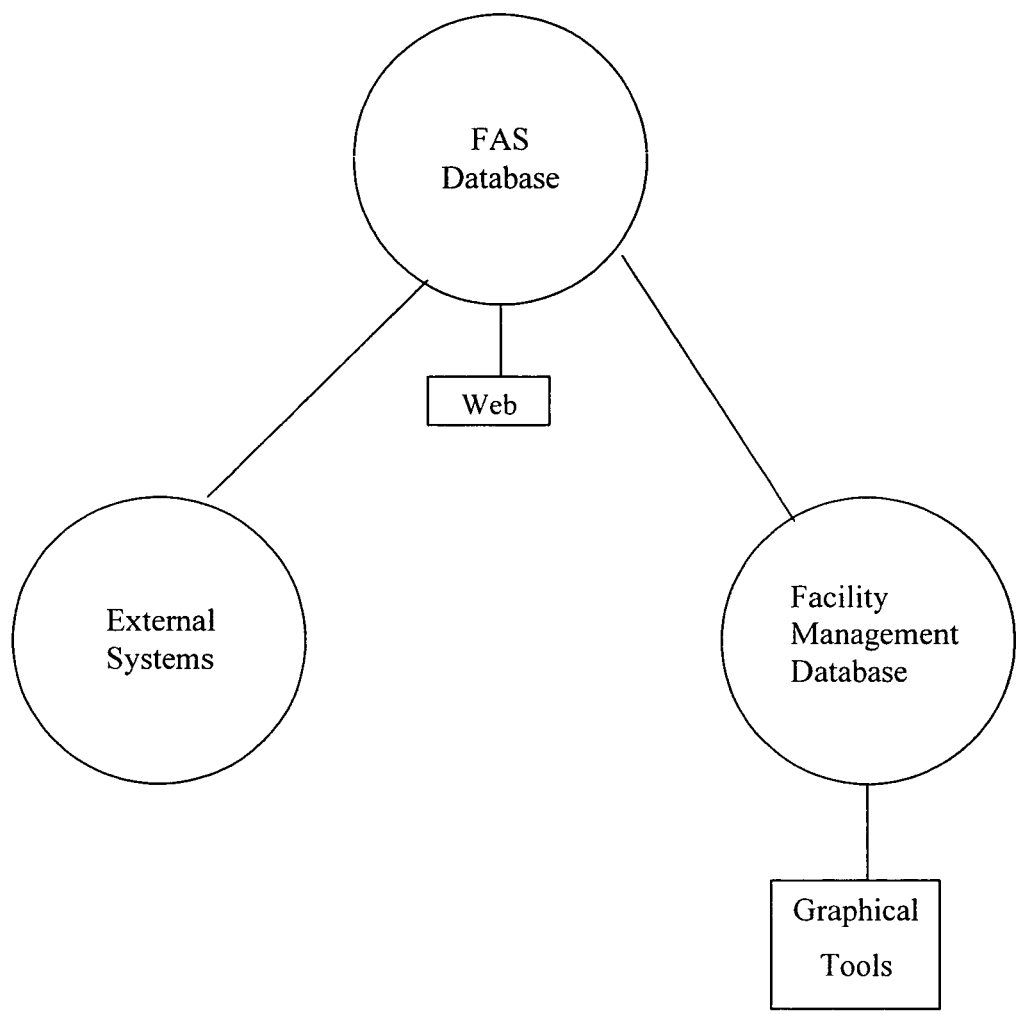
FIG. 2 depicts a block diagram of the FMT.

In the development and design of Fiber Management System, a goal is to add new fiber information to existing by extracting data from various External Systems and Facility Management to display information in FAS via a Web interface. FIG. 2 represents the high level relationships for FMT.

5.2 Comparison of Systems

Figure 3:
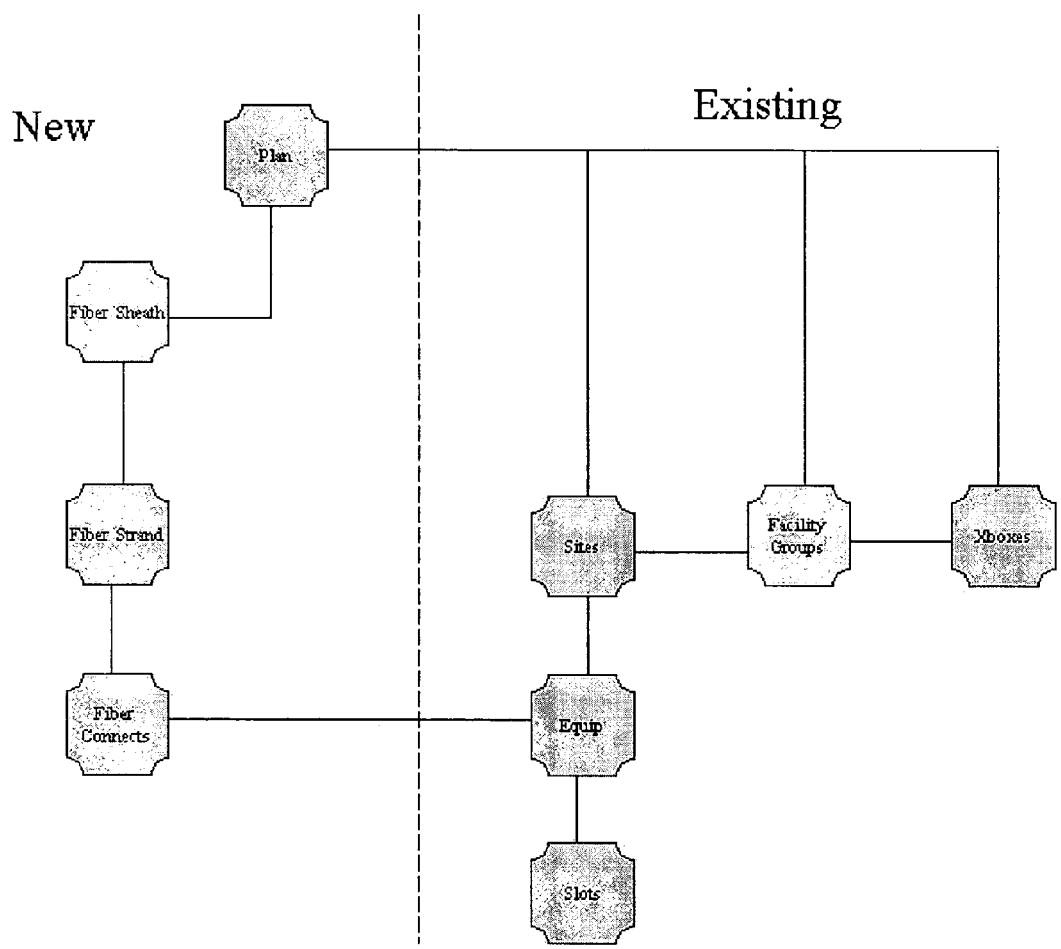
FIG. 3 depicts a comparison between the "new" and "existing" objects in a FAS database.

Currently in FAS through the FAS umbrella, the "existing" as shown in FIG. 3, refers to the objects maintained in the FAS database. Within the existing objects, new data may be added. The objects depicted in FIG. 3 as "new" refer to the new objects to be incorporated i.e. (Fiber Sheath, Fiber Connect Fiber Strand and Plan) in the FAS database. A Location Relief Strategy (LRS) is a mechanism that is used to record future network relief strategies, providing the user with the ability to document network modifications, document the justification, and communicate this information electronically to downstream users, i.e. design engineering vendors and external systems. The LRS may be developed for immediate or future relief. Within the existing information base, the user can monitor cross-box fills, equipment, site, slot, wire center and their capacities. With the new proposed FAS functionality the user can be able to drill down to the fiber strand information and link to the existing information base and view graphically via the Fiber Management Tool.

6 Client Application Layer

Purpose: This section provides detailed information on FMT's application-layer embodiments, including functionality and expected behavior. The groupings are summarized in Table 1.

TABLE 1

Embodiment Groupings and Descriptions

| Embodiment Groupings | Description |
| --- | --- |
| Login/Password | Describes a high-level architecture for login and password functions and user accessibility options. |
| Graphical and Tabular Fiber Capabilities | These embodiments describe the method for querying on specific criteria. They also indicate the functionality and types of data that FMT can provide to a user in a graphical or text format. Reporting are also included. |
| Planning Layer Functionality (LRS) | These embodiments indicate the functionality and types of data that FMT can provide for a user to plan future fiber network construction. |
| Utilize Data Supplied by External Systems | A brief summary of the functionality expected from FMT when reading data received from external systems. |
| Exit, Sessions, Recovery, and Cleanup | Summaries of the client interaction with the system as these functionalities are performed. |
| Performance Embodiments | These embodiments describe standard performance measures met by the system. |

6.1 Login/Password

Users may be granted access to FMT via a unique combination of user identification (CUID, Common User ID) and password. FMT can maintain user permissions—including access to the planning layer access permissions on default views, etc.—in a user table stored in a database on a secure server. This table can provide administrators with the flexibility to organize users and associated permissions into logical groups.

6.2 Graphical and Tabular Fiber Capabilities

These embodiments indicate functionality needed to access information in FMT and manage the information process. It also describes core functionality that FMT can provide to users.

6.2.1 Search/Find, View Graphical Elements

6.2.1.1 Provide Views and Functions in a Seamless Environment

| | |
|---|---|
| Embodiment | Provide accurate graphical views of geographical features and network facilities in a seamless environment. |
| Description | Graphical views and fiber strand connectivity shall be maintained across wire center, district, state, and other boundary types. |

6.2.1.2 Provide Default Views

| | |
|---|---|
| Embodiment | Provide support for default views containing a defined set of fiber network elements (facilities) and geographical features (landbase) based upon the type of view presented. |
| Description | The GUI interface can provide other geographical and fiber network elements that can be shown based upon a user's request (i.e. turn features on or off). |
| Data | At a minimum, FMT can provide the following default views: Nine State Region View Multi-State View State View District View Wire Center View Street View |

6.2.1.3 Specify Scaling Capability

| | |
|---|---|
| Embodiment | Ability to define the scale of display and the ability to override the default scale assigned to a default view. |
| Description | As the scale of the view changes, the level of detail for land and facility elements, as noted via symbology, can also change in a corresponding manner. Views and network symbology can map to current OPEDS, .LND, landbase, and .DGN in the facilities models previously described. When the user changes the scale, FMT can toggle between default views (e.g., if the user is at the Nine-State view and changes the scale by zooming in, FMT can, at a defined scale point, switch to the Multi-State view). |
| Data | FMT can provide the user with the ability to specify the view and scale via the following manners: Map to Ground Ratio (e.g., 1:100) Map Unit equals Ground Distance (e.g., 1 inch to 1 mile, or 1 kilometer) Magnification Factor (e.g., zoom-in or zoom-out from a centered point on the screen) Select default views by indicating appropriate attributes (e.g., user selects Wire Center view and specifies a Wire Center or user can select multi-wire center view; user selects Street view by indicating Wire Center and street intersection) Defining the Area of Interest by drawing a polygon (e.g., user draws a polygon at a Wire Center view, or multi-wire center view, and FMT shows a street level view the specified area) |

6.2.1.4 Specify Search Criteria

| | |
|---|---|
| Embodiment | Provide the user with the ability to select specific parameters for querying data. |
| Description | The parameters can provide the user with the ability to define the scope of the query from a broad search (e.g., all equipment at a Central Office (CO)) to a more precise search (e.g., a specific item of equipment at a CO). |

6.2.1.5 Provide Additional Search Functions

| | |
|---|---|
| Embodiment | Provide the user with the ability to further refine a query by utilizing Boolean searches. |
| Description | Users can base the searches on an item or group of items against a value or range of values (e.g., all sheaths greater than 10000 feet). This functionality is available for all data entities and attributes. In addition, the system can provide the user with the ability to query on wildcards (e.g., "*", "%"), in each data entry field to broaden or narrow the results of the search. For example, a user may want to find all roads that start with "Peach", entering "Peach%" in the query field. |

6.2.1.6 Format Query Results

| | |
|---|---|
| Embodiment | Provide the user with the ability to further view the results of a query in both a graphical and/or tabular format. |
| Description | If a set of required data is maintained in multiple external systems and their values are different, FMT can indicate |

-continued

| | |
|---|---|
| | the source and values of each conflicting data set. |

6.2.1.7 Display Multiple Query Results

| | |
|---|---|
| Embodiment | Allow the user with the ability to display multiple query results. |
| Description | For example, a user may perform a loop trace on a fiber strand, then to perform a second one - while maintaining the original loop trace on screen - in order to compare the results. |

6.2.1.8 Define Default Views

| | |
|---|---|
| Embodiment | Show a defined set of land features and network facilities for each default view. |
| Description | Many of these items may be selectable by the user to view information and initiate a data query. |

Table 2 indicates the format of the information provided for each default view.

TABLE 2

| Objects | Indicates the network facility items that FMT can display at the default view |
|---|---|
| Behavior | Indicates the selection method (passover or click) that a user can perform to access information about the object |
| Attributes Displayed | Indicates the data attributes that FMT can display if the object is selected |
| Default View | (Y = Yes) Indicates that FMT can automatically display the object in the default view (N = No) Indicates that FMT can not automatically display the object in the default view, but is available at a user's request (e.g., user may turn object on or off) |
| Additional Information | Provides information unique to the object |

6.2.1.8.1 Default View by User Type

FMT can provide the administrative ability to associate a user with a specific role type and geographic area. Examples of role types include, but are not limited to, Facility Planners, InterOffice Planners, etc. Examples of geographical areas include, but are not limited to, State, District and Wire Center. Based on users' defaults, FMT can provide default functionality and graphical views.

6.2.1.8.2 Nine State Region

Figure 4:
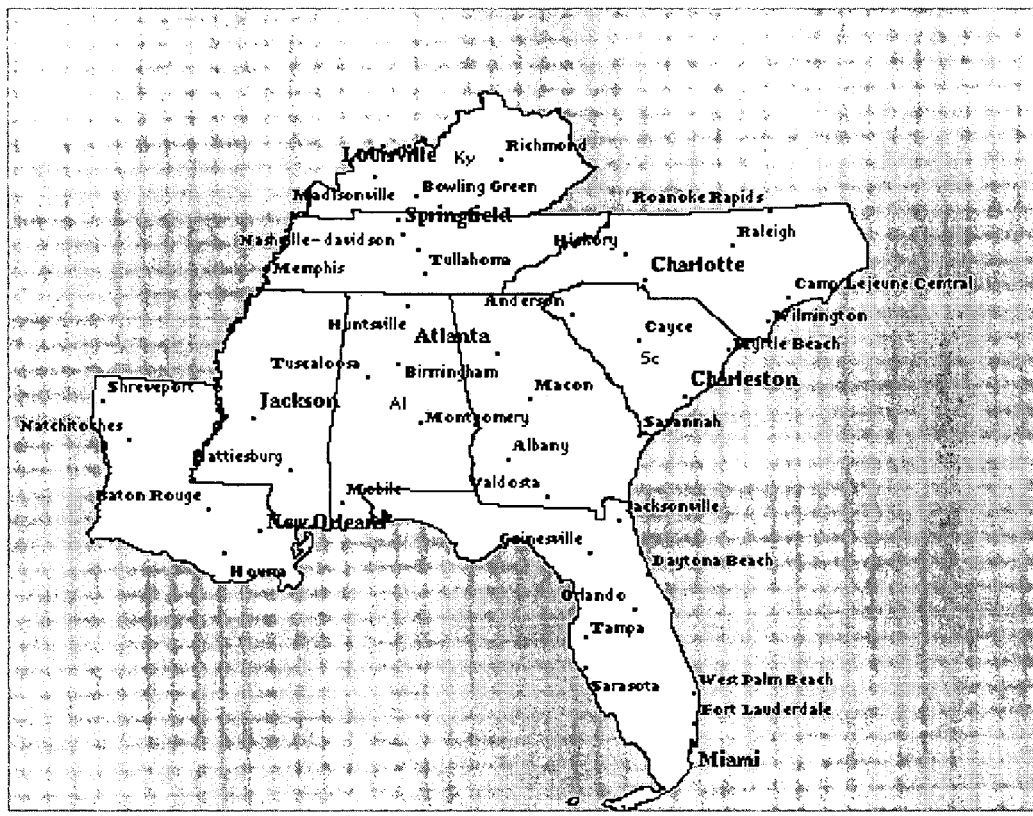
FIG. 4 is a graphical view of a nine state region level provided by an exemplary FMT.

FMT can provide a default view of a Nine-State region, which includes Alabama, Florida, Georgia, Kentucky, Louisiana, Mississippi, North Carolina, South Carolina, and Tennessee. Other regions may be provided. FIG. 4 suggests this concept.

| Objects | Behavior | Attributes Displayed | Default View | Additional Information |
|---|---|---|---|---|
| Land | | | | |
| State Boundaries | N/A | N/A | Y | |
| State Names (Abbreviation) | N/A | N/A | Y | |
| District Boundaries | Passover District Area | District Name | Y | |
| Major Cities | N/A | N/A | Y | |
| Interstate Highways, with designation # | N/A | N/A | N | |
| Other Territory | N/A | N/A | N | |
| Facilities | | | | |
| Fiber Routes (IOF only) | Click | Fiber Sheath Attributes of first sheath | N | Shown as a result of a query |
| Fiber Strands (IOF and Loop) | Passover | Fiber Strand Name | N | Shown as a result of a query |
| | Click | Fiber Strand Attributes | | |
| Central Office Locations | Passover | Central Office Name | N | |
| | Click | Central Office Attributes | | |
| Central Office Names | N/A | N/A | N | If Central Office Name is displayed, Central Office Location passover feature is disabled |

6.2.1.8.3 Multi State

Figure 5:
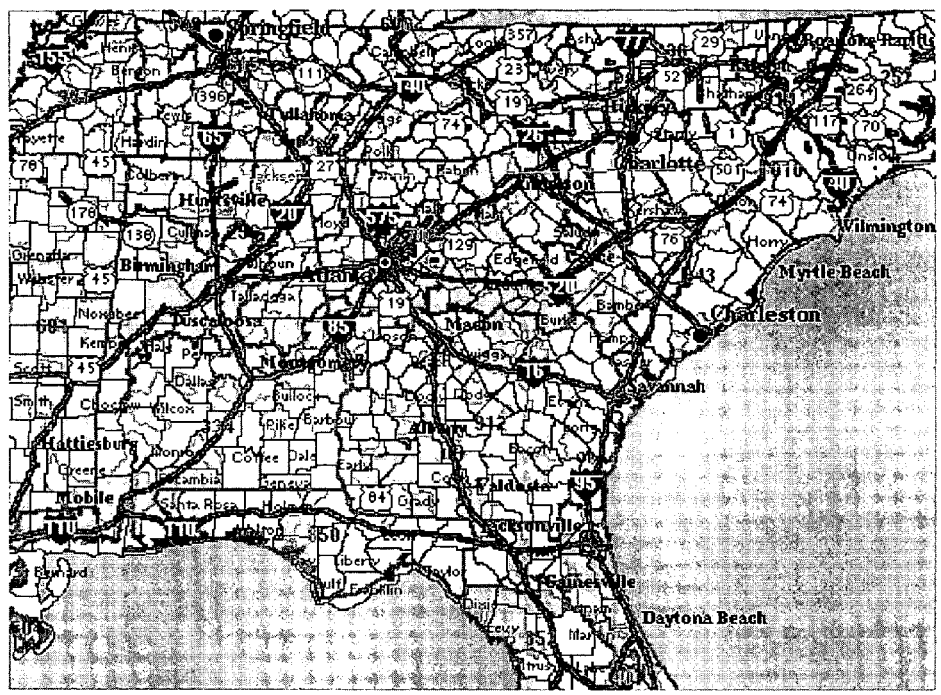
FIG. 5 is a graphical view of the multi-state region level provided by an exemplary FMT.

FMT can provide a default multi-state view comprising an originating state and all the states that border the originating state. FIG. 5 suggests this concept.

| Objects | Behavior | Attributes Displayed | Default View | Additional Information |
|---|---|---|---|---|
| Land | | | | |
| State Boundaries | N/A | N/A | Y | |
| State Names (Abbreviation) | N/A | N/A | Y | |
| District Boundaries | Passover | District Name | Y | |
| | District Area | | | |
| Interstate Highways, with designation # | N/A | N/A | Y | |
| State Highways, with designation # | N/A | N/A | Y | |
| Major Cities | N/A | N/A | Y | |
| Other territory | N/A | N/A | Y | |
| Numbered Planning Area (NPA) | Click | NPA # | N | |
| Facilities | | | | |
| Fiber Routes (IOF only) | Click | Fiber Sheath Attributes of first sheath | N | Shown as a result of a query |
| Fiber Strands (IOF and Loop) | Passover | Fiber Strand Name | N | Shown as a result of a query |
| | Click | Fiber Strand Attributes | | |
| Central Office Locations | Passover | Central Office Name | N | |
| | Click | Central Office Attributes | | |
| Central Office Names | N/A | N/A | N | If Central Office Name is displayed, Central Office Location passover feature is disabled |

6.2.1.8.4 Single State

FMT can provide a default single state view comprising a single state and partial boundaries of adjacent states. FIG. 5 illustrates the concept.

| Objects | Behavior | Attributes Displayed | Default View | Additional Information |
|---|---|---|---|---|
| Land | | | | |
| State Boundaries | N/A | N/A | Y | |
| State Names (Abbreviation) | N/A | N/A | Y | |
| District Boundaries | N/A | N/A | Y | |
| District Names | N/A | N/A | Y | |
| Interstate Highways, with designation # | N/A | N/A | Y | |
| State Highways, with designation # | N/A | N/A | Y | |
| Major Cities | N/A | N/A | Y | |
| Water Bodies | Passover | Water Body Name | Y | |
| Other territory | N/A | N/A | Y | |
| County Boundaries | Click | County Name | N | |
| County Names | N/A | N/A | N | If County Name is displayed, County Boundary click feature is disabled |
| Numbered Planning Area (NPA) | Click | NPA # | N | |
| Exchange | Click | Exchange # | N | |
| Local Access Toll Area (LATA) | Click | LATA # | N | |

-continued

| Objects | Behavior | Attributes Displayed | Default View | Additional Information |
|---|---|---|---|---|
| Airports | N/A | N/A | N | |
| Landmarks | N/A | N/A | N | |
| Facilities | | | | |
| Fiber Routes (IOF only) | Click | Fiber Sheath Attributes of first sheath | Y | |
| Fiber Strands (IOF and Loop) | Passover | Fiber Strand Name | N | Shown as a result of a query |
| | Click | Fiber Strand Attributes | | |
| Central Office Locations | Passover | Central Office Name | N | |
| | Click | Central Office Attributes | | |
| Central Office Names | N/A | N/A | N | If Central Office Name is displayed, Central Office Location passover feature is disabled |

6.2.1.8.5 District

FMT can provide a default District view comprising the District and partial boundaries of adjacent Districts. FIG. 5 illustrates the concept.

| Objects | Behavior | Attributes Displayed | Default View | Additional Information |
|---|---|---|---|---|
| Land | | | | |
| State Boundaries | N/A | N/A | Y | |
| State Names (Abbreviation) | N/A | N/A | Y | |
| District Boundaries | N/A | N/A | Y | |
| District Names | N/A | N/A | Y | |
| Wire Center Boundaries | Passover | Wire Center Name | Y | |
| Interstate Highways, with designation # | N/A | N/A | Y | |
| State Highways, with designation # | N/A | N/A | Y | |
| Major Cities | N/A | N/A | Y | |
| Water Bodies | Passover | Water Body Name | Y | |
| Other territory | N/A | N/A | Y | |
| County Boundaries | Click | County Name | N | |
| County Names | N/A | N/A | N | If County Name is displayed, County Boundary click feature is disabled |
| City Boundaries | Click | City Name | N | |
| City Names | N/A | N/A | N | If City Name is displayed, City Boundary passover feature is disabled |
| Zip Code Boundaries and Zip Code | N/A | N/A | N | |
| Numbered Planning Area (NPA) Boundaries and NPA # | N/A | N/A | N | |
| Exchange Boundaries and Exchange # | N/A | N/A | N | |
| Local Access Toll Area (LATA) Boundaries and LATA # | N/A | N/A | N | |
| Airports | N/A | N/A | N | |
| Landmarks | N/A | N/A | N | |

| Objects | Behavior | Attributes Displayed | Default View | Additional Information |
| --- | --- | --- | --- | --- |
| Facilities | | | | |
| Fiber Routes (IOF only) | Click | Fiber Sheath Attributes of the first sheath | Y | |
| Fiber Strands (IOF and Loop) | Passover | Fiber Strand Name | N | Shown as result of a query |
| | Click | Fiber Strand Attributes | | |
| Central Office Locations | Passover | Central Office Name | Y | |
| | Click | Central Office Attributes | | |
| Central Office Names | N/A | N/A | N | If Central Office Name is displayed, Central Office Location passover feature is disabled |

6.2.1.8.6 Wire Center

Figure 6:
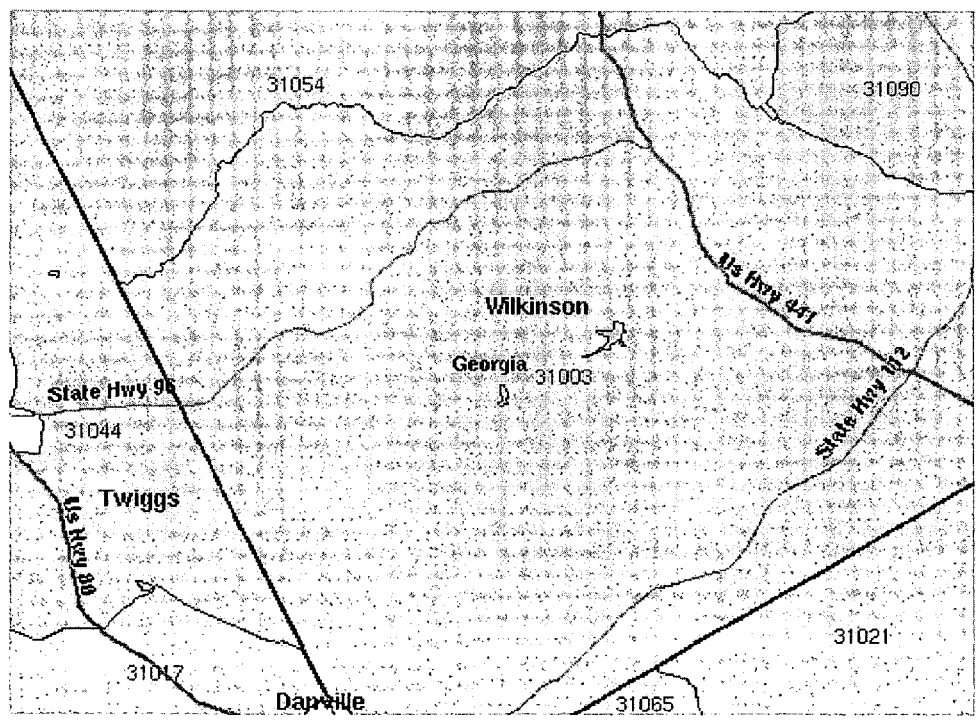
FIG. 6 is a graphical view of the wire center level provided by an exemplary FMT.

FMT can provide a default single Wire Center view comprising the Wire Center and partial boundaries of adjacent Wire Centers. FIG. 6 suggests the concept.

| Objects | Behavior | Attributes Displayed | Default View | Additional Information |
| --- | --- | --- | --- | --- |
| Land | | | | |
| State Boundaries | N/A | N/A | Y | |
| State Names (Abbreviation) | N/A | N/A | Y | |
| District Boundaries | N/A | N/A | Y | |
| District Names | N/A | N/A | Y | |
| Wire Center Boundaries | N/A | N/A | Y | |
| Wire Center Names | N/A | N/A | Y | |
| Interstate Highways, with designation # | N/A | N/A | Y | |
| State Highways, with designation # | N/A | N/A | Y | |
| Major Cities | N/A | N/A | Y | |
| Water Bodies | Passover | Water Body Name | Y | |
| Other territory | N/A | N/A | Y | |
| City Boundaries | N/A | N/A | Y | |
| City Names | N/A | N/A | Y | |
| Railroads | N/A | N/A | Y | |
| County Boundaries | Click | County Name | N | |
| County Names | N/A | N/A | N | If County Name is displayed, County Boundary click feature is disabled |
| Zip Code Boundaries and Zip Code | N/A | N/A | N | |
| Numbered Planning Area (NPA) Boundaries and NPA # | N/A | N/A | N | |
| Exchange Boundaries and Exchange # | N/A | N/A | N | |
| Local Access Toll Area (LATA) Boundaries and LATA # | N/A | N/A | N | |
| Tax Area Boundaries and Tax # | N/A | N/A | N | |

-continued

| Objects | Behavior | Attributes Displayed | Default View | Additional Information |
|---|---|---|---|---|
| Airports | N/A | N/A | N | |
| Landmarks | N/A | N/A | N | |
| Facilities | | | | |
| Fiber Routes (IOF and Loop) | Click | Fiber Sheath Attributes of the first sheath | Y | |
| Fiber Strands (IOF and Loop) | Passover | Fiber Strand Name | N | Shown as result of a query |
| | Click | Fiber Strand Attributes | | |
| Central Office Locations | Click | Central Office Attributes | Y | |
| Central Office Names | N/A | N/A | Y | |
| Remote Terminal Locations | Passover | Remote Terminal Name | N | Shown as the result of a query |
| | Click | Remote Terminal Attributes | | |
| Remote Terminal Names | N/A | N/A | N | If Remote Terminal Name is displayed, Remote Terminal Location passover feature is disabled |
| Conduit Runs | Click | Conduit Attributes | N | Currently, this information is available only in the Western States |

6.2.8.1.7 Street Level

Figure 7:
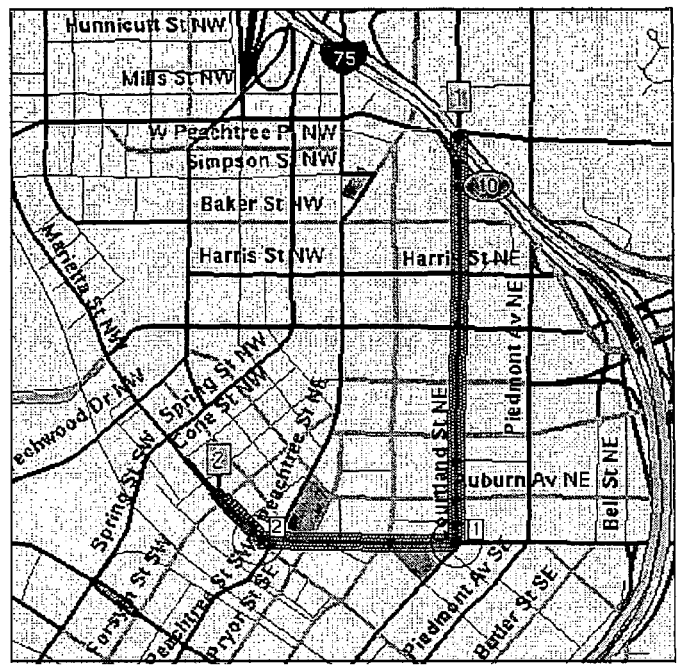
FIG. 7 is a high-level graphical view of the street level provided by an exemplary FMT.
Figure 8:
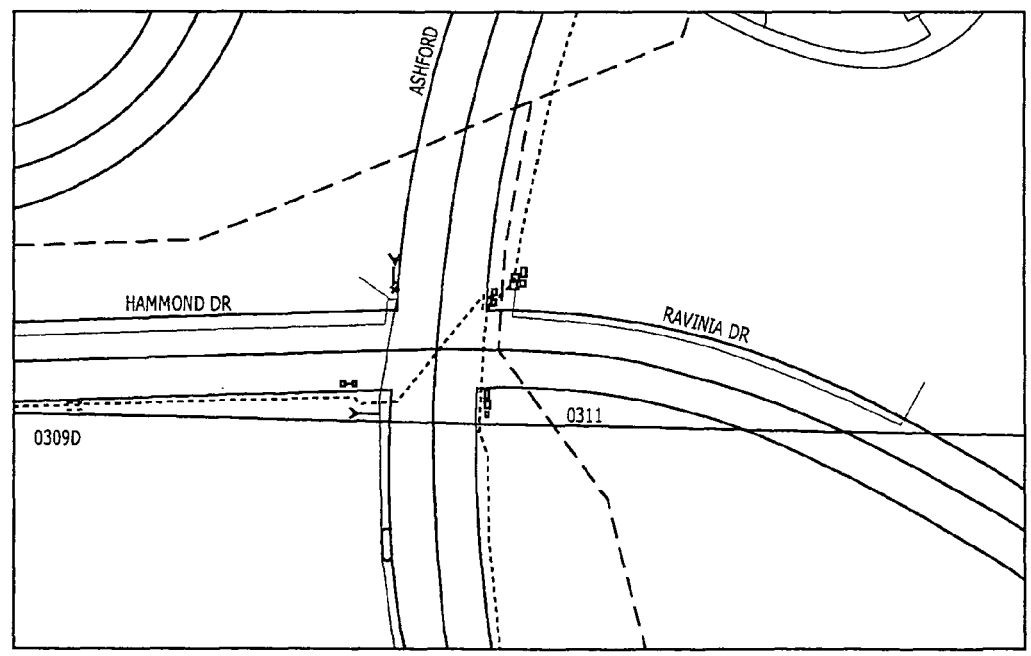
FIG. 8 is a low-level graphical view of the street level provided by an exemplary FMT.

FMT can provide a default view comprising street segments. FIG. 7 and FIG. 8 suggest the concept. [30]

| Objects | Behavior | Attributes Displayed | Default View | Additional Information |
|---|---|---|---|---|
| Land | | | | |
| State Boundaries | N/A | N/A | Y | |
| State Names (Abbreviation) | N/A | N/A | Y | |
| District Boundaries | N/A | N/A | Y | |
| District Names | N/A | N/A | Y | |
| Wire Center Boundaries | N/A | N/A | Y | |
| Wire Center Names | N/A | N/A | Y | |
| Interstate Highways | N/A | N/A | Y | |
| State Highways | N/A | N/A | Y | |
| Major Cities | N/A | N/A | Y | |
| Water Bodies | Passover | Water Body Name | Y | |
| Other territory | N/A | N/A | Y | |
| City Boundaries | N/A | N/A | Y | |
| City Names | N/A | N/A | Y | |
| Street Right of Ways | N/A | N/A | Y | |
| Street Names | N/A | N/A | Y | |
| Railroads | N/A | N/A | Y | |
| Parcels | N/A | N/A | N | |
| County Boundaries | Click | County Name | N | |
| County Names | N/A | N/A | N | If County Name is displayed, County Boundary click feature is disabled |
| Zip Code Boundaries and Zip Code | N/A | N/A | N | |
| Numbered Planning Area (NPA) | N/A | N/A | N | |

-continued

| Objects | Behavior | Attributes Displayed | Default View | Additional Information |
|---|---|---|---|---|
| Boundaries and NPA # Exchange Boundaries and Exchange # | N/A | N/A | N | |
| Local Access Toll Area (LATA) Boundaries and LATA # | N/A | N/A | N | |
| Tax Area Boundaries and Tax # | N/A | N/A | N | |
| Communities | N/A | N/A | N | |
| Airports | N/A | N/A | N | |
| Parks-Lands | N/A | N/A | N | |
| Landmarks | N/A | N/A | N | |
| Facilities | | | | |
| Fiber Routes (IOF and Loop) | Click | Fiber Sheath Attributes of first sheath | Y | |
| Fiber Strands | Passover | Fiber Strand Name | N | Shown as result of a query |
| | Click | Fiber Strand Attributes | | |
| Loops and Length | N/A | N/A | Y | |
| Splices and Length | N/A | N/A | Y | |
| Poles | N/A | N/A | Y | |
| Manholes and Names | N/A | N/A | Y | |
| Hand Holes and Names | N/A | N/A | Y | |
| Conduit Runs | Click | Conduit Attributes | Y | Currently, this information is available only in the Western States |
| Central Office Locations | Click | Central Office Attributes | Y | |
| Central Office Names | N/A | N/A | Y | |
| Remote Terminal Locations | Click | Remote Location Attributes | Y | |
| Remote Terminal Names | N/A | N/A | Y | |
| Optical Node Unit | Click | Optical Node Unit Attributes | Y | |
| Fiber Risers | Click | Fiber Sheath Attributes | Y | |

6.2.2 Select and Query Visible Graphical and Network Facility Items

6.2.2.1 List Attributes of a Fiber Sheath

| | |
|---|---|
| Embodiment | List the data attributes of a fiber sheath. |
| Description | FMT can provide the user with the ability to obtain defined information about a fiber sheath. This may be in conjunction with a fiber strand or a conduit, or as a request for information about a specific fiber sheath. |
| Data | See Data Embodiments: Fiber Sheath |
| System Behavior | The system can provide the user with the ability to select a fiber sheath in a graphical environment or on a query screen. For example, a user selects a sheath in the graphical layer, and FMT displays the fiber sheath's attributes, with an option to further define the search on the query screen environment. On the query screen, the system can provide multiple parameters for a search. For example, a user may want to view fiber sheath(s) by Manufacturer, Type, Year Placed. Based upon the scope and results of the query, the user can be able to further narrow the search. For example, a user enters Manufacturer and Year Placed as parameters, and FMT displays a listing of all sheaths meeting the criteria. The user can then select an individual sheath to review its data attributes. The user can view the sheath position (compliment) from |

| | |
|---|---|
| Spatial Embodiment | the physical strand view. This is viewed as a simple "Attribute Review" embodiment, whereby the user selects a fiber cable in the graphical environment to review its data attributes. This action displays the attributes of the selected fiber cable. In addition, "child" tabs or pages can be made available for review on a fiber cable's attribute review panel, e.g., a Complements page that shows the complements associated with the particular fiber cable. Additional tabs that can be considered as candidates for "child" tabs include Logical Strand and Equipment Locations. Each of these tabs can be considered for additional functionality, such as providing launch points from Spatial to FAS from some of these child attribute review tabs. However, some of these launch points can be available in other places in the application |
| User Action(s) in Spatial | Select a fiber sheath RMC and select 'Attribute review' to see sheath attributes |
| Spatial to FAS I/F | Dependent on child tab definitions: Fiber = none Complement = none Strand = LAUNCH (cable name & strand) Location = LAUNCH (CLLI, Area #, &/or loc_clli) |
| I/F Type | Strand = XML (1) Location = XML (1) |

6.2.2.2 List Attributes of a Fiber Splice

| | |
|---|---|
| Embodiment | List the data attributes of a fiber splice. |
| Description | FMT can provide the ability for a user to obtain defined information about a fiber splice. This may be in conjunction with an item of DLE equipment, fiber strand, fiber sheath, or as a request for information about a particular fiber splice. |
| Data | See Data Embodiments: Fiber Splice |

6.2.2.3 List Attributes of a Fiber Strand

| | |
|---|---|
| Embodiment | List the data attributes of a fiber strand. This applies to both loop and Central Office fiber cables. |
| Description | FMT can provide the ability for a user to obtain defined information about a fiber strand. This may be in conjunction with an item of DLE equipment, a fiber sheath, a splice, or as a request for information about a specific fiber strand. |
| Data | See Data Embodiments: Fiber Strand |
| System Behavior | The system can provide the user with the ability to select a fiber strand in a graphical environment or on a query screen. For example, the user selects a strand and FMT displays the fiber strand's attributes, with an option to further define the search on the query screen. On the query screen, the user can query the data using multiple parameters to define the search. For example, a user may want to view fiber strand(s) by Status, Mode, Beginning or Terminating Wire Center. Based upon the scope and results of the query, the user can be able to further narrow the search. For example, a user enters Beginning Wire Center and Status as parameters, and FMT displays a listing of all fibers meeting the criteria. The user can then select an individual strand to review its data attributes. |
| Spatial Embodiment | Definitions for reference: OPEDS Strand: Matches the OPEDS Sheath/IPID Physical Strand: What is in the field - Equipment to splice to splice to equipment Logical Strand: same as physical, except without the splices (equipment to equipment) Derived Strand: Path created by WDM EQUIPMENT. |
| User Action(s) in Spatial | Select a fiber sheath RMC and select 'Attribute review' to see sheath attributes Select the 'Strand' tab to see all strands on sheath Select 'Details' push button to see FAS data |
| Spatial to FAS I/F | LAUNCH (CLLI, Cable name & strand) |
| I/F Type Scenario: | (1) XML |

User can search for a fiber strand through FAS search, using strand name, locations that are fed by the strand and equipments that are connected to that strand. Users can also select a fiber strand on the spatial tool, and be able to see the corresponding tabular data in FAS. Data elements that may be displayed on the FAS screen:

Strand ID (cable/pair), Location(s) where the strand is terminated, Equipment associated with strand (including location, strand, slot, and SCID), LEAD status and CKID, TIRKS status and CKID, User status (probably pulldown including spare, working, restricted, defective) and CKID, Interest (LRS), Connector types, Mode (single v/s multi), comments, Loss data

6.2.2.4 List Attributes of an Equipment Location

| | |
|---|---|
| Embodiment | List data attributes for Equipment Locations |
| Description | Equipment Locations are defined as either a Central Office (CO) or a Remote Terminal (RT). For a specific Equipment Location, FMT can provide a defined set of data attributes (e.g., address, equipment housed). |
| Data | See Data Embodiments: Equipment Location |
| System Behavior | The system can provide the user with the ability to select an Equipment Location in a graphical environment or on a query screen. When the user selects an Equipment Location, FMT can provide a listing of the Equipment Location's data attributes. From here, the user can be able to view associated attributes, such as equipment located in the Equipment Location. The user selects an Equipment command button to display a query screen. The user can define the search by entering parameters (e.g., type, status). Based upon the results of the query (e.g., a Mux type was selected), the user can have the ability to further define the search by selecting the equipment item to review its specific data attributes. |
| Spatial Embodiment | User can select equipment location and review its attributes. User can opt to review data in FAS from the selected location. |
| User Action(s) in Spatial | Select equipment location feature RMC and select 'Attribute review' to see location attributes Select 'Details' to see FAS data |
| Spatial to FAS I/F | LAUNCH (CLLI, Area #, LOC_CLLI) |
| I/F Type | (1) XML |
| Scenario: | |

User can search for equipment in FASWEB, using any one of the above defined relationship.
User can also select a location (area number) in spatial number and FAS can display all the information about that location in the above defined structural order. For TIRKS equipments, the above entity relationship may not be correct. But the parent object area number/geo code can be there.

6.2.2.5 Display Data Attributes of a Conduit

| | |
|---|---|
| Embodiment | List the data attributes of a conduit |
| Description | FMT can provide the ability for a user to obtain information about a conduit run. This may be in conjunction with a fiber sheath, or as a request for information about a specific run. |
| Data | See Data Embodiment: Conduit |
| System Behavior | The system can provide the user with the ability to select a conduit in a graphical environment or on a query screen. For example, a user selects a conduit in the graphical layer, and FMT displays the conduit's attributes, with an option to further define the search on the query screen. On the query screen, the user can query the data using multiple parameters to define the search. For example, a user may want to view conduits by Type or Length. Based upon the scope and results of the query, the user can be able to further narrow the search. For example, a user enters Type as a parameter, and FMT displays a listing of all types meeting the criteria. The user can then select a Type to review all conduits of that particular type. Next, the user could select a specific conduit. |
| User Action(s) in Spatial | Select a route conduit feature RMC and select 'Attribute review' to see fiber sheath attributes associated with the conduit run. |
| Spatial to FAS I/F | See section 6.2.2.1 for details |
| I/F Type | See section 6.2.2.1 for details |

6.2.2.6 Display Data Attributes of Landbase Features

| | |
|---|---|
| Embodiment | List the data attributes of Landbase Features |
| Description | FMT can provide the ability for a user to obtain information about landbase features such as streets, parcels, lakes, rivers, etc. |
| Spatial Embodiment | Simple attribute review of the selected feature |
| User Action(s) in Spatial | Select a land base feature RMC and select 'Attribute review' to see fiber sheath attributes associated with the conduit run. |

6.2.3 Provide Fiber Calculation Tools

6.2.3.1 Determine Number of Splices in a Strand

| | |
|---|---|
| Embodiment | Determine the number of splices in a strand. |
| Description | May require a change to the facility database model. Facility database does not contain a SPLICE. The number of splices equals the number of sheaths that contain the strand. |
| Data | Strand attributes: Continuity, Splice Type, Default Loss, Measured Loss See Data Embodiments: Fiber Splice Sheath attributes: IPID # Default loss; measured loss |

6.2.3.2 Provide Distance Between Points on a Fiber Strand

| | |
|---|---|
| Embodiment | Provide the ability for a user to select two position points along a fiber strand, and the system can respond with a distance measurement along the fiber strand between the two points. |
| Description | FMT can provide the ability for a user to select any two points along a fiber strand to determine the distance between the points. The distance calculation can include loop distances along the fiber strand path. |
| Data | See Data Embodiments: Fiber Sheath |
| System Behavior | FMT can provide the user with the ability to view a fiber strand route in the graphical layer. The user can be able to select (i.e. mouse click) two points along the fiber strand path. FMT can indicate the distance. |
| Spatial Embodiment | Calculate sheath distance along a route between two points. Calculation is a proration of geographic distance and database lengths; where/when intelligent loops features exist (planned for Spatial Age EWO), the sheath distance can calculate based on loop location & lengths, and span lengths. |

(System Behavior continued from previous page: When the user selects a strand, the system can indicate the number of splices. The system can provide this function in both a text and graphical environment.)

6.2.3.3 Provide Distance Between Geographic Points

| | |
|---|---|
| Embodiment | Provide the ability for a user to perform a distance measurement between any two points within the current graphical view of the landbase and network facilities. |
| Description | FMT can provide the user with the ability to select any two points within the current graphical view to determine the distance between the points. For any two points within the landbase, a user can have the ability to determine distance between the points. The system can round all distance measurements to the nearest foot or meter. |
| Data | Systems: OPEDS |
| System Behavior | FMT can provide a view of a fiber strand path in the graphical environment. The user can be able to select (i.e. mouse click) a series of points within the graphical view. FMT can indicate the distance. |

6.2.3.4 Calculate and Display Anticipated dB Loss of Fiber Strand Path

| | |
|---|---|
| Embodiment | Calculate anticipated dB loss of a fiber strand path. |
| Description | At a user's request, FMT can calculate the anticipated dB loss of a fiber strand path. **Based on loss data associated with fiber splice (See 6.2.3.1): The attenuation property of a sheath plus the splicing loss. |
| Data | See Data Embodiments: Fiber Sheath - Attenuation |

6.2.3.5 Input Loss and Locate Fiber Cut

| | |
|---|---|
| Embodiment | Input Fiber Loss and locate the Fiber Cut |
| Description | User can input the loss of a fiber and the system can generate where the fiber cut is located. |
| Data | This can be based on the best data which is available. First choice is actual splice loss, second choice is default loss. User can also be shown the measured loss, but no logic can be performed against the measured. |
| Spatial Embodiment | User Interface (Outage Location function) for user to select fiber strand (fiber name, strand), indicate ring type, side, test location (area # or loc/clli), and enter db loss OR distance reading. Spatial calculates cut location using default loss values, and/or actual loss values if present. |
| User Action(s) in Spatial | |
| Spatial to FAS I/F | Read stored loss values for fiber strand in FAS. |
| I/F Type | (2) |

6.2.3.6 Generate Restoration Order Based On System/User

| | |
|---|---|
| Embodiment | Generate Restoration Order/Assigned Restoral Order |
| Description | FMT can generate or assign a restoration order that is based on the system or user. It can generate a fiber strand restoration priority list from a graphically selected fiber sheath within an average of 60 seconds or less from a web user interface. |
| Data | Need info by sheath and then by ribbon and then by strand. |
| Spatial Embodiment | Provide user interface to select one or more fiber sheaths. |

6.2.4 Generate Fiber Schematics
6.2.4.1 Use Automatic Schematics Tool

| | | |
|---|---|---|
| Embodiment Description | Add system generated schematics The system can generate high-level graphical view of facility routes with less detail and no landbase. These "stick" schematics should provide the user with a general view of the location, number, and size of fibers in an area, allowing for easy viewing and analysis of a large geographical area. | |
| Data | Data Description | Source (Primary, Secondary) |
| General Discussion | Area of concentration is fiber since not much copper relief is being done (or authorized) anymore. | |
| Spatial Embodiment | Types of schematic generation desired are handled by 'view' capabilities in COTS. | |

6.2.4.2 Use Manual Schematics Tool

| | |
|---|---|
| Embodiment | Allow for user created schematics |
| Description | The system can allow a user to create or import existing "stick" schematics, which have no underlying landbase. |

6.2.5 Integrate Fiber Related Data
6.2.5.1 Add Fiber Strand and Derived Wavelength Data

| | |
|---|---|
| Embodiment | Allow for Fiber Strand assignment(utilization) data to be added into a source database. |
| Description | FMT can establish a source database for fiber strand assignment. |
| General Discussion | "FMT" can be the de facto data source for fiber strand data. What may be most important is not 'assignment' type data but instead 'utilization' type data. Spatial creates 'physical strands' from OPEDS fiber sheath data using complements. Spatial also creates logical strands, or assemblies, from the physical strand data. An assembly essentially runs from 'port to port', providing end-to-end connectivity of a single strand. Spatial can provide an interface to FAS for this 'logical strand', or assembly, data. Spatial then passes strand information (by sheath, ribbon, & strand) to FAS. |
| Spatial Embodiment | Build necessary physical & logical strand data from OPEDS data. Provide an interface to FAS to acquire logical strand data. |

Data elements that should be displayed on the FAS screen:

Same as 6.2.2.3.
Source for all the data elements for this embodiment:

Same as 6.2.2.3.

See 6.2.2.3

6.2.5.2 Provide Connectivity Between Fiber Strand and Equipment Slot

| | |
|---|---|
| Embodiment | Track the connectivity between a fiber strand and DLE equipment and display the data attributes for each associated item of equipment and fiber strand. |
| Description | For a specific strand, FMT can identify the DLE equipment in which the strand originates and terminates. FMT can also provide a defined set of information regarding each of these items of equipment. Conversely, for a specific item of DLE equipment, FMT can identify the specific strand(s) that is/are either terminating or originating. FMT can also provide a defined set of information regarding each of these fiber strands. |
| Data | See Data Embodiments: DLE Equipment, Multiplexer(MUX), LGX, DSX, DLC, ONU, NMLI, Repeater Shelf, Switch, Fiber Strand |
| System Behavior | The system can provide the user with the ability to select a strand in a graphical environment or on a query screen, and view the results in a tabular format. FMT can track this information across wire center, district, state, and other boundaries. When the user selects a strand, FMT can provide a list of all equipment (by item or type, depending upon the query) connected to the strand. When the user selects an equipment item or type, the system can provide the equipment item's defined informational attributes, or if type is selected, all items defined by the type. The user can then be able to select an equipment item and review its informational attributes. The system can provide the user with the ability to select a DLE equipment item on a query screen. A user can select an item of DLE equipment and indicate the set of information desired. This may include a listing of all fiber strands terminating to or |

-continued

| | |
|---|---|
| Spatial Embodiment | originating from the item of equipment and/or the equipment's informational attributes.<br>Further<br>May only need to be able to get to an equipment location and see equipment details in FAS. Drill down from fiber sheath to strand to equipment location, then launch FAS. |
| User Action(s) in Spatial | |
| Spatial to FAS I/F | LAUNCH (CLLI, area #, LOC_CLLI) |
| I/F Type | (1) XML |
| Scope for FAS: | |

FAS should store the connectivity information between logical fiber strand and equipments (LEIM, TIRKS and FOX). At a high level. FAS should be able to answer the following question.
1. For any given logical fiber strand, list all the equipments connected to it.
2. For any given equipment, list all the logical fiber strand connected to it.
3. For any given logical fiber strand, list all the locations connected to it.
4. For any given location, list all the logical fiber strand connected to it.
A logical fiber strand is a fiber strand between two locations (area number). A location (area number) can have multiple CSA/location clli. A CSA can have multiple loc-ids. A loc-id can have multiple equipments.
Scenario:

User can search for an equipment in FASWEB, using any one of the above defined relationship.
User can also select a location (area number) or logical fiber strand in spatial and FAS can display all the information about that location or the fiber strand in the above defined structural order.
User can select strand and see all equipment, sheaths, and locations associated with the strand. Conversely the user can select a piece of equipment and see all strands and other pieces of equipment with which it is connected.

User can select strand and see all equipment, sheaths, and locations associated with the strand. Conversely the user can select a piece of equipment and see all strands and other pieces of equipment with which it is connected.

6.2.5.3 Provide SCID Relationships to Fiber Strand and Equipment Slot

| | |
|---|---|
| Embodiment | Provide SCID Relationships to Fiber Strand and Equipment Slot. |
| Description | System should be able to form a SCID relationship between a Fiber Strand and an Equipment Slot in order to identify it. |
| Data | FAS tool can collect info from TIRKS as to relationship between SCID and strand(s) and equipment. AI: where is data in TIRKS. |
| Spatial Embodiment | FAS provides Spatial with minimum LOC_CLLI, cable id & strand in order to kick off a fiber trace of the strand and equipment of interest. |

FAS should capture the relationship between fiber strand and equipment in the form of a SCID (Sonic circuit ID) relationship.

User searches for a piece of equipment; FAS displays selected information, including SCID; user can then see all other equipment which is also associated with the SCID.
User selects fiber strand in Spatial and requests a SCID trace; Spatial performs appropriate query against FAS and the highlights SCID path and associated locations.

6.2.5.4 Provide LEAD and TIRKS Circuit IDs

| | |
|---|---|
| Embodiment | Provide CKIDs from LEAD and TIRKS |
| Description | System can generate CKIDs from LFACS or LFACS and TIRKS by integrating fiber assignment data. |

User searches for fiber strand; FAS displays assignment data based on data from these systems. See section 6.2.2.3
Data elements that should be displayed on the FAS screen:

See 6.2.2.3
Source for all the data elements which are required for this embodiment:

See 6.2.2.3

6.2.5.5 Capture Fiber Diversity Information

| | |
|---|---|
| Embodiment | Capture Fiber Diversity Information |
| Description | Once a user has determined that a strand is diversely routed or a site is diversely fed, FMT can capture the diversity information about the Fiber and capture it into the database. The user can select a type of diversity from a list of diversity types such as sheath, route, CO. |
| Data | System: OPEDS<br>Spatial embodiment: user can update FAS database with diversity information. If the user determines that something is diverse using Spatial, then Spatial can update FAS with that data. |

A SINGLE FIBER STAND IS NOT DIVERSELY ROUTED, BUT A STRAND CAN BE DIVERSELY ROUTED COMPARED TO ANOTHER STRAND. EQUIPMENT CAN BE FED DIVERSELY, THUS DIVERSITY DATA SHOULD BE STORED FOR A PIECE OF EQUIPMENT
Scenario:

User determines that a piece of equipment is of a particular diversity type; user navigates to appropriate FAS webpage and enters diversity type (by selecting from a list of values)

6.2.5.6 Capture Fiber Connections from FOX

| | |
|---|---|
| Embodiment | Capture Fiber Connections from FOX |
| Description | FMT can integrate with FOX to obtain where the Fibers connect.<br>User can request FOX data for presentation. User can then be able to compare FOX data against FAS data by matching on location and bay/panel/jack. No other logic may be utilized. |

-continued

| | |
|---|---|
| Description | FMT can integrate with FOX to obtain where the Fibers connect. |

Scope for FAS:

FAS can collect the information about the connectivity between logical fiber strand and equipment from the FOX system.

Scenario:

(User can search for a logical fiber strand and see all the connected devices based on the data obtained from FOX.
User can also search for a device and see all the equipments attached to a logical fiber strand.
User can also select a fiber strand in spatial and see all the equipments attached to it based on the data we got from FOX.)
User requests FOX data. FAS presents FOX data for a location next to appropriate FAS equipment data for that location.
User then enters appropriate data in the User section of Fiber Strand data.

6.2.5.7 Capture a LOC/CLLI and Address from LOC/CLLI System

| | |
|---|---|
| Embodiment | Capture a LOC/CLLI and Address from LOC/CLLI System |
| Description | FMT can capture, as needed, all LOC/CLLI and Addresses from the LOC/CLLI System. |
| Data | System Embodiments: LOC/CLLI |

6.2.5.8 Capture Easement/ROW Information for Locations from BETS

| | |
|---|---|
| Embodiment | Capture and Retrieve ROW/Easement data from BETS |
| Description | User can enter the ROW# into the planning layer of FMT and the appropriate data from BETS is retrieved. |

6.2.5.9 Generate Land Base for Non-OPEDS Converted Wire Centers

| | |
|---|---|
| Embodiment | Generate land base for non-OPEDS converted wire centers with the location of central offices, equipment sites and x-boxes from the existing OPEDS land base data. |

6.2.5.10 Develop Mechanized Processes from Legacy System Sources

| | |
|---|---|
| Embodiment | Develop a mechanized process to load data and manage conflicts from separate legacy system sources and user input from local records. |
| Description | The system can determine an appropriate source to use to provide existing fiber and equipment attributes. Conflict identification of database and source documents should be easily documented and feedback to the keepers |

-continued

| | |
|---|---|
| | of the source documents should be made as ease as possible. |
| Data | See section 7 Also capability to upload fiber strand attributes into FAS. |

Scope for FAS:

From a user's perspective this embodiment can be the same as 6.2.2.3 with the addition that the user can also have a means of bulk loading data into FAS based on data which does not exist in the other source databases.

Scenario:

See 6.2.2.3
Data elements that should be displayed on the FAS screen:

See 6.2.2.3
Source for all the data elements which are required for this embodiment:

See 6.2.2.3

6.2.5.11 Manage Out of Franchise Fiber and Equipment

| | |
|---|---|
| Embodiment | Develop a means of managing out of franchise fiber and equipment |
| Description | The telecommunications company may own fiber optic cables and equipment in areas outside of the 1600 wire centers. This fiber needs to be shown graphically, and the fibers can be tracked in the tabular tools. |
| Data | The data elements are identical to data for fiber and equipment in franchise. |

This information may first be entered in the source databases (EWO and LEIM, etc.)

6.2.5.12 Display and Identify CLEC Sheaths and Equipment

| | |
|---|---|
| Embodiment | Display CLEC sheaths, strands, and equipment in the graphical and tabular tools |
| Description | Competitors may have the right to utilize structures (pole lines, ducts, manholes, cabinets, etc.) Wherever these facilities are identified and entered into a source system by engineering, those facilities must be properly identified in FMT. Facilities which are identified in OPEDS as belonging to other companies may be identified as such in FMT. Equipment which is identified in LEIM and/or TIRKS must be identified as such. The LEIM equipID can carry the intelligence as to which equipment belongs to CLECS, but the standard has not yet been set; as a result, a means of parsing EquipID's and comparing them against a ruleset for determining ownership must be created. |

6.2.5.13 Allow Entry of Fiber Loss Data
6.2.5.13.1 Allow Manual Entry of Fiber Loss Data

| | |
|---|---|
| Embodiment | Allow user to enter actual measured loss for a fiber strand |
| Description | If a user has measured the loss for a fiber strand, that user should be able to enter that loss information for that strand. |

6.2.5.13.2 Allow Automatic Entry of Fiber Loss Data

| | |
|---|---|
| Embodiment | Allow user to upload measured loss data for a fiber strand |
| Description | If a user has measured loss data stored electronically, the system can upload that data and store it. |

6.2.5.14 Display Measured Loss

| | |
|---|---|
| Embodiment | Display Measured Loss |
| Description | User can view the measured loss via a webpage or spatial |

6.2.6 Provide Fibers and Related Equipment Search and Display
6.2.6.1 Display Cabinets for Specified Equipment Location

| | |
|---|---|
| Embodiment | Display Structures for Specified for Specified Equipment Location. |
| Description | System should be able to display appropriate structures that relate to the specified equipment location that is specified by the user. |

6.2.6.2 Display Devices for Selected Structure—Filter by Type

| | |
|---|---|
| Embodiment | Display Devices for Selected Structure and Filter by Type |
| Description | User can select a structure and the system can display the devices by type. |

6.2.6.3 Display Selected Device Attributes

| | |
|---|---|
| Embodiment | Display Selected Device Attributes |
| Description | User can select a device from the screen or either by navigation or via a search, and the system can display the attributes for that device. |
| Data | Data Embodiments: All devices |

User can search for equipment by using different FAS search functionalities. Once equipment is selected, FAS can display all the attributes of the equipment.

6.2.6.4 Display Device Slots and Related Circuits

| | |
|---|---|
| Embodiment | Display Device Slots and Related Circuits |
| Description | User can select a device, circuit, or fiber from the screen or search for one, and the system can display the appropriate device slots and related circuits. |
| Scope for FAS: | |

Display the slot and circuit information for a given device.
All equipment from LEIM and TIRKS can be loaded into FAS; same attributes as shown today in FAS can be displayed
Scenario:

User can select the equipment through FAS search or through selecting a location from Spatial.

6.2.6.5 Locate Equipment by Address

| | |
|---|---|
| Embodiment | Locate equipment by address |
| Description | User can enter an address and the system can display the equipment associated with that address. |
| Spatial Embodiment | Multiple embodiments 1) configure a Equipment Location locate - search by address, area #, loc_clli 2) configure a street address locate 3) launch FAS from equipment location 4) provide Launch & Locate capability from FAS for street address |
| Scope for FAS: | |

FAS should allow the user to search for a location using the address. User can search against address, CLLL, or AreaNumber/GLC. Address includes all possible address attributes, including House Number, street, floor/suite
Scenario:

Provide a search for searching a location by address.
Data elements that should be displayed on the FAS screen:

Display all attributes of a location (CSA/locid)

6.2.7 Provide Fibers and Equipment Utilization Monitoring
6.2.7.1 Provide CSA Utilization by Service Type

| | |
|---|---|
| Embodiment | Provide CSA Utilization by Service Type |
| Description | CSA fill data can be created in a similar fashion as the Crossbox Report, which is currently under development in FAS. Users can determine which systems are fully utilized and which systems are underutilized. |
| Data | Built on existing interface between FAS and LEAD. |

6.2.7.2 Provide CSA Alerts to FACILITY PLANNERSs

| | |
|---|---|
| Embodiment | Provide FACILITY PLANNERSs with some sort of an alert of a CSA |

6.2.7.3 Determine Fiber Strand Utilization

6.2.7.3.1 Determine Whether Physical Strand is Assigned

| | |
|---|---|
| Embodiment | Determine whether physical fiber strands are assigned, spare, or defective. |
| Description | The system can store information which indicates whether a physical fiber strand is in use or can be used to provide service. |
| Data | Assigned indicates that a fiber is either working or reserved. Assigned in analogous to saying that a fiber is "lit". Spare indicates that no traffic is transmitted on the fiber strand. Defective indicates that the fiber strand is currently incapable of transmitting data. See Data Embodiments: Fiber Strand |
| Scope for FAS: | |

General Utilization = Lit fibers/total fibers
And
Weighted Utilization = Sum of (Lit Fibers × FKF(lit))/sum of (total Fibers × FKF (total Fibers))

6.2.7.3.2 Determine Physical and Derived Fiber Strand Utilization

| | |
|---|---|
| Embodiment | Determine which physical and derived fiber strands are in use |
| Description | The system can store information which indicates if a fiber strand is connected to Wave Division Multiplexing equipment (WDM or DWDM) which allows data to be transmitted on several distinct wavelengths (lambdas). The system can also store information as to which lambdas are assigned, spare, or defective. |
| Data | Assigned indicates that a physical or virtual fiber strand is either currently transmitting data or reserved. Spare ad Defective are defined in 6.2.7.3.1. See Data Embodiments: Fiber Strand |
| Scope for FAS: | |

Utilization Formula - # of Lit Derived and Physical Fibers/(total number of Derived and Physical fibers)
Data elements that should be displayed on the FAS screen:

Report can include:
Total number of fibers; number lit; number spare; number defective; number with interest; number otherwise unavailable

6.2.7.3.3 Determine Carrier Signal Level Utilization for a Strand

| | |
|---|---|
| Embodiment | Determine Carrier Signal Level Utilization for a Strand |
| Description | The system can store information which indicates if a fiber strand is connected to Wave Division Multiplexing equipment (WDM or DWDM) which allows data to be transmitted on several distinct wavelengths (lambdas). The system can also store information as to which lambdas are assigned, spare, or defective. |
| Data | Assigned indicates that a physical or virtual fiber strand is either currently transmitting data or reserved. Spare ad Defective are defined in 6.2.7.3.1. See Data Embodiments: Fiber Strand |

Provide matrix report similar to Xbox and/or CSA report. Rows consist of fiber by mode, physical, and derived fiber strands. Columns consist of services such as NMLI, customer OCn ring, Company OCn ring, dry fiber, etc. User can select points in Spatial and designate them as monitoring points; this report can be run at any location and at a monitoring point.

6.2.7.3.4 Determine DS0 Equivalent Utilization for Virtual and Physical Fiber Strands

| | |
|---|---|
| Embodiment | Determine DS0 Equivalent Utilization |
| Description | The system can store information which translates the circuits which are working on a fiber strand to the equivalent number of DS0's based on conversion values. |
| Data | Assigned indicates that a physical or virtual fiber strand is either currently transmitting data or reserved. Spare ad Defective are defined in 6.2.7.3.1. See Data Embodiments: Fiber Strand |

Embodiments may use DS3 equivalent rather than DS0 equivalent. Based on categorizations in previous embodiment and a conversion table, the number of DS3 equivalents for a strand can be determined.

6.2.7.4 Determine Fiber Sheath Utilization

| | |
|---|---|
| Embodiment | Determine Utilization of each Fiber Sheath |
| Description | User can select a fiber sheath to see the utilization. |
| Data | See Data Embodiments: Fiber Sheath |
| General Discussion | Net result - utilization calculations are done using data stored in or available to FAS. |
| Spatial Embodiment | User may select a fiber strand(s) (via fiber sheath) on which to perform utilization. Spatial passes logical fiber information (cable id, strand) to FAS to perform utilization function. |

—continued

| | | |
|---|---|---|
| Description | Users can receive an alert of CSA when they are logged in to FMT and via email. | |
| Data | Data Description | Source (Primary, Secondary) |

6.2.7.5 Determine Utilization Trend Analysis

| | |
|---|---|
| Embodiment | Determine Utilization Trend Analysis |
| Description | User can view the current or past trends of utilization among a given search parameter, i.e. district, state, etc. |
| Scope for FAS: | |

For a location and a monitoring point, FAS can keep high level utilization data for trend analysis.

6.2.7.6 Determine Fiber Cross-Section Alerts

| | |
|---|---|
| Embodiment | Determine Fiber Cross-Section Alerts |
| Description | User can receive an alert or warning for specified fills on strand and bandwidth utilization once they have reached the specified number that is set as the default or warning level. These alerts can be based on fiber sheath and on cross section (route, a combination of fiber sheaths in the same geographic area). Ex. "Send me an email notice when this cross section has only 6 spare fibers remaining." Note: Spare should not include defects. |
| Data | Default values and warning level can be set for specified fills; and users can receive these warnings once the data has reached or past that level. |
| Spatial Embodiment | Provide a feature, "Monitor Point", that is placed by the user. This feature identifies one or more fiber sheaths to be monitored. User may define sheaths for inclusion (association with) in the feature by selecting sheaths or by drawing a polygon around desired sheaths. User may optionally define which specific strands of this group they wish to monitor. User also defines the maximum fill (or minimum spare) threshold to issue an alert. Frequency of monitoring is specified by (user specified or default frequency) A) Spatial passes this information (monitor id, CLLI, & list of cable id and strand, min/max, etc.) to FAS for monitoring. Spatial provides a "Cross Section Alert" theme (view) customized to show only those features of interest to a user who wishes to see status of these features. The Monitor Point feature is set to display in one color if monitor level is safe and a different color if the monitor level is in danger. There is no 'automatic notification' of alerts in Spatial; it is up to the user to invoke this theme whenever the user desires to do so. B) When this "Cross Section Alert" theme is invoked, Spatial queries a view/table provided by FAS to set the required displays for the Monitor Point feature. User can select the monitor feature and launch FAS to see details for the selected cross section. |
| Spatial to FAS I/F | A) NOTIFY (monitor id, CLLI, list of cable id/strand, min/max) B) QUERY Table (monitor id, group status) C) LAUNCH (CLLI, list of cable id/strand) |
| I/F Type | A) (1) XML (new action = NOTIFY) B) (2) View/table (required) |

Embodiments can use the spatial age, to define the monitoring fiber cross-section group. Spatial age can find the fiber strands, which are inside this user-defined group, and can send the FAS strand data to FAS. FAS can start monitoring that group based on the fiber utilization logic
FAS also can create a mechanism to provide this information to Spatial age.
FAS may not have the capability to create a monitoring spatial group. It may always be done from Spatial.
But FAS may have the capability to define what is Red, Yellow and Green.
As part of reports, spatial engine can send a list of elements to FAS for which we need the alert information. That can enable Spatial to display the data in a color coded form.
For example, spatial can send list of fiber strand and FAS can send the color-coded information for those FAS strand. Based on that Spatial can display a graphical view of the report.
Scenario:

User can define a cross section in the spatial tool. Once a cross section is defined, spatial tool can provide FAS with the entire fiber strand information, which is part of that cross section. Based on the fiber strand utilization the corresponding cross section can be color-coded. FAS can also provide alerts on the main page based on the cross section status.
Data elements that should be displayed on the FAS screen:

For a tabular view of a cross section, what data elements may be displayed in FASWEB module.
Monitoring Point (cross section) can be shown along with its various forms of utilization as defined in sections 6.2.7.3
Monitoring Points should include Locations, and user can suppress alerts similar to MG alert suppression for Xbox in FAS today.
Source for all the data elements which are required for this embodiment:

See section 6.2.7.3 for different types of utilization. Alerts can be based on % utilization based on physical strand.
For a Location, FAS may have knowledge of strands which are associated with it based on 1)OPEDS sheaths which feed an electronics location and 2) Spatial selection of one or more sheaths in the same general geographic area. There is a natural relationship between sheath and logical strand.

6.2.7.7 Determine MUX Utilization

| | |
|---|---|
| Embodiment | Determine MUX Utilization |
| Description | User can determine MUX utilization to determine fiber utilization This is "iView" mux utilization which is based on a worst case combination of LEIM, LEAD, TIRKS, and User DS1 and above data. User can pull reports based on this utilization as well as see this data in the existing FAS view of equipment. |

6.2.7.8 Monitoring Point

| | |
|---|---|
| Embodiment | Monitoring Point |
| Description | Spatial may need to allow user to place a monitoring Point to see and define strands to be monitored for utilization at a particular route cross-section. Locations are, by default, Monitoring Points. The user can define additional Monitoring Points and assign those points a name and some comments. |

6.2.7.9 Xbox and CSA History and Trending

| | |
|---|---|
| Embodiment | Xbox and CSA History and Trending reports |
| Description | Maintain high level Xbox and CSA utilization data for up to 5 years |
| Data | Based on the original concept for the Xbox reports, monthly data for Xbox and CSA can be maintained for 24 months; quarterly data can be maintained for an additional 3 years. This data is essentially the summary row for each of the services for the Xbox or CSA. Based on past utilization, generate trendline so that user can estimate future needs. |

6.2.8 Provide Fiber Tools and Reports
6.2.8.1 Generate Equipment Site Activity Log

| | |
|---|---|
| Embodiment | Create a Site Maintenance Package |
| Description | A site maintenance package consists of easement information for a site (location clli) and the structures, which exist there. The user also needs to be able enter comments along the lines of where to park, restrictions, etc. |
| Data | Easement, any comments/restrictions, all TEO and/or jobs Filed by CSA Need additional jobs besides those which are stored in LEIM (site prep job, etc.) |
| Spatial Embodiment | MOSTLY FAS, but not necessarily all. User can Launch FAS to see Location. |

Scope for FAS:

Site maintenance package is maintenance package information for a CSA. All the data may be manually updated/entered by users. FAS MAY MAINTAIN A LIST OF LRS'S WHICH ARE ASSOCIATED WITH A LOCATION. HIGH LEVEL DATA FROM THE LRS, INCLUDING EWO NUMBER, SCOPE OR WORK, JOB CLOSED DATE CAN BE STORED.
THIS DATA MAY BE AUTOMATIC, ASSUMING THAT USER PROPERLY ENTERS ATTRIBUTES IN LRS.
USER MAY ALLOW ENTER COMMENTS FOR THE LOCATION. USERS CAN ALSO ENTER ADDITIONAL HISTORICAL DATA ALONG THE SAME LINES AS THAT WHICH CAN BE AUTOMATICALLY GENERATED USING THE LRS.
Scenario:

User can select a CSA either through search or through spatial. Once a CSA is selected, then user can enter certain information as maintenance log, such as notes, which can be captured with updated date and user name.

6.2.8.2 Allow User to Determine Fiber Strand Diversity

| | |
|---|---|
| Embodiment | Determine Diversity of a Fiber Strand |
| Description | A strand is route-diverse when it is not in or on the same supporting structure (conduit). A strand is CO-diverse when it is route-diverse and terminates in two Central Offices. Users can determine whether a fiber strand is non-diverse, CO-diverse or route-diverse with tabular and graphical data. |
| Data | Systems: OPEDS There may be a desire to know the relationship of one system assembly to another and the diversity of one system assembly to another. |
| Spatial Embodiment | 1) Spatial provides a 'diversity check' trace function to allow user to determine 'sheath level' diversity. The diversity check provides a visual (via highlights) indicator as well as trace results dialogs showing 'common' paths in the trace. 2) A diversity check can also be launched from FAS. FAS provides a set (pair) of logical fibers (cable name(s), strand(s)), each terminating loc/clli (or area #), and LGX port data (this may need to be accessed via connector type 2). |

Scope for FAS:

Spatial can provide a list of strand and FAS can provide the list of associated equipment, shelf and slot for that strand.
FAS can allow the user to launch spatial for given equipment. FAS can send the list of strands based on the scid, which allow spatial to display the ring.
Based on 6.2.5.5 user can enter diversity information for a piece of equipment.
Scenario:

User selects location in Spatial. User navigates to FAS and looks up fiber information for equipment at that location. In Spatial user then runs a diversity check for the fiber strand(s). Once user determines diversity type user enters that type in the FAS equipment screen. Diversity type is from LOV or "other" which allows the user to manually enter some other value.
Data elements that should be displayed on the FAS screen:

Equipment (from FAS equipment database), feeding fiber strand(s), and diversity type
Source for all the data elements which are required for this embodiment:

FAS equipment database (LEIM and TIRKS), Spatial Age, User

6.2.8.3 Assign Restoration Priority for a System Assembly

| | |
|---|---|
| Embodiment | Assign a restoration priority for a System Assembly. |
| Description | System can assign a priority based on a maintained list of values. This priority number |

-continued

| | |
|---|---|
| | can be used when the restoration order is generated in the event of an emergency restoration (see 6.2.3.6 Generate Restoration Order Based On System/User) |

6.2.8.4 Assign Reservation for a Fiber Strand

| | |
|---|---|
| Embodiment | Assign Reservation for a Fiber Strand |
| Description | User can reserve fiber for a LRS. The word Reserve is now replaced with the concept of "Interest." An interest in a strand is established via a LRS. |

User can establish an "interest" in a fiber strand via a LRS. An interest indicates that the strand may be used in the future if the LRS is executed, but there is not guarantee that the strand can be used, thus it is not reserved. Interests are only created from within FAS, not from LEIM, TIRKS, or any other system.
Data elements that should be displayed on the FAS screen:

See LRS and 6.2.2.3

6.2.8.5 Provide Numbering Administration Tools
6.2.8.5.1 Add System Numbering Tool

| | |
|---|---|
| Embodiment | Add an automated DLC/mux numbering tool |
| Description | The system can provide a means to administer DLC system and mux numbers. FAS can stored existing system numbers and planned system numbers by equipment type. FMT can not attempt to predict next usable number. |

Scope for FAS:

Four alpha numeric characters after the # symbol is the system number. FAS should develop a system number maintenance module. System number may be unique for a given WC. FAS should provide mechanism to propose new system number and display existing system numbers.
Numbering scheme is determined by equipment type; system helps user understand which numbers within a scheme are in use and which ones are available
Scenario:

During the LRS lifecycle the user determines that a new system must be created. User enters appropriate equipment data (including category) in the LRS and then wants to know what the system number should be, so he clicks a "find system number" link.
Data elements that should be displayed on the FAS screen:

Equipment type, used system number(s), next available system number
Source for all the data elements which are required for
this embodiment:

LEIM

6.2.8.5.2 Add SCID Administration Tool

| | |
|---|---|
| Embodiment | Add a tool for managing SCID assignments |
| Description | The system can provide a means of administering SCID's for districts and throughout the company. For a given state. FAS can store all the valid SCIDs and also can be able to find the next SCID. FAS can provide a mechanism to assign a SCID based on the FACILITY PLANNERS request. |

Rule for SCID's may be as follows:
6 characters, N1–N6.
N1 indicates company division, typically N for network
N2 indicates state
N3–N5 is alphanumeric
N6 designates ring type (L, G, R, P for Loop, Smartring . . . )
Source for all the data elements which are required for
this embodiment:

Existing SCIDs from TIRKS and LEIM

SCID Log Tool—General

FMT can provide users the ability to view SCID assignments, select a new SCID assignment, and to unassign a SCID that has not been or no longer used. FMT can also provide Staff Support persons the ability to establish rules for SCID assignments. SCID can have a Status transition as follows:
SCID Status Codes:

| CODE | DESCRIPTION |
|---|---|
| N | New, never assigned or used - available for assignment |
| H | Hold, do not assign |
| A | Assigned |
| W | Working/Used |
| X | Deleted - not found working |
| U | Unassigned |

SCID Status Transition:

| FROM STATUS | TO STATUS | ACTION | DESCRIPTION |
|---|---|---|---|
| <null> | N | ADD SCID | Process that adds SCIDs to log to make available for use. |
| <null> or N | H | HOLD SCID | Manual DBA addition of SCIDs to Log or status change. |
| <null>, N, U, or X | A | ASGN SCID | Assigned for use. SCID added or updated in SCID_LOG. If SCID had a status of U or X, the log data is stored in SCID_History before update. |
| any | W | UPDATE SCID LOG | Batch process run periodically to determine if SCID is still in FMT data. SCID is found in FMT (LEIM or TIRKS) data. SCID added or updated in SCID_LOG. |
| A | U | UNASGN SCID | User that initially assigned SCID determines that it is not required and Unassigns it. SCID Status is changed from 'A' to 'U' and status date updated. |
| W | X | UPDATE SCID LOG | Batch process run periodically to determine if SCID is still in FMT data. SCID is not found in FMT (LEIM or TIRKS) data. |

SCID Log Tool—ASGN SCID

| | |
|---|---|
| Embodiment | Provide New SCID Assignment |
| Description | User can select ASSIGN SCID function that can allow input parameters to be selected or changed and the next available |

-continued

| | |
|---|---|
| Data | SCID to be assigned. The next SCID assignment that meets the parameters can be assigned the lowest unassigned SCID. The data to be selected by the user to determine next SCID assignment is a follows: 1) State 2) District 3) SCID Type The data to be possibly captured for the SCID assigned is: 1) User 2) Date 3) LEG Installation ID 4) Equipment 5) Authorization Number 6) Address 7) Service Date |
| ASGN SCID Screen | Upon selecting the ASGN SCID function, the user may be presented with an ASGN SCID screen. Item are as follows: 1 ) State - drop-down of 9 BST States defaulted to user's State 2) District - drop-down of current BST Districts for the selected State defaulted to user's District 3) Type - drop-down of valid SCID type codes & descriptions from LOV_SCID_TYPE table Upon selection of the above, the system can select the next available SCID for assignment (see SCID assignment) and present the SCID to the user. The user can then optionally enter: 1) LEG Installation ID 2) Equipment 3) Authorization Number 4) Address 5) Service Date Upon selecting an "ASGN SCID" button, the SCID can be assigned. Upon assignment the ASGN SCID button can change to UPDATE SCID. The user may update any of the 5 optional items and hit the UPDATE SCID button to save the changes. (Note: Once assigned, the State, District, Type codes may not be changed.) |

SCID Assignment:
  FMT can create a new SCID by:
Select from SCID_Log any SCID with a first character, second, third and last characters matching user selection and SCID assignment rules:
  1) status of New. If found, use this SCID. If none found then,
  2) status of Unassigned and a Status Date where 'today' minus Status Date in days is greater than LOV_FMT_PARAMS: SCID_Unasgn_Age. If found, use this SCID. If none found then,
  3) status of Deleted and a Status Date where 'today' minus Status Date in days is greater than LOV_FMT_PARAMS: SCID_Deleted_Age. If found, use this SCID. If none found then,
  4) assign a new SCID:
  A new SCID is formed by concatenating SCID_First_Char+SCID_Second_Char+SCID_Third_Char+(SCID_ASGN: SCID_Num+1)+SCID_Last_Char Using SCID assignment rules (see logical data model embodiments).

The FMT system may assign a new SCID "on the fly" or develop a batch process to add new SCID to the log on a periodic basis (ADD SCID function).

SCID Log Tool—VIEW SCID LOG

| | |
|---|---|
| Embodiment | Display SCID Data From Log Based On User Specified Attributes |
| Description | User can select for display the SCID log data by using various filters. State; District; Equipment; Status. |
| Data | See Logical Data Model Embodiments for SCID_LOG. |

SCID Log Tool—UNASGN SCID

| | |
|---|---|
| Embodiment | Change The Status On A SCID From Assigned To Unassigned |
| Description | User can input a SCID or select a SCID from a generated list of SCIDs with Status = Assigned created by the current user. Data for the SCID is displayed on the screen and a UNASGN Button allows the user to Unassign. System changes Status to 'U' for unassigned and records the date. The Unassign function can only be performed by the user that Assigned the SCID. |
| Data | N/A |

SCID Log Tool—UPDATE SCID LOG

| | |
|---|---|
| Embodiment | A Process To Update SCIDs in the SCID Log |
| Description | This process can periodically update the SCID status in the SCID Log. This may require a comparison of SCIDs actually in FMT and the Log. For SCID in the Log with a Status of Working that are not found in FMT, the status is updated to Deleted. For SCIDs that are found in FMT, then status is updated to Working. |
| Data | SCID_Log Status |

6.2.8.6 Enhance Existing Database, Posting & Viewing Tools

| | |
|---|---|
| Embodiment | Enhance the existing OPEDS Facility Management database, posting & viewing tools |
| Description | The system can support additional fiber functionality: Inter-wire center connector, fiber splice feature, graphical location of fiber in Underground records, and CSA/Equipment Location features. |

| | |
|---|---|
| Spatial Embodiment | Place holder: List of OPEDS facility features to load to FMT: COMPL: complements for all loaded features CONDUIT: all 4c & 45c DRAWING INDICATORS: all FOREIGN POLE: (intelligent only) TBD FIBER: all MANHOLE: all 4c & 45c ** Equipment Location**: create for each unique area # in MX MX: see above for reference POLE: all TERM (distribution terminal table): If fed by fiber cable XCONN: any with an OUT count ROUTE MANHOLE: all ROUTE CONDUIT: all FIBER SPLICE: all XWC SPLICE: all |

6.2.8.7 Develop Tools to Populate the Facility Data Enhancements

| | |
|---|---|
| Embodiment | Develop tools to populate the facility data enhancements |
| Description | Develop tools to automatically populate the facility data enhancements and to provide manual effort to populate remaining data that cannot be accomplished mechanically |

6.2.8.8 Develop Tools to Add Existing Fiber and CSA Locations

| | |
|---|---|
| Embodiment | DEVELOP TOOLS TO ADD EXISTING FIBER AND CSA LOCATIONS AUTOMATICALLY/MANUALLY |
| Description | Develop tools to add existing fiber and CSA locations, along with key structure and connectivity features/attributes to the FMT SDO Database, both automatically from OPEDS converted wire centers, and manually for non-OPEDS converted wire centers. |
| Spatial Embodiment | Provide capability to place 'planned existing <feature>' whenever necessary in addition to creating from OPEDS data via SDL. SDL creates Equipment Locations from MX data (see note above in 6.2.8.6) |

If no western state fiber conversion is going to take place, additional scripts can be required to allow users to import ArcView files.

6.2.8.9 Allow User to Perform Fiber Traces

| | |
|---|---|
| Embodiment | Allow user to perform fiber traces |
| Description | The user should be able to perform a trace to a fiber by entering a given attribute or criteria for the fiber. |
| Spatial Embodiment | Multiple trace functions are available to user via selection from physical sheath or user input. Route trace, highlight route, diversity check, fiber cut location, etc. |

6.3 Planning Layer Functionality 6.3.1 LRS Overview

Planning may occur in many fashions and by many names. In order to avoid confusion, this document may use some new terms to describe the planning process.

Figure 9:
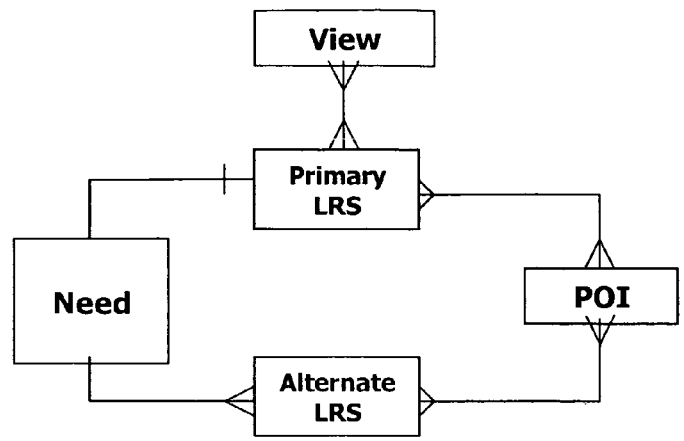
FIG. 9 depicts the relationships between exemplary components in a Location Relief Strategy (LRS).

The basic planning unit is the Location Relief Strategy (LRS). When creating a LRS, the resource planning system may automatically create or allow the user to select an existing planning Need. Multiple Alternative LRSs may be created for one Need. While many alternative relief strategies may or may not exist, according to some embodiments of the present invention, only of the LRSs is defined as a primary LRS for a need, with one or more of the other LRSs defined as alternate LRSs for the need. A LRS may be related to one or more Point Of Interest (POI). LRSs may be grouped into a View. FIG. 9 demonstrates the relationship between these concepts.

A POI is a particular location where a need exists or is predicted. POI is a geographic location, which may be a point, a polygon, or a group of noncontiguous points and/or polygons. For example, an existing building needs additional fiber capacity or a customer purchases a service, which requires diversification.

A LRS describes a means of fulfilling a need at one or more particular POIs at a given time. For example, a LRS may call for placing 2000 ft of 48-strand fiber or for the rearranging of existing fiber splices. Whenever an alternative LRS exists, one of the LRS's can be designated as Primary. By default, when a search is executed, only those LRS's, which are designated as Primary, are to be considered for the search.

A View is a collection of Primary LRS's (by default, but a View may be a collection of Primary or Alternative LRS's with an override). Examples of Views could include a three year construction plan View, a route View, a wire center View, etc. Headquarters staff can have the ability to create default View definitions, but individual users can also have the ability to create View definitions.

Figure 10:
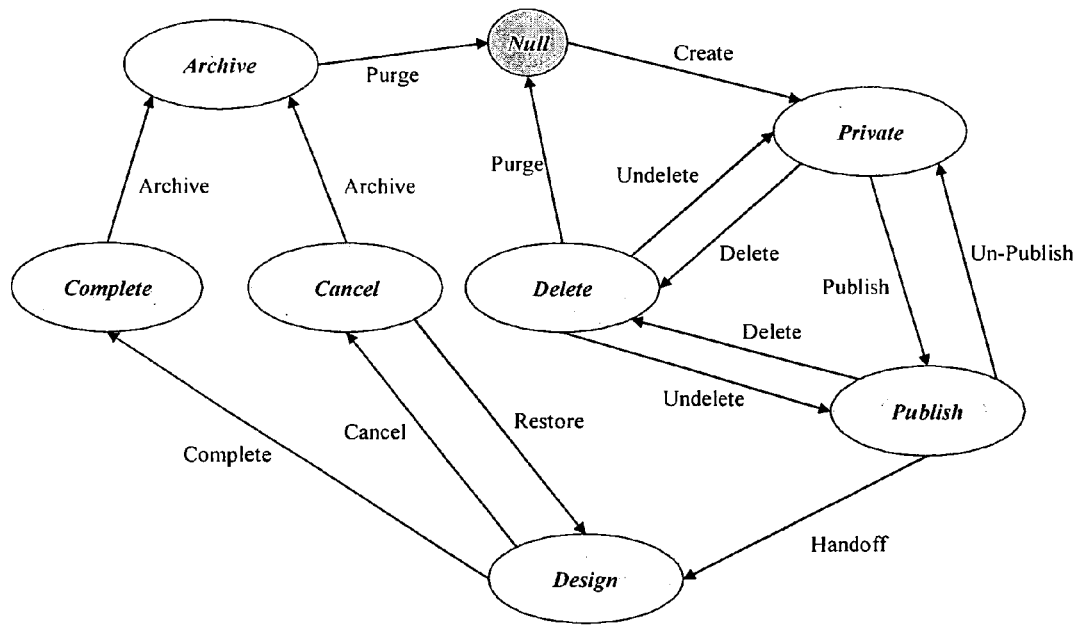
FIG. 10 is a state transition diagram that depicts the functions of a LRS within a FMT.

FIG. 10 describes in detail the functions of LRS within FMT.

6.3.1.1 LRS States

| State | Definition |
|---|---|
| PRIVATE | A LRS is initially created in the Private state. Only the creator or a super-user can see it and modify a LRS in this state. |
| PUBLISH | In this state, all users can see the LRS in a Tabular list and in Spatial views. Any user with update permission can view, select, and modify it. Any user without update permission can view the LRS and add a LRS Note, but can not modify the LRS. Any LRS (primary or alternate) can be published from the Private state. Un-Publish a LRS and change a Publish LRS back to Private state. |
| DELETE | Any user with update permission may delete a LRS from the Publish state. A LRS in this state does not appear in |

-continued

| State | Definition |
|---|---|
| | normal Tabular list or Spatial views. Any user with update permission may select a view of Deleted LRS from the previous Publish state and may select and clone or Undelete a Deleted LRS (back to Publish state). Only the LRS creator or a super-user can view Deleted LRS from the previous Private state and may select and clone or Undelete a Deleted LRS (back to Private state). An Alternate LRS with the Primary LRS in Design state can not be Undeleted. A LRS can not be modified in the Delete state. |
| DESIGN | When a user elects to hand-off the LRS to PMTool, the LRS State changes to Design upon successful hand-off. Only a Primary LRS may be handed-off. All users can see the Design state LRS in Tabular list and Spatial views. Any user with update permission can view, select, and modify it. Modification can trigger a PM Tool update. Any user without update permission can view the LRS and add a LRS Note, but can not modify the LRS. Once a LRS is in the Design state, it can no longer be deleted, but it may be canceled. |
| CANCEL | Only a LRS in Design state may be canceled. Any user with update permission may cancel a LRS. A LRS in this state does not appear in normal Tabular list or Spatial views. Any user with update permission may select a view of Canceled LRS and may select and Restore a Canceled LRS back to the Design state. A LRS can not be modified in the Cancel state. |
| COMPLETE | When the authorization associated with the PMTool task is completed, FMT can complete the LRS. In the Complete state all users can see the LRS in a Tabular list and in Spatial views. The LRS may no longer be modified. A user with update permission may select the LRS for cloning. Any user may add a LRS Note. |
| ARCHIVE | The FMT system can automatically archive a LRS 'x' days after the LRS is completed. This value can be set in a FMT Parameters table. A user with update permission may manually archive the LRS. In the Archive state, the amount of information associated with the LRS is reduced and can not be undone. The LRS may no longer be modified. A user with update permission may select, via a View Archive function, the LRS for view and cloning. LRS Notes can no longer be added. |
| <null> | The FMT system can automatically purge a LRS 'x' days after the LRS is archived or deleted. The number of days can be set in a FMT Parameters table, and can be different entries for Archive Purge and Deleted Purge. Any user with update permission may select a view of Deleted LRS from previous state of Publish and may select and Purge a Deleted LRS. Only the creator or super-user may select a view of Deleted LRS from previous state of Private and Purge a selected LRS. |

6.3.1.2 Primary LRS State Transitions

| From State | To State | Action | Notes |
|---|---|---|---|
| <null> | Private | User: LRS Create | The LRS Create function creates a LRS in the Private state. |
| Private | Publish | User: LRS Publish | The LRS Publish function can change a LRS to the Publish state. |
| Publish | Private | User: LRS Un-Publish | The LRS Un-Publish function can change an LRS to the Private state from the Publish state. |
| Private or Publish | Delete | User: LRS Delete | The LRS Delete function can change an LRS to the Delete state from the Private or Publish states. |
| Delete | Private or Publish | User: LRS Undelete | The LRS Undelete function can change an LRS to its previous state (Private or Publish) from the Delete state. An Alternate LRS with the Primary LRS in Design state can not be Undeleted. |
| Delete | <null> | System: LRS Purge User: LRS Purge Deleted | The system LRS Purge function or user LRS Purge Deleted function can completely remove a LRS in the Delete state from the FMT system. |
| Publish | Design | User: LRS Hand-off | The LRS Hand-off function can change an LRS to the Design state from the Publish state if successfully handed-off to PM Tool. |
| Design | Cancel | User: LRS Cancel | The LRS Cancel function can change an LRS to the Cancel state from the Design state. |
| Cancel | Design | User: LRS Restore | The LRS Restore function can change an LRS to the Design state from the Cancel state. |
| Cancel | Archive | System: LRS Archive User: LRS Archive | The LRS Archive function can change an LRS to the Archive state from the Cancel state. This function can be automatically initiated by the FMT system or may be user initiated. |
| Design | Complete | System: LRS Complete | The system LRS Complete function can change an LRS to the Complete state from the Design state when the authorization is shown as closed in PMTool. |
| Complete | Archive | System: LRS Archive User: LRS Archive | The LRS Archive function can change an LRS to the Archive state from the Complete state. This function can be automatically initiated by the FMT system or may be user initiated. |
| Archive | <null> | System: LRS Purge | The system LRS Purge can completely remove a LRS in the Archive state from the FMT system. |

6.3.1.3 Alternate LRS

Figure 11:
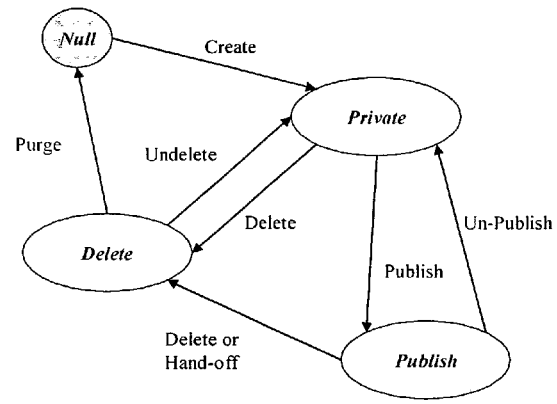
FIG. 11 is a state transition diagram that depicts functions of an alternate LRS within a FMT.

FIG. 11 describes in detail the functions of an Alternate LRS.

Alternate LRS State definitions are the same as Primary, but are limited to Private, Publish, and Delete.

6.3.1.4 Alternate LRS State Transitions

| From State | To State | Action | Notes |
|---|---|---|---|
| <null> | Private | User: LRS Create | The LRS Create function creates a LRS in the Private state. |
| Private | Publish | User: LRS Publish | The LRS Publish function can change an LRS to the Publish state. |
| Publish | Private | User: LRS Un-Publish | The LRS Un-Publish function can change an LRS to the Private state from the Publish state. |
| Private or Publish | Delete | User: LRS Delete | The LRS Delete function can change an LRS to the Delete state from the Private or Publish states. Also the LRS Hand-off function can change all Alternate associated LRS to Delete. |
| Delete | Private or Publish | User: LRS Undelete | The LRS Undelete function can change an LRS to its previous state (Private or Publish) from the Delete state. An Alternate LRS with the Primary LRS in Design state can not be Undeleted. |
| Delete | <null> | System: LRS Purge function or user User: LRS Purge Deleted | The system LRS Purge function or user LRS Purge Deleted function can completely remove a LRS in the Delete state from the FMT system. |

6.3.2 Provide Location Relief Strategy Administration Tool

6.3.2.1 Create a LRS and Associated Administrative Data

| | |
|---|---|
| Embodiment | Provide User with the ability to create a LRS and associated administrative data |
| Description | User should be able to create a Location Relief Strategy using the tools available. In order to create a LRS, the user should have set some sort of location - a start and an end point. A user should also be able to create administrative data to go along with the LRS. This administrative data can be such things as creator name, creation date of an LRS, last modified date, status type, etc. |
| Data | See Data Embodiments: LRS & Hand-Off Package |
| General Discussion | LRS overview - new concept/feature called NEED. This is the highest level of LRS hierarchy. A NEED may be satisfied by one or more LRSs. An LRS may have one or more solutions. However, according to some embodiments of the present invention, only one LRS may be defined as a primary LRS, and all other LRSs are defined as alternatives. In some other embodiments of the present invention, more than one LRS may be defined as a primary LRS for a need. |
| Spatial Embodiment | <NEED and LRS is initiated/created in FAS. LRS creation in Spatial is instigated by a call from FAS (LRS cannot be created within Spatial; it is first be created in FAS)> there is a function in FAS that allows user to kick off Spatial to create a LRS in spatial; FAS passes us needed admin info (unique id, user, etc,) to create new 'folder' in our tree view. User identifies point(s) of interest, etc. |
| Spatial to FAS I/F Scenario: | Launch FAS' 'Create LRS web page'; |

User selects location from Spatial and selects "Create LRS"
FAS web page opens and user creates new LRS
Data elements that should be displayed on the FAS screen:

Location(s), CSA, Address, CLLI, GLC, Easement_ID, Easement Size (x,y in feet), Easement Comments, Text of Easement and Restrictions, Power Embodiments, Point(s) of Interest, Fiber Strand, Fiber Connectors, Service Date, Customer Name, Customer Contact, Contact Info, Trigger, Prog Codes, All LecIII data in LecIII interface, All PM Tool data in PM Tool interface, All TEOPS data in TEOPS interface, Xbox(s) associated with LRS, Xbox snapshot (Xbox FG/SG summary screen at time associated with LRS), Contact Name, Contact Reason, Equipment Data (see Appendix A1.3), New Development Data

6.3.2.2 Create Alternative LRS and Associate for a Route

| | |
|---|---|
| Embodiment | Provide User with the ability to create an alternative Location Relief Strategy associated for a route. |
| Description | Users should be able to create an alternative LRS for a particular route. This is can be as a fallback or just an alternative for a route. The user can set the main LRS as primary if he/she wants and the second or third as alternatives. At least one of the LRS created by the user must be a Primary; any others created would be alternative. |
| Data | See Data Embodiments: LRS & Hand-Off Package |
| Scope for FAS: | |

Manage creation of alternative LRS and changing of Primary and Alternative statuses
Scenario:

While working with a LRS user decides to create an alternative. User selects "Create Alternative LRS" link. The system asks if the user wants to clone an existing LRS. User selects Yes. A new LRS is created using all of the same data as the selected LRS.
Data elements that should be displayed on the FAS screen:

Same data as Primary LRS

6.3.2.3 Modify LRS Administrative Data

| | |
|---|---|
| Embodiment | Provide the appropriate user the ability to modify the administrative data of a LRS. |
| Description | Administrative Data includes data such as date LRS was created, status of LRS, creator, etc. It may include all data that can be administered about the LRS, except for the LRS itself. The user who created the LRS, the user's alternative, and/or a super user have permissions to modify the administrative data of a LRS. A user is able to modify an LRS till the handoff state. |
| Data | See Data Embodiments: LRS & Hand-Off Package |

Scenario:

LRS decides to modify existing LRS. User selects "Modify LRS" link. Editable fields are no longer write protected and user can modify and then save.
Data elements that should be displayed on the FAS screen:

Same as Primary LRS

6.3.2.4 Save and Retrieve LRS and Administrative Data

| | |
|---|---|
| Embodiment | Provide user with the ability to save and retrieve LRS (Location Relief Strategy). |
| Description | User can save unfinished LRS and retrieve them when needed. The users who have permission set can save a LRS and retrieve it later to make changes or additions. Once the user has created a LRS, he/she can have the option to "publish" proposed routes or maintain it as "private". Published routes are available for viewing by other FMT users. Private routes are only available to the owner/author as well as the administrators, so that they can help with support issues. This is provided only if a minimal amount of information (such as POI (point of interest)) has been entered. |
| Data | See Data Embodiments: LRS & Hand-Off Package |
| System Behavior | At a user's request, FMT can save the current LRS within its database. Users can retrieve a LRS based on search criteria or from a list. FMT can also provide the ability to retrieve the saved LRS by selecting the file name from a list. This data is corporate data and should be stored in corporate server. |

| | |
|---|---|
| Users | Loop Capacity Mangers, Long Term Planners, Infrastructure IOF Planners. |

Scope for FAS:

Manage searching of LRS based on tabular data; display LRS upon request from Spati
Scenario:

User searches for LRS based on key word. A list of matching LRS's are returned. User selects desired LRS, LRS screen is displayed. Data elements that should be displayed on the FAS screen:

Same as Primary LRS.

6.3.2.5 Logically Delete LRS and Associated Data

| | |
|---|---|
| Embodiment | Logically Delete LRS and Associate Data |
| Description | User should be able to delete a LRS and it's associated administrative data, which can logically perform a delete. The only users allowed to do this are the creators of the LRS, its alternate, and a super user. The data can be deleted from the user's perspective, but can remain in storage until purged. User can decide to delete LRS from either Spatial or FAS Web; upon deletion in one application the LRS is deleted from the other. |
| Users | Loop Capacity Mangers, Long Term Planners, Infrastructure IOF Planners. |
| Spatial Embodiment | Logical delete is supported. Life cycle closures, i.e., via PMTool, is managed by FAS. FAS sends update to Spatial to logically delete LRS/data. Manual deletes, i.e., deleted by a user, can be performed in either FAS or Spatial (PLEASE CONFIRM). In this case, system in which the delete is initiated sends update to the other system to perform logical delete of LRS/data. |

Scope for FAS:

Manage the LRS lifecycle.
Scenario:

User decides that a particular LRS is not required and should be deleted; User selects delete; LRS is changed to the Deleted state.

6.3.2.6 Purge LRS and Associated Data

| | |
|---|---|
| Embodiment | Purge LRS and Associated Data |
| Description | LRS and their associated data can have a logical delete flag associated with them so that a corporate purge process can purge periodically based on a BST defined criteria. |
| Data | Existing Location Relief Strategies saved by user groups |
| Spatial Embodiment | Purge interval & instruction is maintained in FAS. FAS |

-continued notifies Spatial to Purge
(physically delete) LRS/data.
Scope for FAS:

Manage the LRS lifecycle.
Scenario:

After an LRS has been in the Archive state for 'x' days it can
be purged.

6.3.2.7 Create, Modify, and Delete LRS Notes by User

| Embodiment | Create, Modify, and Delete LRS Notes by User |
|---|---|
| Description | User can create, modify, and delete LRS notes. The LRS can go through the process of create, publish/un publish, handoff, complete, delete, and purge. Once an LRS has been published any user with access to FMT can create and add LRS Notes. LRS notes cannot be deleted; as a user adds a note, the user's name, ID, and the date/time stamp are recorded. A LRS note should be viewable in the FAS LRS screen. |

| Data | Data Description | Source (Primary, Secondary) |
|---|---|---|
| User Name | User's First, Middle, and Last Name | Siteminder |
| User ID | UID | Siteminder |
| Date/Time | Date | System |
| Comment | Long text | User |

Scope for FAS:

Allow user to create LRS notes.
Scenario:

User selects LRS. User selects "Add LRS Note" and enters
desired information.

6.3.2.8 Provide LRS Reports by User Selection Filters

| Embodiment | Provide LRS Reports by User Selection Filters |
|---|---|
| Description | User can filter out and select a particular LRS or search for one using filters that show what they would like to view. |
| Data | See Data Embodiments: LRS Search |

Scope for FAS:

Allow user to search for LRS based on key words. Many, but not all
fields, should be searchable. To search for deleted and canceled LRS's
the user should explicitly specify that the search should include
those LRS's. Private LRS's are displayed with minimal data, but users
other than the creator cannot see any additional data.
Scenario:

User selects LRS search screen. User enters search criteria. A list
of LRS's is displayed.
Data elements that should be displayed on the FAS screen:

LRS ID, Scope of Work, Location(s), Xbox(s), Primary/Alternative,
Service Date, Trigger, LRS status (published, handed off, etc.)

6.3.2.9 Close an LRS Manually

| Embodiment | Close an LRS Manually |
|---|---|
| Description | User can be able to close an LRS manually |

Scope for FAS:

Manage LRS Life Cycle
Scenario:

Once a LRS has been handed off the user decided that the LRS should
enter the closed state (for example, there is no EWO for the LRS).
The LRS is canceled and is no longer shown as an active LRS.

6.3.2.10 Alert Overage Service Dates on LRS

| Embodiment | Alert Overage Service Dates on LRS |
|---|---|
| Description | User can be provided with an alert of overage LRS x days after planned service date |

| Data | Data Description | Source (Primary, Secondary) |
|---|---|---|

Scope for FAS:

Modify the Main Screen to create a
notification for Overage LRS.
Scenario:

LRS has a service date of X. On day X + 30 the creator of the LRS
logs into FMT and finds an alert that there is an overage LRS.
The user selects the link to the list of overage LRS's and selects the
LRS. The user then modifies the service date so that the LRS is no
longer overage.
Data elements that should be displayed on the FAS screen:

LRS ID, Scope of Work, Location(s), Xbox(s), Service Date
Source for all the data elements for this embodiment:

FAS

6.3.2.11 Dependent LRS Clone

| Embodiment | Dependent LRS Clone |
|---|---|
| Description | User can build a new LRS upon one or more LRS's. The status of the facilities which are proposed in the preceding LRS's is changed to "proposed existing." The tabular data includes links to the LRS's on which this LRS is dependent. When a new LRS is cloned from another LRS on which it is to be dependent, all data is copied, and it is the user's responsibility to choose which data should be deleted. |
| Spatial Embodiment | When a user is viewing a LRS, the facilities on which it is dependent are shown as "proposed existing" |

Scope for FAS:

Manage LRS cloning and dependent LRS links.
Scenario:

User selects LRS and selects "create clone". User then opens
cloned LRS and enters other LRS's on which it is dependent. FAS -continued shows these LRS's, along with their service dates, in the LRS screens
Data elements that should be displayed on the FAS screen:

Preceding LRS's and service dates
Source for all the data elements which are required for this embodiment:

FAS

6.3.3 Provide Graphical and Tabular Planning Tools

6.3.3.1 Generate LRS Schematics from Existing Fiber Data

| | |
|---|---|
| Embodiment | Provide user the ability to generate a LRS schematic from existing fiber data |
| Description | Using the graphical tools in FMT, users with the appropriate permissions can generate a LRS schematic from existing fiber data storage. |
| Spatial Embodiment | View that contains only data associate with (to) an LRS. |
| Embodiment | Provide drawing tools and symbols to denote all necessary equipment and facility items within the Location Relief Strategy (LRS). |
| Description | Symbols can be consistent with existing .DGN and .LND symbology. |
| Data | See Data Embodiments: LRS & Hand-Off Package |
| System Behavior | Users can have a palette of symbols that represent facilities and landbase features to select from in order to draw a LRS for future fiber optic routes. |
| Users | Loop Capacity Mangers, Long Term Planners, IOF Planners. |
| Spatial Embodiment | Provide placement of planned & planned existing features, complements, annotation, etc. Attribution of features can be possible but not enforced or validated. |

6.3.3.2 Provide Drawing Tools, Symbols, and Attribute Creation Functions

| | |
|---|---|
| Embodiment | Provide drawing tools and symbols to denote all necessary equipment and facility items within the Location Relief Strategy (LRS). |
| Description | Sybols can be consistent with existing .DGN and .LND symbology. |
| Data | See Data Embodiments: LRS & Hand-Off Package |
| System Behavior | Users can have a palette of symbols that represent facilities and landbase features to select from in order to draw a LRS for future fiber optic routes. |
| Users | Loop Capacity Managers, Long Term Planners, IOF Planners. |
| Spatial Embodiment | Provide placement of planned & planned existing features, complements, annotation, etc. Attribution of features can be possible but not enforced or validated. |

6.3.3.3 Document Future Location Relief Strategy, and/or DLE locations

| | |
|---|---|
| Embodiment | Provide users with the ability to document Location Relief Strategy and/or DLE equipment. |
| Description | The user can have an option to draw/document a future fiber route and DLE equipment using tools provided in FMT. Users can also either set each LRS as private or publish them. |
| Data | See Data Embodiments: LRS & Hand-Off Package |
| System behavior | Users can have a variety of tools to select from and can document and/or draw a future LRS, depending on user permissions. |
| Users | Loop Capacity Mangers, Long Term Planners, IOF Planners. |

6.3.3.4 Retrieve and Display LRS

| | |
|---|---|
| Embodiment | Provide users with the ability to retrieve LRS with a user- defined job description and display on screen. |
| Description | The user can have the option to "publish" LRS or maintain it as "private." Published routes are available for retrieving and displaying on screen by other FMT users. Private routes are only available to the owner/author. |
| Data | See Data Embodiments: LRS & Hand-Off Package |
| System Behavior | FMT can also provide the ability to retrieve or search for a LRS from its database or from a list. This data is corporate data and should be stored in corporate server. |
| Users | Loop Capacity Mangers, Long Term Planners, IOF Planners. |

6.3.3.5 Display Multiple LRS Graphically

| | |
|---|---|
| Embodiment | Provide users with the ability to retrieve multiple LRS with a user- defined job description and display them on screen. |
| Description | Users can display multiple LRS at one time in order to compare more than one at a time, etc. |
| Data | See Data Embodiments: LRS & Hand-Off Package |
| System Behavior | FMT can also provide the ability to retrieve or search for a LRS from its database or from a list. After selecting the LRS desired, FMT can retrieve the LRS and display it on screen. The user can select another LRS or search for another in order to view more than one at a time. This data is corporate data and should be stored in corporate server. |

| | |
|---|---|
| Users | Loop Capacity Mangers, Long Term Planners, IOF Planners. |
| Spatial Embodiment | User can select one or more LRS to view. User desires to be able to visually distinguish one LRS from another. User can link from facilities associated with one LRS and see the details in FAS |

6.3.3.6 Copy Existing LRS to New LRS

| | |
|---|---|
| Embodiment | Provide user with the ability to copy an existing LRS into a new LRS. Described above |
| Description | Users can take a previous LRS already created within FMT and copy it to a new LRS in order to use it further or make additions/changes. This copy can be used as a brand new LRS, as an alternative to the original in addition to the original, or converted to "assumed existing" for a new LRS. |
| Data | See Data Embodiments: LRS & Hand-Off Package |
| System Behavior | The system can take the original LRS and copy it to a new page. |
| Users | Loop Capacity Mangers, Long Term Planners, IOF Planners |

6.3.3.7 Modify LRS

| | |
|---|---|
| Embodiment | Provide user with the ability to modify a proposed LRS |
| Description | Only creators/designers can modify LRS. In addition, FMT can store an audit trail of modifications to each LRS. |
| Data | See Data Embodiments: LRS & Hand-Off Package |
| System Behavior | Users retrieve specific LRS through the on-screen interface, and edit or delete them. |
| Users | Loop Capacity Mangers, Long Term Planners, IOF Planners |
| Spatial Embodiment | Once published, track changes made to LRS by any/all users. Track all state changes. Any LRS (primary or alternatives) can be modified until an LRS reaches the 'build' state. When the primary LRS reaches the 'build' state, alternatives are 'frozen' and cannot be modified. At this point, alternatives could be logically deleted. A primary LRS can be modified until it reaches the 'complete' state (handed off). |

6.3.3.8 Publish LRS

| | |
|---|---|
| Embodiment | Provide users the ability to publish a LRS in order for other users to view and add comments, etc. |
| Description | Users with appropriate permissions can publish a LRS they have created in order for other users to view and add comments and suggestions to them. The original user who created the LRS has the option of publishing the LRS (for everyone to view) or making it private (for no one to view) |
| Data | See Data Embodiments: LRS & Hand-Off Package |
| System Behavior | Users view a LRS that have been set to publish through FMT and its on-screen interface. |
| Users | Loop Capacity Mangers, Long Term Planners, IOF Planners. |

Scope for FAS:

Manage LRS life cycle
Scenario:

User selects private LRS for which he is the owner. User selects "Publish LRS" and LRS is now viewable to other users.
Data elements that should be displayed on the FAS screen:

LRS details
Source for all the data elements which are required for this embodiment:

FAS

6.3.3.9 View LRS and DLE Plans

| | |
|---|---|
| Embodiment | Provide users the ability to view a LRS and DLE |
| Description | Same as embodiment |
| Data | See Data Embodiments: LRS Search |
| System Behavior | Users can view the LRS and DLE associated with it from within FMT for a particular LRS or searching for one. The user can view a LRS according to their user permissions. |
| Users | Loop Capacity Mangers, Long Term Planners, IOF Planners. |

6.3.3.10 View Multiple LRS for Same Geographic Area

| | |
|---|---|
| Embodiment | Provide users with the ability to view multiple Location Relief Strategies for same geographic area. |
| Description | Same as embodiment |
| Data | See Data Embodiments: LRS & Hand-Off Package |
| System Behavior | Users can view multiple Location Relief Strategies for the same geographic area. The LRS is distinguishable from one another. The user may have one |

| | |
|---|---|
| Users | or more LRS on-screen at any given time. The user can toggle this feature on and off. Loop Capacity Mangers, Long Term Planners, IOF Planners. |

6.3.3.11 Capture LRS Notes Associated with a Graphical Feature by User

| | |
|---|---|
| Embodiment | Capture LRS, and information about the LRS notes -- including the date created and the user that entered the comment. |
| Description | Same as embodiment |
| Data | None |
| System Behavior | The system should provide a freeform field that captures LRS notes. The system should assign the current day's date in a separate field. |
| Users | Loop Capacity Mangers, Long Term Planners, IOF Planners. |

6.3.3.12 Manage Graphical Feature LRS Notes by User

| | |
|---|---|
| Embodiment | Provide user with the ability to manage LRS notes through a graphical feature by user. |
| Description | Same as embodiment |
| Data | Same data as for a tabular note, but associated with planned feature rather than tabular LRS. |
| System Behavior | Users with the access to FMT can enter LRS notes through a graphical feature. The system can output the request by user. |
| Users | All FMT users |

6.3.3.13 Link to Tabular LRS Data at Location Features

| | |
|---|---|
| Embodiment | Provide an internal link to tabular LRS data at location features |
| Description | Same as embodiment |
| Data | None |
| System Behavior | User interface can interact with a link to the tabular planning data. |
| Users | Loop Capacity Mangers, Long Term Planners, IOF Planners |

6.3.3.14 Measure Strand Distances

| | |
|---|---|
| Embodiment | Measure both horizontal and loop distances for a Location Relief Strategy (LRS) |
| Description | System measures strand distance in feet or meters. |
| Data | None |
| System Behavior | User interface can assign appropriate distance based on scale of current on-screen view. |
| Users | Loop Capacity Mangers, Long Term Planners, IOF Planners |

6.3.3.15 Provide View Printing

| | |
|---|---|
| Embodiment | Print all views available on-screen. |
| Description | The FMT client can support all Windows-standard functionality including save, print, cut, paste, copy, portrait, landscape, paper size, etc. In addition, the client can provide the user with the ability to assign a title to the printed document. |
| Data | None |
| System Behavior | System can print all views, including graphical (geographical and facilities) and tabular data of an LRS. |
| Users | Loop Capacity Mangers, Long Term Planners, IOF Planners |
| Spatial Embodiment | Allow user to print graphical representations of LRS |

Scope for FAS:

Print LRS tabular data
Scenario:

User selects Print. LRS details are printed
Data elements that should be displayed on the FAS screen:

LRS details

6.3.3.16 Create an Equipment Plan Associated to a LRS and Location

| | |
|---|---|
| Embodiment | Create an equipment plan associated to a LRS and location. |
| Description | Same as embodiment |
| Data | None |
| System Behavior | System should have the ability for the user to create an equipment LRS that is associated with its location and LRS ID. |
| Users | Loop Capacity Mangers, Long Term Planners, IOF Planners |

6.3.3.17 Create Fiber Strand Plans Associated to LRS and Sheath

| | |
|---|---|
| Embodiment | Create Fiber Strand Plans associated to a LRS and Sheath. |
| Description | Same as embodiment |
| Data | None |
| System Behavior | System should allow users to create fiber strand plans that are associated with Location Relief Strategy and sheath. |
| Users | Loop Capacity Mangers, Long Term Planners, IOF Planners |

| | |
|---|---|
| Spatial Embodiment | User can modify complement data of existing facilities as a part of a LRS. |
| Scope for FAS: | |

FAS captures Fiber interest, but user must manually enter fiber strands in LRS tabular; there is not check between Spatial and FAS for a fiber interest
Scenario:

User opens a LRS. User modifies complements on existing fiber sheaths so that desired fiber strands are energized in the desired manner. User then opens the LRS detail screen and enters the desired fiber strands in the Fiber Strand field. An interest is then created.
Data elements that should be displayed on the FAS screen:

Logical strand
Source for all the data elements which are required for this embodiment:

user

6.3.3.18 Provide Summary Reports

FMT can have the ability to generate summary reports on a company's fiber optic assets. In summary, and at minimum, FMT can produce the following information:

| Report | Description |
|---|---|
| Central Offices by District | The report includes summary information of Central Offices (Wire Centers) by District. |
| Equipment by Central Office | This report includes all fiber-related equipment, and summary information of that equipment, associated with a particular Central Office. |
| Equipment by Remote Terminal | This report includes all fiber-related equipment, and summary information of that equipment, associated with a particular Remote Terminal. |
| Equipment, Plant Assets by Fiber Strand | This report includes all fiber-related equipment, and summary information of that equipment (including location) associated with a particular Fiber Strand. |

6.3.3.19 Create Ad Hoc Monitoring Queries and Reports

| | |
|---|---|
| Embodiment | Create Ad Hoc monitoring queries and reports for specialized and unpredict- able monitoring tasks. |
| Description | Reports may be design and saved from a separate application, but report record selection, previewing, and writing must be integrated into FMTs planning layer. |
| Spatial Embodiment | Provide spatial query capabilities in a user-friendly manner which also prevents users from creating dangerous, unworkable, or "expensive" queries |
| Scope for FAS: | |

Create a means of 1) creating custom reports and 2) saving the requests so that the reports can be reproduced.
This tool should be capable of querying data related to equipment Xbox, CSA, Fiber, and LRS and performing joins. The user should be able to specify field, operator (=, >, <, Like), value (including wildcard), and and/or relationship. This embodiment may not include the ability to perform mathematical operations (sum, percent, etc.) but the user may be able to save the result set so that it may be opened in another application for that purpose.
Data elements that should be displayed on the FAS screen:

As requested by user
Source for all the data elements which are required for this embodiment:

FAS datawarehouse

6.3.3.20 LRS Handoff Package

| | |
|---|---|
| Embodiment | LRS handoff data that describes the Location Relief Strategy must be accessible by other users and the PM Tool. |
| Description | The document must meet the minimum handoff embodiment as described. |
| Data | See Data Embodiment: LRS & Hand-Off Package |
| Scope for FAS: | |

Upon user selecting "handoff" pass appropriate data to PM Tool in a realtime manner.
Scenario:

User selects LRS. User ensures that LRS is 1) primary and 2) published. User then selects "handoff." A PM Tool document is automatically generated.
Alternatively:
User selects a private, alternative LRS. User attempts to generate handoff package. System notifies user that the LRS must first be published and primary, would the user like to do this now; if so then primary LRS "x" must become alternative, proceed?
User selects proceed, and a PM Tool document is automatically generated.
Data elements that should be displayed on the FAS screen:

See PM Tool interface
Source for all the data elements which are required for this embodiment:

FAS

6.3.3.21 Monitor Facility and Fills

| | |
|---|---|
| Embodiment | Monitor facility and fills by generating actual and forecasted network usage. |
| Description | FACILITY PLANNERSs need to generate, view, print reports of actual and fore- casted network usage. Reports should be available at various levels of the network segments. Monthly details: these reports list usage statistics by month for a 12-month period. History and Forecast: these reports list usage statistics by year, as well as disconnects, and defects in the past By service category and architecture: these reports list network usage organized by type of service and system architecture |

6.3.3.22 Provide Inventory Tasks on Equipment/Site Details

| | |
|---|---|
| Embodiment | Provide information for inventory tasks on existing and proposed equipment and site details. |
| Description | FMT must provide access to individual network elements starting from a district at the top of the inventory hierarchy. |
| Scope for FAS: | |

Existing iView functionality for all equipment, not just that which is found in LEIM.
Source for all the data elements which are required for this embodiment:

Same as iView functionality today.

6.3.3.23 Maintain Editing History

| | |
|---|---|
| Embodiment | Maintain editing history of each Location Relief Strategy (LRS) |
| Description | The history can consist of a list of modifiers and the date of their last change. |
| Scope for FAS: | |

Maintain list of users and timestamps of edits
Scenario:

User selects LRS and makes modifications. User's ID and timestamp are recorded and displayed upon request.
Data elements that should be displayed on the FAS screen:

User name, ID, timestamp
Source for all the data elements which are required for this embodiment:

FAS

6.3.3.24 Create "Publish" Pop-Up Window

| | |
|---|---|
| Embodiment | Create a pop-up window every time a user exists his/her planning screen |
| Description | Once the user has finished a session of creating a LRS and wants to exit and log out - the system can pop up a screen and ask the user: Do you want to Publish? The user can click on Yes or No-Remind me in___ days. (The number of days can be determined in the design stage) |
| Scope for FAS: | |

Create Publish "nag screen"
Scenario:

User selects LRS and makes edits. Upon clicking the Save button the user sees a screen which encourages him to publish the LRS.
Data elements that should be displayed on the FAS screen:

Publish "nag screen"
Source for all the data elements which are required for this embodiment:

Publish popup screen with yes/no buttons

6.4 Exit, Session, Recovery, and Cleanup

The FMT client can exit gracefully. Upon exit, the client can perform all necessary cleanup for any locally stored, temporary files. If a user's session is interrupted (due to a power outage for example), the client can have the ability to recover the session.

6.5 Performance

FMT should be pleasant for user to user; the application should respond to users' selections quickly. Action should be taken to ensure that user wait time is minimized. This goes for both the graphical and tabular tools. For example:

1) Interactive task response times—2 seconds or less.
2) Creation of print file in less than 2 seconds (file size 1 MB).
3) Design session startup
   a) From File (4 MB of graphics)—15 seconds or less
   b) From database—1 minutes or less
4) User interface is event driven (users must understand mouse movements).
5) Screen refreshes—3 seconds or less.
6) Standard data queries—3 seconds or less.
7) Minimum mouse travel.
8) Optimum Use of Keyboard and mouse interactions (minimized user movements required).
9) Response time on customer tools as good as standard tools.

7 External System

Purpose: This section describes embodiments for the interfaces between OPEDS and the various external systems that can provide data for FMT. Data transmission in the network can comprise proprietary and open standards and methodologies.

Discussion: Data transmission in the network can involve the use of external system interfaces (or "contracts") that are implemented using one of the following accepted communication standards listed below (see Table 3)

TABLE 3

| Standard Communication Methods | |
|---|---|
| BUFIT | A file-based transmission method, BUFIT is most often used to send multiple records of data in a single file from one system to another. BUFIT transactions are normally associated with batch processes (i.e. each night a system sends all of the current day's order records to the archive system). |
| Navigator[1] | A structure-based transmission method, Navigator is used to send memory structures from one system to another. Navigator transactions are normally associated with interactive processes and can sometimes involve query and response scenarios (i.e. System A sends a request to System B for data, System B interactively sends data back to System A). |
| Orbix | Orbix provides an Object Request Broker (ORB) that behaves like Navigator in that it is most often used for immediate transactions between interactive processes. |

Each contract can have an associated version number (e.g., the first, "0001," the second "0002" and so on). A process can assign the next version number if the contents of the contract change, such as the addition of a new field or possibly a change in the expected contents of an existing field. All programs initiating contracts can tag them with appropriate version numbers. Furthermore, all receiving programs should recognize the version of the contract upon receiving them, and act on that version appropriately. For example, if a contract is on its third version, the program that receives the contract should accept versions 1, 2 or 3 of the contract and process it accordingly.

The OPEDS Process/Data management layer can manage the process of sending all outgoing contracts from an OPEDS point of view as well as receiving all incoming contracts from an OPEDS point of view. This can include storing and retrieving the data for other processes requesting the data.

Specific information for each of FMT's external system interfaces is outlined below.

Note: FMT may acknowledge positive receipt of the data.

7.1 External Systems Communications 7.1.1 LECIII

| | |
|---|---|
| System Overview | Loop Electronics Coordination Version 3 (LEC III) is a mainframe based budgeting, scheduling, forecasting, and tracking toll for DLC equipment. It stores equipment, cost, and scheduling information along with user plans for DLC work with which provides information through a series of reports and an ad hoc query system. |
| Embodiment | The FMT system can establish a "process" type of interface with LEC III in which users can receive data in FMT based upon the entry of LECIII ID. |
| Process | The LEC III ID entered into FMT, a process can then be triggered that can retrieve the data associated with the ID. |
| Response | FMT must acknowledge positive receipt of the data. Data is then displayed in FMT. |

7.1.1.1 LEC III Data Embodiments

| Fields | Description | Data Type | Max. Char. |
|---|---|---|---|
| LEC III ID | Numbering scheme brought over by LEC | | |
| Equipment Type | Product description of DLE equipment | | |
| Quantity | Total number of a specified equipment type | | |
| #System | System number of system to be turned up | | |
| Mode | Mode "I" "II" or "III" | | |
| TR303 Line | DLC type | | |
| #DS1 Req. | Required number of DS1s | | |
| DLC System Type | Manufacturer code | | |
| TR303/Tr008 | Terminal type | | |
| RDSC | Code to be used to order equipment associated with this LRS (may be manually entered or fed from LECIII) | | |

7.1.2 LOC/CLLI

| | |
|---|---|
| System Overview | This system is used to request Area Numbers and CLLI Code Information. Users can retrieve existing CLLI codes or submit requests to CLLIADM via Open Mail to create new codes, modify and delete existing codes. This system is integrated with LEC III. |
| Embodiment | The LOC/CLLI system can transmit the specified data elements to FMT within the agreed upon time frame nightly, including weekends. The data from LOC/CLLI should be a "delta" from the last data set that was indicated as successfully received from FMT. FMT can load the data from LOC/CLLI within a timeframe that is acceptable based on the amount of data received from LOC/CLLI and the necessary business rules. |
| Response | FMT must acknowledge positive receipt of the data. |

7.1.3 LFACS

| | |
|---|---|
| System Overview | LFACS (Loop Facilities Assignment and Control System) - LFACS is an inventory and assignment system for the outside plant (local loop) facilities which support DS0-level (and, in some cases, DS-1-level) services. LFACS maintains an inventory of customer locations and the outside plant facilities, which serve each location. |
| Embodiment | Execute inquiries and reports against the LFACS database from within a FMT session. |

7.1.4 FOX/DSX/TEOPS

| | |
|---|---|
| System Overview | FOX (Fiber Optic Connect System) Module of TEOPS (Telephone equipment processing system) where DSX or LGX assignments are made when new equipment is added to a central office. |
| Embodiment | FOX can transmit the specified data elements to OPEDS within an agreed upon time frame nightly, including weekends. The data from FOX should be a "delta" from the last data set that was indicated as successfully received from OPEDS. The OPEDS system can load the data from FOX and the necessary business rules. |
| Response | OPEDS may acknowledge positive receipt of the data. |

7.1.4.1 FOX/DSX Data Embodiments

| Fields | Description | Data Type | Max. Char. |
|---|---|---|---|
| Bay Panel Jacks LTR | Identifier for the bay and panel | | |

| Fields | Description | Data Type | Max. Char. |
|---|---|---|---|
| Assigned equipment | Type of assigned equipment to a bay | | |
| Assigned location | Location of the equipment | | |
| Unit/shelf | The shelf number | | |
| Circuit | Type of circuit | | |
| TEO | Associated unique identifier used to place equipment | | |
| Note | Remarks field | | |

7.1.5 TIRKS

| | |
|---|---|
| System Overview | Inventories all special circuit and central office information. |
| Embodiment | TIRKS can provide current data within 24 hours. There may be two possible ways to accomplish this: 1) receive bulk data sets from TIRKS on a nightly basis, or 2) establish a "query and response" type of interface with TIRKS in which FMT users can request current data. The first option may be preferable so long as the data is such that TIRKS can provide OPEDS with "deltas" and the amount of data is such that the OPEDS database can store it redundantly. |
| Response | OPEDS must acknowledge positive receipt of the data. |

7.1.6 LEIM

| | |
|---|---|
| System Overview | LEIM (Loop Equipment Inventory Module) Corporate repository of OSP Digital Loop Electronics Data. |
| Embodiment | LEIM can provide current data within 24 hours. There may be two possible ways to accomplish this: 1) receive bulk data sets from LEIM on a nightly basis, or 2) establish a "query and response" type of interface with LEIM in which FMT users can request current data. The first option may be preferable so long as the data is such that LEIM can provide OPEDS with "deltas" and the amount of data is such that the OPEDS database can store it redundantly. The design phase can examine this issue further. The existing LEIM extract for FAS can be modified |
| Embodiment | Allow user to send "update" data for 1 location |
| Description | It is feasible to have a request and response between FMT and LEIM to get a Location update. It could be batch, possibly overnight, using FTP if variances are approved |

7.1.7 BCM

| | |
|---|---|
| System Overview | The Telecommunications Company Construction Management system is a web-based application designed to assist in planning, forecasting, tracking, and controlling capital retirement and maintenance budgets for Central Office Equipment (COE), Outside Plant (OSP), Land and Building (L&B), and Plug-in Authorizations. |

7.1.8 PM TOOL

| | |
|---|---|
| System Overview | PM TOOL (Project Management Tool), serves as a shared database between BST and the Supplier in which all identified engineering embodiments can be logged and then tracked from identification through completion. |
| Embodiment | FMT can establish a "process" type of interface with PM TOOL in which users can receive data in FAS based upon the entry of certain data elements. The FAS tables can contain PM Tool data elements i.e. PM Tool ID, date(s) etc. When the ID or other predetermined data element is entered into FMT, a contract can be triggered that can retrieve the associated data and display the appropriate information in FAS. |
| Process | User generates a hand-off package |
| Response | All LRS data is sent to PM Tool. Once the data is received PM Tool returns a PM Id. |

7.1.8.1 PM Tool Data Embodiments

| Fields | Description | Data Type | Max. Char. |
|---|---|---|---|
| PM Tool Id | PM Tool item# (unique in component) | | |
| LRS Id | FAS LRS ID (unique in FAS database) | | |
| Wire Center | Wire center CLLI for this plan | | |
| Location | Location of plan | | |
| Job Title | User defined short description of work to be performed | | |
| EWO | Auth number fed from PM Tool to FAS Plan | | |

-continued

| Fields | Description | Data Type | Max. Char. |
|---|---|---|---|
| Local Category | Used in PM Tool to categorize work | | |
| Metrics Category | Used in PM Tool to categorize work | | |
| Taper Codes | Numerical representation of an interface to be monitored | | |
| Associated PM Tool | Used in PM Tool to associate other PM Tool items | | |
| Scope | Free form description of work to be performed | | |
| Status | Free form description of status of LRS or handoff document to be performed | | |
| FACILITY PLANNERS | Owner of FAS plan | | |
| Copper Sizing Criteria | Free form instructions concerning how copper cables should be sized on this plan | | |
| Cable Count | Copper cable name and pair range to be used in this plan | | |
| Fiber Sizing Criteria | Free form instructions concerning how fiber cables should be sized on this plan | | |
| Cable Count | Fiber cable name and pair range to be used in this plan | | |
| Mandatory Splice Location | Free form comments indicating required splice points in a LRS involving fiber | | |
| Service Required | Date by when FACILITY PLANNERS believes service is required for this plan | | |
| Approval Date | Date when the auth number associated with the PM Tool document is approved in JMS | | |
| Hand-Off Date | Date when hand off package is generated (FAS LRS is entered into PM Tool) | | |
| Construction Close Date | Date when auth number associated with the PM Tool document is closed in OSPCM | | |
| Cancellation Date | Date when auth number associated with the PM Tool document is cancelled in JMS | | |
| Permit Type | Type of permit required | | |
| Grantor | Grantor of permit | | |
| Date Permit Received | Date notification of approval of permit received | | |
| Date Permit Requested | Date approval of permit requested | | |
| Easement Required | Yes/no indicator of whether an easement can need to be obtained as a part of this plan | | |
| Date Easement Requested | Date easement requested | | |
| Date Easement Received | Date easement received | | |
| Co Mux Location | Relay rack location of Central office Mux | | |
| Fiber Assignment | Fiber assignment for connecting equipment | | |
| Co LGX Position | Central office bay location of the central office LGX | | |
| TEO | Associated TEO which places equipment for this plan | | |
| RDSC Code | Code to be used to order equipment associated with this LRS (may be manually entered or fed from LECIII) | | |
| Clli | LOC_CLLI of remote terminal | | |
| Area Number | Tax code associated with RT LOC_CLLI | | |
| Address | Address of remote terminal where work is to be performed | | |
| Site# | CSA or location ID of remote terminal where LRS is to take place | | |
| RT Type | Structure type | | |
| Channel Banks Added | Number of channel banks to be added on this plan | | |
| Commons Added | | | |
| DLC | Indicates whether system is to be turned up as integrated or universal. PM Tool currently only supports these options, a modification should be made to also accept TR303). This field may be modified further to indicate the turning up of a Mux | | |
| COT | Position of central office connection (COT location or switch peripheral bay/panel/jack location) | | |
| DS1 Assignment | FACS cable pair(s) which can feed the system being turned up | | |
| System Type | System type (s1c5, discs, etc.) | | |
| Mode | Indicator of number of DS1's being used to turn up the system | | |
| System# | System number of system to be turned up | | |
| Count | Cable name and pair range to originate from this piece of equipment | | |
| Fitl Out Count | Cable name and pair range to originate from this piece of FITL equipment | | |

7.1.9 TEOPS

| | |
|---|---|
| System Overview | TEOPS is the tool which is used for creating and monitoring Telephone Engineering Orders. |
| Embodiment | FMT may transmit data to and retrieve data from TEOPS on an as needed basis. These transactions can be real time. |
| Process | TBA |
| Response | All LRS data is sent to PM Tool. Once the data is received PM Tool returns a PM Id. |

8 Data Embodiments

8.1 LRS & Hand-Off Package

| Data Item | Description | Data Type | Max. Char. | Source (Primary, Secondary) |
|---|---|---|---|---|
| LRS Id | FAS LRS ID number (unique in FAS database) | | | |
| PM Tool Id | PM Tool item# (unique in component) | | | |
| Comment | Free form field for comments which should be stored but not included in the handoff package | | | |
| Equipment ID | LEIM unique wire center Identifier | | | |
| Entity | PM Tool entity (derived from ST/NVP) | | | |
| Component | PM Tool component (derived from WC district) | | | |
| Mux Ports | Muldem/Slot/Port assigned to a system being turned up. | | | |
| Status | Indicator of whether LRS is public or private and if a handoff package has been generated | | | |
| Wire Center | Wire center CLLI for this LRS | | | |
| Location | Location of LRS address | | | |
| Job Title | User defined short description of work to be performed | | | |
| EWO | Auth number fed from PM Tool to FAS LRS | | | |
| Local Category | Used in PM Tool to categorize work | | | |
| Metrics Category | Used in PM Tool to categorize work | | | |
| Taper Codes | Numerical representation of an interface to be monitored | | | |
| Associated PM Tools | Used in PM Tool to associate other PM Tool items | | | |
| Associated LRS | Associates current LRS with other FAS LRS | | | |
| Associated Facility Route | Associates current LRS with FMT proposed facility routes | | | |
| Scope | Free form description of work to be performed | | | |
| Status | Free form description of status of LRS or handoff document to be performed | | | |
| FACILITY PLANNERS | Owner of FAS LRS | | | |
| Copper Sizing Criteria | Free form instructions concerning how copper cables should be sized on this LRS | | | |
| Cable Count | Copper cable name and pair range to be used in this LRS | | | |
| Fiber Sizing Criteria | Free form instructions concerning how fiber cables should be sized on this LRS | | | |
| Cable Count | Fiber cable name and pair range to be used in this LRS | | | |
| Mandatory Splice Location | Free form comments indicating required splice points in a LRS involving fiber | | | |
| Service Required | Date by when FACILITY PLANNERS believes service is required for this LRS | | | |
| Approval Date | Date when the auth number associated with the PM Tool document is approved in JMS | | | |

-continued

| Data Item | Description | Data Type | Max. Char. | Source (Primary, Secondary) |
|---|---|---|---|---|
| Hand-Off Date | Date when hand off package is generated (FAS LRS is entered into PM Tool) | | | |
| Construction Close Date | Date when auth number associated with the PM Tool document is closed in OSPCM | | | |
| Cancellation Date | Date when auth number associated with the PM Tool document is cancelled in JMS | | | |
| Permit Type | Type of permit required | | | |
| Grantor | Grantor of permit | | | |
| Date Permit Received | Date notification of approval of permit received | | | |
| Date Permit Requested | Date approval of permit requested | | | |
| Easement Required | Yes/no indicator of whether an easement can need to be obtained as a part of this LRS | | | |
| Date EasementRequested | Date easement requested | | | |
| Date EasementReceived | Date easement received | | | |
| Co Mux Location | Relay rack location of Central office Mux | | | |
| Fiber Assignment | Fiber assignment for connecting equipment | | | |
| Co LGX Position | Central office bay location of the central office LGX | | | |
| TEO | Associated TEO which places equipment for this LRS | | | |
| RDSC Code | Code to be used to order equipment associated with this LRS (may be manually entered or fed from LECIII) | | | |
| Clli | LOC_CLLI of remote terminal | | | |
| Area Number | Tax code associated with RT LOC_CLLI | | | |
| Address | Address of remote terminal where work is to be performed | | | |
| Site# | CSA or location ID of remote terminal where LRS is to take place | | | |
| RT Type | Structure type | | | |
| Channel Banks Added | Number of channel banks to be added on this LRS | | | |
| Commons Added | | | | |
| DLC | Indicates whether system is to be turned up as integrated or universal. PM Tool currently only supports these options, a modification should be made to also accept TR303) This field may be modified further to indicate the turning up of a Mux | | | |
| Cot | Position of central office connection (COT location or switch peripheral bay/panel/jack location) | | | |
| Ds1 Assignment | FACS cable pair(s) which can feed the system being turned up | | | |
| System Type | System type (s1c5, discs, etc.) | | | |
| Mode | Indicator of number of DS1's being used to turn up the system | | | |
| System# | System number of system to be turned up | | | |
| Co DSX RT-Unit/Jacks | Jack assignments of DSX for COT | | | |
| Mux Rate | Indicates rate of optics and capacity of Multiplexer shelf (e.g. OC3+, OC1, OC192) | | | |

| Data Item | Description | Data Type | Max. Char. | Source (Primary, Secondary) |
|---|---|---|---|---|
| Tid | Target identifier for SONET devices | | | |
| SCID | Sonet Carrier Identifier | | | |
| Architecture | Indicator of architecture of fibers feeding device (e.g. diverse, collapsed) | | | |
| Count | Cable name and pair range to originate from this piece of equipment | | | |
| Fitl Out Count | Cable name and pair range to originate from this piece of FITL equipment | | | |
| LOC ID | LEIM location ID is a unique identifier with a W/C to identify a structure. | | | |
| Timeslot | Timeslot information for assignment of DS3 data in TIRKS | | | |

8.2 LRS Search

| Data Definition | Description | Data Type | Max Char. | Source (Primary, Secondary) |
|---|---|---|---|---|
| Wire Center Clli | Clli code for Wire Centers | | | |
| Taper Code | The taper code associated with the terminal | | | |
| Terminal Address | Address of the terminal | | | |
| LRS ID | Unique LRS identifier assigned by FAS | | | |
| PM ID | Numbering scheme brought over by PM Tool | | | |
| BCM TEO/Proj | Numbering scheme brought over by BCM. | | | |
| LEG III ID | Numbering scheme brought over by BCM. | | | |

8.3 Facility Route Search

| Data Definition | Description | Data Type | Max. Char. | Source (Primary, Secondary) |
|---|---|---|---|---|
| | | | | |

8.4 Equipment Attributes

| Data Definition | Description | Data Type | Max Char. | Source (Primary, Secondary) |
|---|---|---|---|---|
| CLLI # (Common Language Location Identifier) | Common Language Location Identifier | Text | 8 | LEIM, TIRKS, LOC/CLLI and FAS |
| CLEI # (Common Language Equipment Identifier) | Code that uniquely identifies an item of DLE equipment | Text | 12 | LEIM, TIRKS |
| Address | Street Address | Text | 20 | LEIM, LOC/CLLI, FAS |
| Location | Location inside a CO or RT where a specific item of equipment resides | Text | 12 | LEIM, FAS |
| Equipment Type | Product description of DLE equipment | Text | 30 | LEIM, TIRKS, LFACS |

-continued

| Data Definition | Description | Data Type | Max Char. | Source (Primary, Secondary) |
|---|---|---|---|---|
| RDSC (Regional Design Source Code) | Code that provides a DLE equipment manufacturer's standard product configuration and prices | Text | 20 | LEIM |
| Customer Name | Name of customer served by an item of DLE equipment | Text | 25 | LEIM or personal notes |
| AWF (Alarm Wiring Configuration) | Standard configuration that corresponds to the DLE powering configuration | Numeric | 4 | LEIM |
| TEO # (Telephone Equipment Order) | Number assigned to a purchase order of DLE equipment | Text | 18 | LEIM, FOX |
| EWO # (Engineering Work Order) | Engineering work order that placed or modified that piece of equipment | Text | 10 | FAS, LEIM |
| Feeder Route # | Used for provisioning | Text | 2 | LEIM |
| Carrier # | Used for provisioning | Text | 6 | LEIM |
| Allocation # | Used for provisioning | Text | 6 | LEIM |
| Distribution # | Used for provisioning | Text | 6 | LEIM |
| Status | Assignment condition - working, assigned, spare, planned | Text | 10 | LEIM, TIRKS, Personal Notes |

8.5 MUX

| Data Definition | Description | Data Type | Max Char. | Source (Primary, Secondary) |
|---|---|---|---|---|
| DSX Assignment | DS1 or DS3 Termination | Text | 6 | TIRKS, LEIM, FOX |
| System # | Administration # assigned to MUXs | Numeric | 4 | TIRKS, LEIM, LFACS |
| Software Generic | Software version supporting an item of DLE equipment | Text | 10 | TIRKS, LEIM |
| TID # (Target ID) | Combination of CLLI, System Type and System Number | Text | 20 | TIRKS, LEIM |
| Wavelength | Wavelength in nanometers that equipment is operating | Text | 10 | TIRKS, LEIM |
| Bandwidth | Maximum MBs per second of data that an item of equipment can transmit | Text | 8 | TIRKS, LEIM |
| Bandwidth Capacity | Maximum Bandwidth | Text | 8 | TIRKS, LEIM |
| FOT Assignment | LGX termination point | Text | 10 | LEIM (loop); FOX, TIRKS (IOF) |
| MD Counts | MUX Distribution Counts | Text | 16 | LFACS, LEIM |
| Configuration | Sonet or Assync, and the ring configuration | Text | 20 | TIRKS, LEIM |
| SCID # (Sonet Circuit ID) | Identification number given to Sonet Mux systems. | Text | 8 | LEIM, TIRKS |
| DS3 Circuit ID | Unique DS3 or STS-1 circuit ID | Text | 20 | TIRKS |
| DS1 Circuit ID | Unique DS1 circuit ID | Text | 20 | LFACS, TIRKS |
| OCN Circuit ID | Unique OCN circuit ID | Text | 20 | TIRKS |
| Node Locations | Node ID | Text | 2 | LEIM |

8.6 DSX

| Data Definition | Description | Data Type | Max Char. | Source (Primary, Secondary) |
|---|---|---|---|---|
| DSX To Equipment Slot Assignment | Equipment termination location | Text | 10 | LEIM, TIRKS |
| Configuration (DS1 or DS3) | Service Termination Type | Text | 4 | LEIM, TIRKS |

8.7 LGX

| Data Definition | Description | Data Type | Max. Char. | Source (Primary, Secondary) |
|---|---|---|---|---|
| Equipment Slot Assignment | Equipment termination location | Text | 20 | LEIM, FOX |
| Strand Slot Assignment | Indicates which LGX port corresponds to a fiber strand from an item of equipment | Text | 10 | LEIM, TIRKS |
| Capacity | Total possible number of terminations | Text | 3 | LEIM, FOX |

8.8 ONU

| Data Definition | Description | Data Type | Max Char. | Source (Primary, Secondary) |
|---|---|---|---|---|
| PG Count Range | Derived counts assigned | Text | 20 | LEIM, LFACS |

8.9 NMLI

| Data Definition | Description | Data Type | Max Char. | Source (Primary, Secondary) |
|---|---|---|---|---|
| Circuit Id | System Circuit Id | Text | 25 | TIRKS |

8.10 DLC

| Data Definition | Description | Data Type | Max Char. | Source (Primary, Secondary) |
|---|---|---|---|---|
| Mode | Mode "I" "II" or "III" | Text | 3 | LEIM |
| Line Code | "AMI" or "B8ZS" | Text | 4 | LEIM |
| System Type | Manufacturer Code | Text | 6 | LEIM, LFACS |
| PG Counts (Pair Gain Counts) | Counts assigned to DLE equipment slots to provide LFACS assignment capability | Text | 18 | LEIM, LFACS |
| DSX Assignment | DS1 Termination location | Text | 4 | LEIM |

8.11 Fiber Splice

| Data Definition | Description | Data Type | Max Char. | Source (Primary, Secondary) |
|---|---|---|---|---|
| Default Splice Type | System determined splice type | | | |
| Field Verified Splice Type | The actual type of splice used based on field verification | | | |
| System Determined Loss | Default loss associated with | | | |
| Field Verified Loss | The actual loss based on field verification | | | |
| Source | IPID# and complement which is on the CO side of the splice | | | |
| Destination | IPID# and complement which is on the field side of the splice | | | |

8.12 Switch

| Data Definition | Description | Data Type | Max Char. | Source (Primary, Secondary) |
|---|---|---|---|---|
| System Type | Manufacturer Code | Text | 6 | LEIM |
| DSX Assignment | DS1 Termination location | Text | 4 | LEIM |

8.13 Repeater Shelf

| Data Definition | Description | Date Type | Max Char. | Source (Primary, Secondary) |
|---|---|---|---|---|
| DSX Assignment | DS1 Termination location | Text | 6 | LEIM, TIRKS |
| Shelf Assignment (Circuit) | DS1 or DS3 Circuit ID | Text | 25 | LEIM, TIRKS |
| Shelf Capacity | Number of slots in a shelf | Text | 3 | LEIM, TIRKS |

8.14 Fiber Strand

| Data Definition | Description | Date Type | Max Char. | Source (Primary, Secondary) |
|---|---|---|---|---|
| Designation | Name that uniquely identifies a fiber strand inside a wire center | Text | 20 | FAS, LEIM, personal notes |
| Diversity | Diverse, Non-Diverse | Text | 1 | FAS |
| Fiber Mode | Size of strand code - single or multi-mode | Text | 6 | FAS |
| Continuity Relation | State of one item's connection to another | Graphical | N/A | FAS |
| Terminating Condition | Strand state of termination or non-termination | Graphical | N/A | FAS, LEIM, TIRKS |
| Type | Department of ownership - Loop or IOP | Text | 4 | FAS |
| Beginning Wire Center Name | Name given to a geographic area served by a central office | Text | 20 | FAS, LEIM, TIRKS |
| Terminating Wire Center Name | Name given to a geographic area served by a central office | Text | 20 | FAS, LEIM, TIRKS |
| Central Office Location | Street Address of CO | Text + Graphical | 30 | FAS, LEIM, TIRKS |
| Central Office ID | CO CLLI Code | Text | 25 | LEIM, TIRKS |
| RT Location | Strand address of Remote Terminal and Graphical Location | Text + Graphical | 30 | FAS, LEIM, TIRKS |
| Position in ribbon or tube | Position noted by Strand Color | Text | 10 | FAS |
| Wavelength | Wavelengths utilized by strand | Text | 10 | TIRKS |
| Sheath Assignment | Sheath attributes associated with the strand | Text | 10 | FAS |
| Status | Assignment condition - working, assigned, spare, planned | Text | 10 | LEIM, TIRKS, personal notes |
| Dry Fiber Indicator | Indicates whether fiber is a "dry fiber" or not | Text | 1 | LEIM, TIRKS |

8.15 Fiber Sheath

| Data Definition | Description | Date Type | Max Char. | Source (Primary, Secondary) |
|---|---|---|---|---|
| Manufacturer | Sheath manufacturer | Text | 10 | FAS |
| Fiber Type | Cable Core Design | Text | 20 | FAS |
| Fiber Mode | Core Size | Text | 6 | FAS |
| Attenuation | Expected attenuation (signal loss) of strand | Text | 8 | FAS |
| Sheath Type | Over sheath attributes | Text | 20 | FAS |
| Tensile Load | Maximum allowable sheath tension | Text | 10 | FAS |
| Cable unit type | Configuration of fibers in sheath tube or ribbon | Text | 10 | FAS |
| Fibers per unit | Number of guaranteed fibers in sheath units | Text | 3 | FAS |
| Size | Number of Fibers | Numeric | 4 | FAS |
| IPID # | Item of plant ID in FAS | Numeric | 10 | FAS |
| Mortality Date | Year placed in field | Date | 4 | FAS |
| Designation | Type or use of fiber - outside, riser, plenum | Text | 10 | FAS |
| Reduced Water Peak (RWP) fiber type | Sheath property for new cables | Text | 4 | FAS |

-continued

| Data Definition | Description | Date Type | Max Char. | Source (Primary, Secondary) |
|---|---|---|---|---|
| Length | Sheath length | Numeric | 8 | FAS; records measurement associated with fiber splice |
| Environment | Sheath environment as described by FRC | Text | 6 | FAS |
| Status | Assignment condition - working, assigned, spare, planned | Text | 10 | LEIM, TIRKS, Personal Notes |

8.16 Equipment Location

| Data Definition | Description | Date Type | Max Char. | Source (Primary, Secondary) |
|---|---|---|---|---|
| District Name | District location resides in | Text | 25 | LEIM, FAS |
| Address | Street Address of location | Text | 30 | LEIM, FAS |
| Area # | Code the uniquely identifies address | Text | 6 | LEIM, FAS |
| Location # | RT and CLLI # | Text | 15 | LEIM |
| Structure Type | Type of structure to house DLE | Text | 8 | LEIM, FAS |

8.17 Conduit

| Data Definition | Description | Date Type | Max Char. | Source (Primary, Secondary) |
|---|---|---|---|---|
| Conduit Run | Group of conduits traversing same route | N/A | N/A | N/A |
| Conduit Type | Material description of conduit | Text | 15 | FAS, personal notes |
| Conduit Location | Graphical location of Conduit run | Graphical | N/A | FAS |
| Conduit length | End to end length of conduit to the nearest foot | Numeric | 8 | FAS |
| Manhole name | Name assigned to manhole | Text | 8 | FAS |
| Manhole locations | Graphical location of manhole | Graphical | N/A | FAS |
| Hand hole name | Name assigned to manhole | Text | 5 | FAS |

9 Use Case Modeling

Purpose: The purpose of this section is to provide a high-level understanding of core system functionality, both user and machine-driven, for FMT.

Discussion: Use-Case diagramming is a simple modeling technique that illustrates the various entities—human and machine (called "Actors")—that can interact with the proposed system. Use-Case diagrams provide a high-level, graphical summary of embodiments and are also useful during the development phase for defining objects in a system.

9.1 Use Case Descriptions
9.1.1 Use Case: Login and Password
9.1.1.1 Description This use case describes how a user logs into the system. The user needs a valid username and password, which is created by the system administrator. When the user logs in with the correct username and password, the system recognizes the user and sets their appropriate permissions and preferences.

9.1.1.2 Actors
Facility Planners
Engineering Assistants
Transmission Engineers
Construction Technicians
Long Term Planners
OSP Engineers

9.1.1.3 Normal Sequence

| Sequence Number | Description |
|---|---|
| 1. | The user double-clicks an icon or a selection from the Windows NT Start Menu and launches the application. |
| 2. | The user enters a CUID (Common User Id) and Password. |
| 3. | The application determines the user's role type (Loop Capacity Manager, Engineering Assistant, etc.) and default District and makes appropriate functionality available. |
| 4. | User enters the system with their default settings |

9.1.1.4 Alternative Sequence

The user forgets his/her password or enters the wrong password. The system can prompt the user to reenter the password. If the user has forgotten his/her password, they can have to contact the system administrator to reset password.

9.2.2 Use Case: Search/Find, View Graphical Elements
9.2.2.1 Description This use case allows the user to search/find or view graphical elements from within the system. The user can input a search with/without a wildcard or select from a list what they would like to view. The user may also narrow or refine their search to obtain additional information about the search.

9.2.2.2 Actors

Facility Planners

Engineering Assistants

Transmission Engineers

Construction Technicians

Long Term Planners

OSP Engineers

9.2.2.3 Normal Sequence

| Sequence Number | Description |
|---|---|
| 1. | User logs into system (see use case: 9.1.1) |
| 2. | User inputs a fiber name, or a part of a fiber name with a wildcard. The application accepts the query and returns a diagram or tabular data based on user's request of the fiber ring from the originating Central Office. |
| 3. | The user "Zooms In" or "Zooms Out" as needed. The system can display more geographic and infra-structure detail when the users "Zoom In" and less detail when they "Zoom Out." |
| 4. | The user selects a feature and the application returns a pop-up window with detailed information about the feature. |
| 5. | The user selects an "Additional Info" option to drill down for additional data on the feature. |
| 6. | The user can print, change focus to another application on the desktop (ALT-TAB for example), re-query or close the window. |

9.2.2.4 Alternate Sequences

Figure 12:
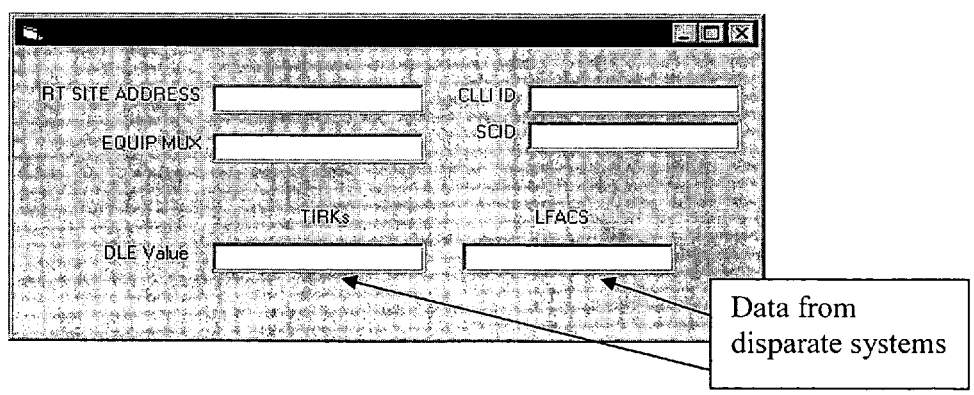
FIG. 12 depicts an exemplary display of a returned data window and data discrepancies.

The user enters a query based on: equipment type constrained by Central Office (Wire Center), remote terminal (which returns all equipment), fiber sheath, or street address. The returned diagram can support zoom in and zoom out features. If the equipment has data associated with it in more than one external system, the returned data window can show the discrepancies. FIG. 12 suggests the concept.

9.2.3 Use Case: Query Network Facility Items

9.2.3.1 Description

This use case allows the user to query network facility items from within the system. The system allows the user to search with multiple parameters and wildcards. The user can also narrow the query and view an item by type, date, etc.

9.2.3.2 Actors

Facility Planners

Engineering Assistants

Transmission Engineers

Construction Technicians

Long Term Planners

OSP Engineers

9.2.3.3 Normal Sequence

| Sequence Number | Description |
|---|---|
| 1. | User logs in (see use case: 9.1.1) |
| 2. | On the query screen, the system can provide multiple parameters for a search. For example, a user may want to view fiber sheath(s) by Manufacturer, Type, and Year Placed. |
| 3. | The user can be able to further narrow the search. For example, a user enters Manufacturer and Year Placed as parameters, and FMT displays a listing of all sheaths meeting the criteria. |
| 4. | User selects an individual facility item to review its data attributes |
| 5. | User can select another item or log out |

9.2.3.4 Alternative Sequence

The user may misspell a word or leave out part of a word. The system should query for words that are similar to the one entered by the user. If no data exists for the parameters entered, the system should prompt the user to try another search.

9.2.4 Use Case: Provide Calculation Tools

9.2.4.1 Description

This use case allows the user to obtain calculations from the system by entering criteria into the system or selecting areas or items to be calculated. The system has calculation tools that it uses in the backend to perform such activities. The user may view the calculation graphically or in a tabular format.

9.2.4.2 Actors

Facility Planners

Engineering Assistants

Transmission Engineers

Construction Technicians

Long Term Planners

OSP Engineers

9.2.4.3 Normal Sequence

| Sequence Number | Description |
|---|---|
| 1. | User logs in (see use case: 9.1.1) |
| 2. | On the main screen, the user selects what they want calculated or measured |
| 3. | A user may select points graphically, manually input locations, etc. and the system can use the appropriate tool and display the output for the user |
| 4. | The user may input other variables or criteria to obtain other calculations, etc. |
| 5. | Once the user is done he logs out of the system |

9.2.4.4 Alternative Sequence

The user may enter a wrong spelling of a word when entering search criteria or select an invalid area on map. The system can prompt the user to try again. The user may want to calculate multiple point distances from the map.

9.2.5.1 Use Case: Integrate Fiber Related Data

9.2.5.1 Description

This use case allows the user to obtain data that is stored in external systems or in the system's database. The system pulls data from external system and integrates it to display an output for the user.

9.2.5.2 Actors

Facility Planners
Engineering Assistants
Transmission Engineers
Construction Technicians
Long Term Planners
OSP Engineers

9.2.5.3 Normal Sequence

| Sequence Number | Description |
| --- | --- |
| 1. | User logs in (see use case: 9.1.1) |
| 2. | The system can provide the user with the ability to select in a graphical environment or on a query screen, and view results in a tabular format. |
| 3. | On the main screen, the user selects an item on a query screen or chooses one from a list or select one from the items currently visible. |
| 4. | The user may input other variables or criteria to obtain other more detailed information, etc. |
| 5. | The system obtains the appropriate data from external systems and/or its database in the backend and displays the output for the user to view. |
| 6. | The user views the data and may do another search or refine the search further. |
| 7. | User logs out when finished. |

9.2.5.4 Alternative Sequence

The user may enter a search criterion that is not valid or not recognized by the system. The data may not have been integrated from the external systems into the main system, FMT. The system can then display on screen a message that data entered is not recognized by the system, please try again.

9.2.6 Use Case: Provide Fiber Tools and Reports

9.2.6.1 Description

This use case provides user to use tools and view reports generated by the system. The system contains fiber tools that help the user in determining status, priority, or other information about fiber.

9.2.6.2 Actors

Facility Planners
Engineering Assistants
Transmission Engineers
Construction Technicians
Long Term Planners
OSP Engineers

9.2.6.3 Normal Sequence

| Sequence Number | Description |
| --- | --- |
| 1. | User logs in (see use case: 9.1.1) |
| 2. | On the main screen, the system provides various tools for the user to use. |
| 3. | User selects a tool in order to perform a certain function to a fiber, fiber strand, etc. such as assign reservation status, restoration priority, fiber strand diversity. |
| 4. | The system assigns the value appropriately to the fiber according to what the user indicated. |
| 5. | The user also may print out or view a report about the fiber, etc. |
| 6. | User logs out when finished. |

9.2.6.4 Alternative Sequence

The user may select the wrong tool to assign value to fibers. The system can allow the user to make changes and can ask the user for a confirmation on the changes made. These changes or additions can vary on user permissions.

9.2.7 Use Case: Create, Read, Update, Delete LRS

9.2.7.1 Description

This use case allows user to go into the planning part of FMT. Users can be able to create, read, update, and delete location relief strategies. The functions they can perform can depend on the privileges and permissions that they have according to the login.

9.2.7.2 Actors

Facility Planners
Engineering Assistants
Long Term Planners

9.2.7.3 Normal Sequence

| Sequence Number | Description |
| --- | --- |
| 1. | User logs in to system (see use case: 9.1.1) |
| 2. | User launches Location Relief Strategy with menu item or toolbar button. |
| 3. | User selects the activity they would like to perform (create, read, update, etc.) |
| 4. | The system opens a LRS or allows user to create a new Location Relief Strategy. |
| 5. | User selects a Central Office or area of interest on the District map and "Zooms In" |
| 6. | The user selects symbols, lines from an object palette and draws the design. |
| 7. | User enters comments in comment fields for each object placed on the diagram. |
| 8. | User saves design and selects a "Publish" or "Private" option. The Publish option can make the design available to other users with access to the planning layer. |
| 9. | User logs off when finished. |

9.2.7.4 Alternate Sequences

The user may choose to delete or update a LRS, but not have permission to do so. The system can display a message that the user does not have permission o do the task selected. The user may add comments about the LRS that can be seen by the creator of the LRS and anyone else who has access.

9.2.8 Use Case: View Cross Box Data for Planning

9.2.8.1 Description

This use case allows user to get information about cross boxes in order to use it for planning purposes. The user can be able to do a search or query on cross boxes by date and attach the output data to the LRS they create. This data can used for Location Relief Strategies.

9.2.8.2 Actors
Facility Planners
Engineering Assistants
Long Term Planners
9.2.8.3 Normal Sequence

| Sequence Number | Description |
| --- | --- |
| 1. | User logs in (see use case: 9.1.1) |
| 2. | On the main screen, the user can select cross box data. |
| 3. | User can enter search date parameters for the system to check cross box fills, etc. for the dates specified. |
| 4. | The system can display in graphical and tabular form the cross box data. |
| 5. | User can have the option to attach this data to the LRS that the user can create. If it is attached to the LRS, then anyone who can view the LRS can be able to view the cross box data. |
| 6. | User does a search for a LRS |
| 7. | User associates LRS with Cross Box data |
| 8. | User logs out when completed. |

9.2.8.4 Alternative Sequence

The user may want to attach more than one cross box report. The system can allow the user to attach additional reports for each LRS created.

10 Technical

Purpose: This section defines the scope of the architectural platform and the subset of standards applicable to OPEDS Software development. This section can also reference security and other development standards.

10.1 General

A standards based approach to software development may be designed to promote high data integrity, open systems, improved responsiveness to user functionality changes, enhanced reliability and availability, and security of corporate resources, economic efficiency, and scaleable, distributed systems. This section can define the overall scope of the architectural platform and the subset of standards applicable to OPEDS software development. Included can be an overview of the current OPEDS application and infrastructure architectures. This section can also reference security and other development standards.

10.2 Computing Architecture

Technical Reference 73579 Standards can be used in the design, implementation and management of software modules that form an information network. The industry standards for languages, protocol services, interfaces, computer models, etc. may be used. These standards also form the yardstick by which Commercial Off The Shelf (COTS) or prepackaged software applications are considered for deployment. Other conventional computing architectures may be used.

10.3 Computer Asset Protection Guidelines

The Corporate Security Standards practices may be provided.

10.4 SDLC

Figure 13:
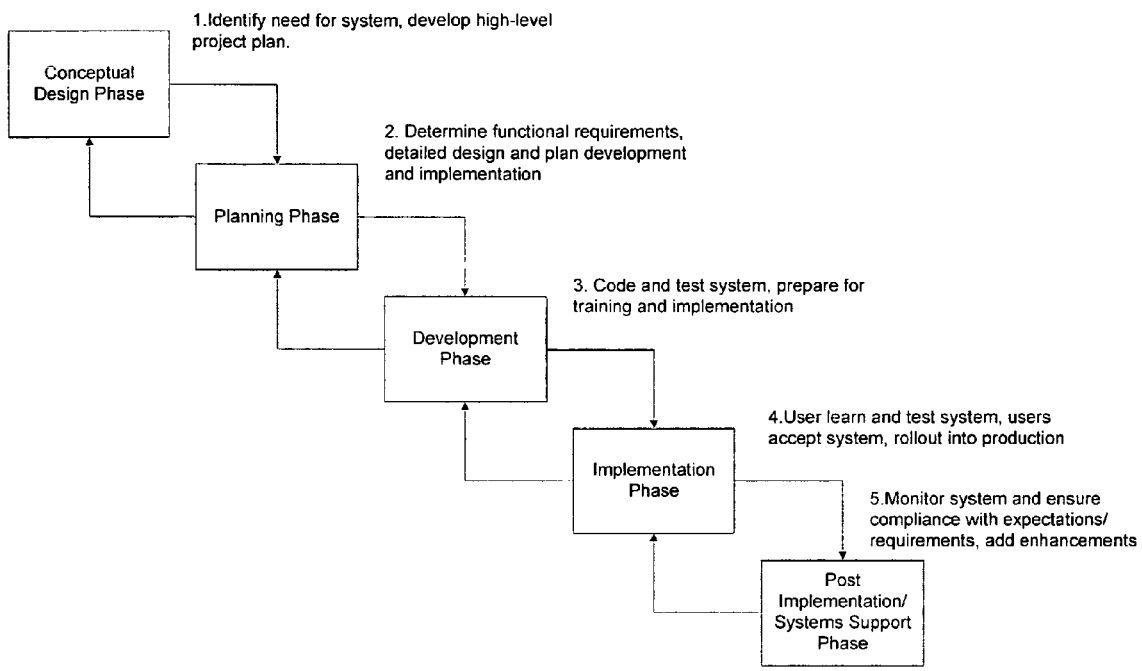
FIG. 13 depicts an exemplary systems development life cycle methodology followed for internally developed systems and major enhancements.

System Development Life Cycle is a repeatable, corporate-endorsed development methodology that is followed for internally developed systems or major enhancement to an existing system. FIG. 13 depicts the System Development Life Cycle.

10.5 Other Standards and Guides 10.5.1 GUI Style Guide

Not applicable.

10.5.2 Capability Maturity Model (CMM)

The CMM is an industry-accepted model for software development processes and was developed by the Software Engineering Institute (SEI) at Carnegie Mellon University.

10.5.3 Metrics

Each application, regardless of the SDLC methodology being followed, may collect primitive metrics to be used as an aid in the effective management and maintenance of software. Primitive metrics are those measures that are applicable to any application, regardless of the hardware or software involved. SLIM (Software Life Cycle Management) and SLIM-Control are the tools used to predict and track project defects. Primitive metrics include but are not limited to the following:

1. Size of the project in function points
2. Lines of Code, by type
3. Time to complete the project (broad measure of staff hours)
4. Number of defects originating in each SDLC phase 10.5.4 Configuration Management A configuration management tool may be used for control of managed/on-site developed software. IBM's CMVC (Configuration Management Version Control) system is currently (circa 1999) used by OPEDS for all software and documentation to manage versions and configurations. COTS or custom code developed at a supplier's facility must be managed by the supplier's configuration management system.

10.6 Technical Design 10.6.1 Design

OPEDS uses a multi-tier architecture. OPEDS is modular in design to promote reuse of system service components. Business logic is accessible through application services. Application services are independently executable. Application services shall be capable of being independently authorized. OPEDS can be modular in design to allow for the addition of new features (e.g., objects and methods) without a need to alter existing functionality.

10.6.2 Open Systems

The system may be compliant with open system standards.

10.6.3 Open APIs

OPEDS shall use an Open API (or Middleware) to provide connection management to:

Client/presentation layer (e.g., Windows Client, WEB Browser)
Business processing layer
External interfaces
Reporting elements (e.g. COTS reporting tool)
Database elements. This can exclude Database Administrator updates to system-related data, but not user-related data.

10.6.4 Interfaces

Communications with external systems and inter-application data transfers can use standard technology.

10.6.5 PC Client Data Access

CORBA 2.0 (ORBIX) compliant software can be the primary middleware product for accessing data from a Windows-NT based client. ODBC, INET, and/or SQLNet can be a secondary option for limited special use situations.

10.6.6 Portability

The system can be designed so as to provide for platform portability with minimal change (i.e. Windows NT platform to a UNIX platform, or between UNIX platforms.).

10.6.7 Software Development Tools

For custom developed software, the software development tools can be consistent with a Software Development Tool Approved Products List.

10.6.8 Naming Conventions

For custom developed software, the supplier can use naming and coding conventions that are consistent with standards.

10.6.9 Information Modeling

Any information modeling tools used by external suppliers can be industry standards.

10.6.10 Data

The integrity of any replicated database(s) should be maintained on an as close to real-time basis as feasible. Synchronization of a replicated database may not affect the user.

10.6.11 Data Movement

Data transfer between data stores can use middleware that minimizes the amount of human interaction required to set up and monitor the event. Consistent and reliable data can be available for inquiry in a timely manner. An accurate and reliable log of all data transfers between data stores to support an effective audit trail and ensure data integrity can be fully implemented.

Specific transfer methods can be utilized as follows:
- Low volume transfers that do not require automation can utilize ftp.
- High volume transfers can utilize Sterling Connect: Direct for inter-company transfers and BUFIT for intra-company transfers.
- Database to like database transfers should utilize native transfer modes (i.e. SQLNet).

10.6.12 User Interface Design

Data entry screens should be designed so that users are not required to enter the same data more than once. For example, as an OPEDS user moves from screen to screen (i.e., parent-child screens), OPEDS can automatically retrieve data for fields, which exist in both screens from the previous screen and populate the fields in the current screen. OPEDS shall provide a single sign-on Graphical User Interface (GUI) for end-user access and end-user application administration (i.e., defining activation scripts, modifying tables). The GUI display can be Windows-NT based, consistent in icon usage and color assignment, consistent in placement of buttons and menus, consistent in its look and feel, and consistent in presentation of choices to the user provided via pick lists, pull downs, or pop up menus. The system can perform dynamic validation of all user input.

10.6.13 On-Line Help

OPEDS can provide on-line help.

10.6.14 Security Embodiments

Corporate Security Standards practices, should be met.

10.6.15 User Identification

User identification can be a CUID (Common User ID).

10.6.16 Security Audit

Security audits can be performed in accordance with Corporate Security Standards practices.

10.6.17 Operations

OPEDS can be designed to support high availability. OPEDS shall have the capability to be initialized/terminated by manual input or automated script. Each application service can be documented in the context of appropriate libraries. OPEDS shall retain a log of all activation events. OPEDS can provide the capability for daily removal of all completed activation's from the on-line database and for sending them to an archive (i.e., a non-OLTP database, data warehouse database). OPEDS can be remotely administered. A single point of administration, per domain, shall be provided to manage CUIDs and passwords.

10.6.18 Backup and Recovery

All corporate data can be backed up.

10.6.19 Application Management

OPEDS can support application management:
Administration (TA Unicenter)
Performance (BEST1)
Software Distribution (DDS for UNIX, and WinDSS for Windows-NT based clients with later migration to SMS (System Management Services) for Windows-NT based clients)
Database (TA Unicenter)

10.6.20 Error Resolution

10.6.20.1 Client Application/User Errors

OPEDS client software can display error-messages on-screen and provide a meaningful nomenclature for notification and resolution.

10.6.20.2 Technical Errors

A standard process may be used to log error messages within the OPEDS server-side computing environment. The supplier can use this process to log errors and provide a meaningful nomenclature for error messages and their resolution.

10.6.21 Timing Embodiments

The system can be designed to insure presentation layer (i.e. GUI) response times for non-background processes in a range that does not exceed performance thresholds specified in the embodiments documentation as measured from the time of the user keystroke entry to the time of the system response to that entry.

10.6.22 Load Projections

At the completion of the design phase, the supplier can be responsible for projecting the CPU, memory, and DASD (Direct Access Storage Device) embodiments for each system platform (client, application server, database server).

10.6.23 Software Delivery

OPEDS software may have version control. Software received shall include release notes as delineated in the OPEDS Definition of Deliverables and a summary of new features or software fixes since the last version. Received OPEDS software shall include release installation, transition and/or data conversion notes as well as fallback procedures.

10.6.24 Work Center Application Integration Group

The supplier can be responsible for working with the Work Center Application Integration group to provide any and all variables and processes required to configure and administer the system including specifying the necessary environment levels, product levels, component levels, patch levels, etc. upon which their product must operate.

10.7 Current OPEDS Architecture

10.7.1 Overview

OPEDS is a distributed system that can run in more than 30 Telecommunication Company's districts and in a corporate environment. The Process/Data Management layer is provided by the OPEDS project. In general, client-side user interfaces communicate with the OPEDS Process/Data Management layer. Orbix, a commercial product that provides a CORBA-compliant interface to the OPEDS Process/Data management layer, is used for this communication.

In general data retrieval can fall into two categories:

10.7.1.1 External System Data

The OPEDS Process/Data management layer can manage data supplied by External Systems and master data maintained in OPEDS. OPEDS client software has access to External Systems data through an API (Application Programming Interface) provided by OPEDS.

10.7.1.2 OPEDS

Some applications retrieve data directly from OPEDS such as graphics, land and facility attribute data.

10.7.2 Workstation Specifications

The OPEDS clients can, for example, run on PCs that meet the minimum following criteria:
- 166 Pentium Mhz Processor
- 32 megabytes of RAM, at minimum (64 megabytes is the norm)
- The Outside Plant (OSP) NT Workstation baseload
- Windows 32-bit API compliant (16 bit applications are NOT permitted)

10.7.3 Server/Database Specifications

Any server-side code can run in the currently deployed OPEDS versions of HP-Unix 11.X and Oracle 8.X. In addition, the code can run in a high-availability environment (i.e., HP's Service Guard). There are two classes of servers:

1) Local Server

Local application servers are UNIX-based HP servers running HP/UX. Software should be developed so as to minimize work when migrating to new OS release levels. Local servers provide database, application and file/print services.

2) Data Center Servers

Two types of data center servers exist for OPEDS: corporate database servers and an archive server. The OPEDS corporate database systems are implemented on a UNIX operating system and deployed on an HP hardware platform. These data center servers can be the central database repositories. Data Stores Oracle has been chosen as the primary relational data store for OPEDS data.

10.7.4 System Diagram

Figure 14:
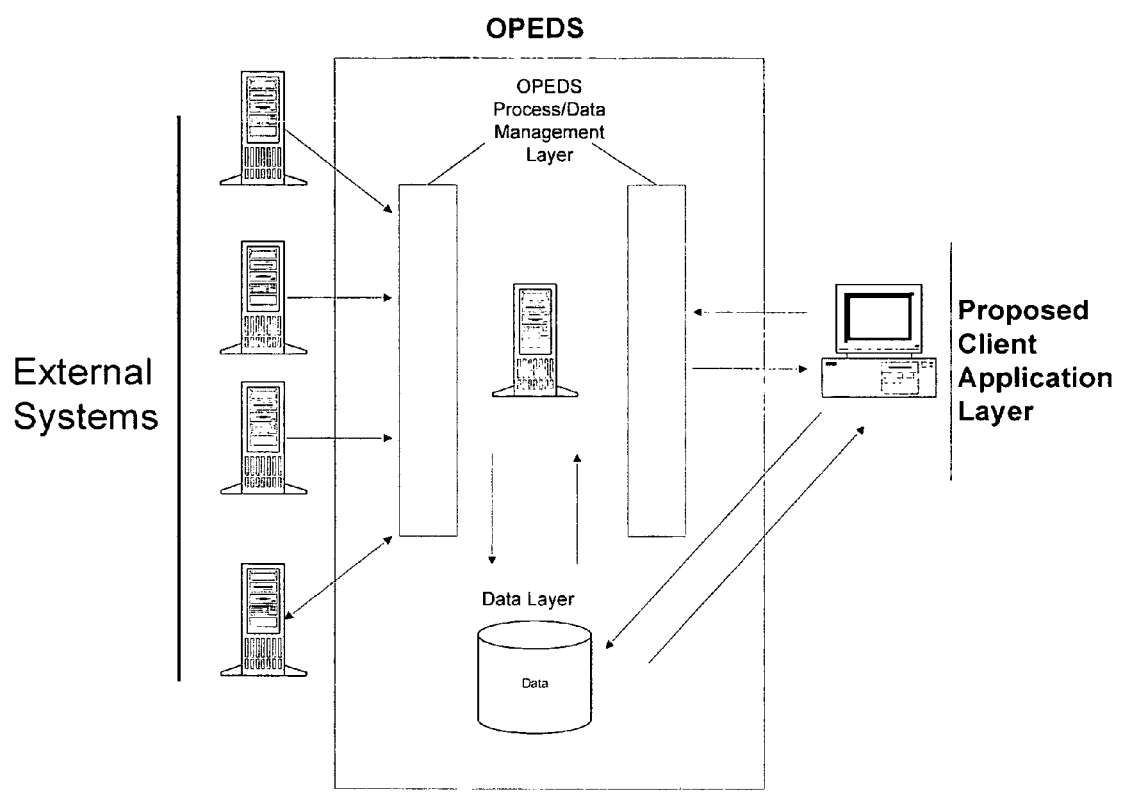
FIG. 14 depicts an exemplary three-tier architecture of an OPEDS system.

FIG. 14 depicts the three-tier architecture with external systems.

10.8 Computing Architecture

10.8.1 OPEDS Data Repositories

OPEDS currently has two repositories for land and facility data:

10.8.1.1 Landbase

The landbase data model is mastered in ESRI's (Environmental Systems Research Institute, Inc.) SDE (Spatial Data Engine) format. The landbase model also stores redundant graphical facility data mastered in facilities (see below). Specifications of the landbase model are available upon request.

10.8.1.2 Facilities

The OPEDS facilities data model comprises data in Oracle, as well as graphical files on a central server. The graphics files are in Microstation .DGN format. Facilities graphics information for a given area is stored in a .DGN file; corresponding land information is stored in a .LND file.

Specifications of the Facilities model are available upon request.

10.8.2 Network Information Services

NIS is used to provide consistency and synchronization of UNIX system files across a homogeneous environment. The NIS domains are unique per district server environment with the Job Management Server acting as the NIS domain master server and all of the other district UNIX servers acting as secondary or slave NIS servers.

10.8.3 Domain Name System (DNS)

The Domain Name System (DNS) is a distributed database that runs on Regional Data Center UNIX hosts, providing a hierarchical naming system for identifying hosts on BOSIP (Open Systems Interconnect Platform). The key embodiment for OPEDS applications is to use DNS to resolve host names stored in OPEDS configuration files. OPEDS applications cannot store IP addresses in configuration files and can only store host names. This can facilitate redirecting clients to alternate servers in failure situations. NetManage TCP/IP software can be configured to utilize DNS to support OPEDS node name resolution.

10.8.4 OPEDS Process/Data Management Layer

The OPEDS Process/Data Management Layer provides access to data located on various application and data servers. This service can provide contract and messaging API(s) to directly access legacy data systems where available and provide access to intermediate service providers to legacy systems as well. These service providers can provide a variety of services including terminal emulation access to legacy 3270-based systems.

10.8.5 Wide Area Network

The Outside Plant networking environment consists of LANs interconnected to form a Wide Area Network (WAN) via BOSIP. In addition, access is provided to the Virtual Circuit Switch Network (VCSN). The goal is to provide the users with transparent and reliable access to all essential OSP systems as well as to legacy systems.

In the OPEDS architecture, BOSIP is the backbone upon which the majority of data communication relies. BOSIP is a Transmission Control Protocol/Internet Protocol (TCP/IP) based network, which fully supports distributed computing as outlined in the BSCA strategy. The design goal is to provide universal communication services independent of the underlying physical network. OPEDS utilizes the TCP/IP protocol.

10.8.6 External System Data

The OPEDS Process/Data management layer can manage data supplied by External Systems and master data maintained in OPEDS. OPEDS clients have access to the External Systems data through an API (Application Programming Interface) provided by OPEDS.

10.9 OPEDS Topology

Figure 15:
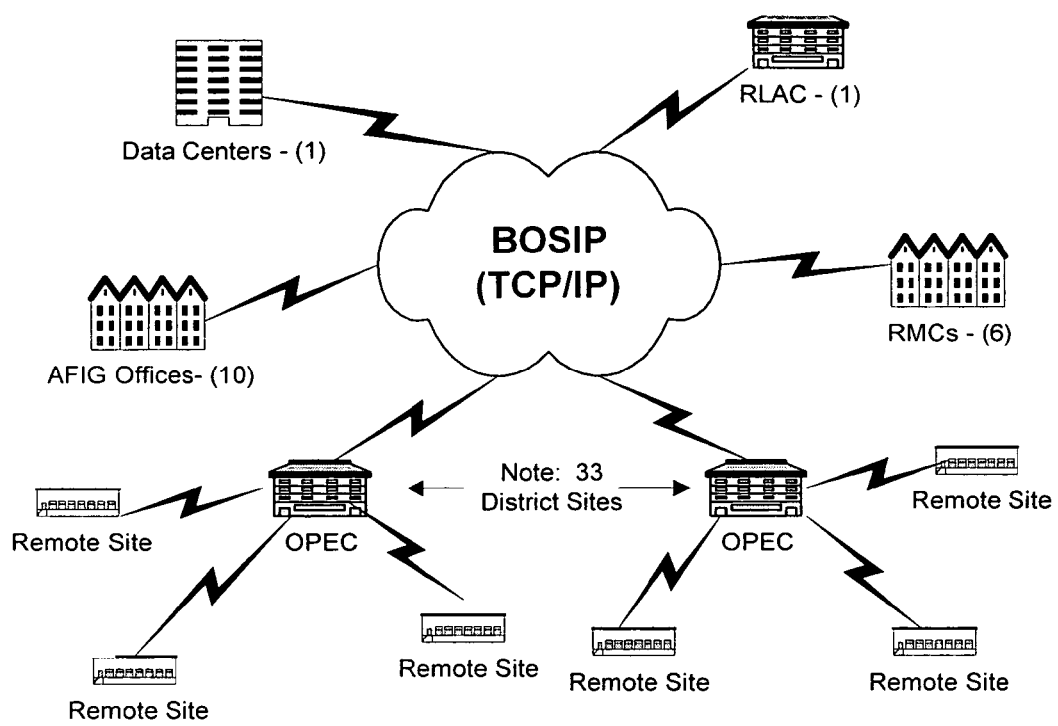
FIG. 15 depicts an OPEDS topology.

FIG. 15 depicts an OPEDS topology.

10.9.1 Data Center

Figure 16:
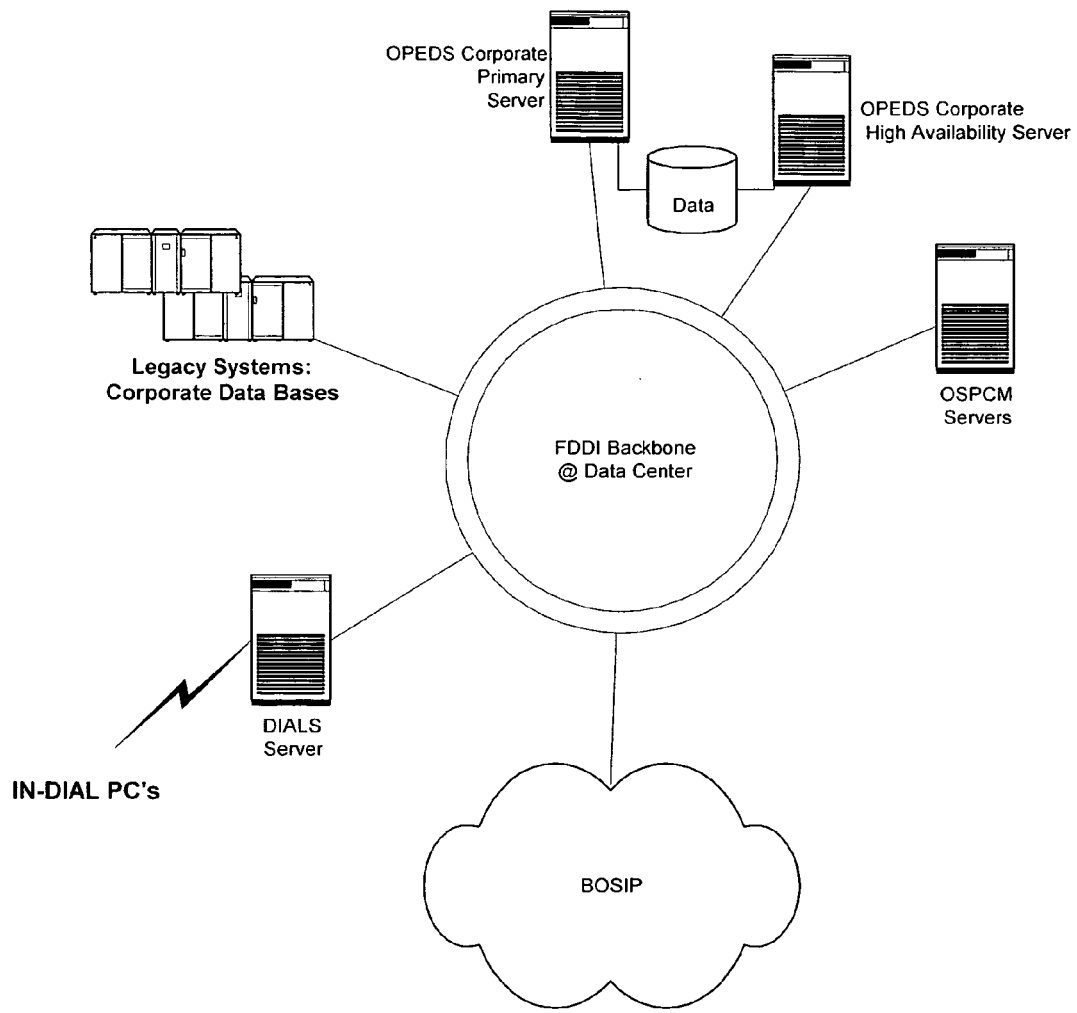
FIG. 16 depicts an OPEDS data center.

A data center is shown in FIG. 16.

The OPEDS Corporate Data Stores for facilities and land are located in the Charlotte Data Center. The archive server and storage are located in the Data Center as well. OSPCM and legacy systems are located in all production data centers.

10.9.2 Typical District/RLAC

Figure 17:
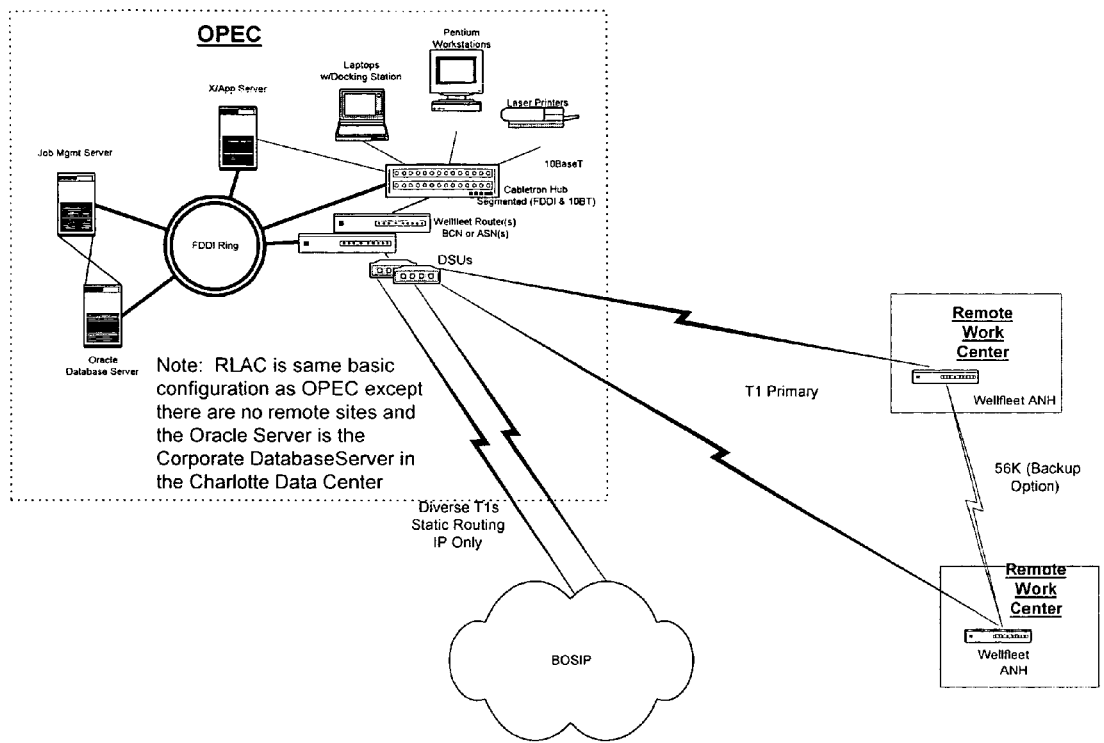
FIG. 17 depicts a typical district/RLAC.

FIG. 17 depicts a District/RLAC.

11 Reference Items

11.1 Glossary of Terms for the FMT and Systems

| Asynchronous Digital Subscriber Line | |
|---|---|
| Description: | Digital communications services available over twisted pair copper lines. |
| Assignment Data | |
| Description: | Data generally associated with the location of fiber terminations, and the MUXs the fibers are traveling through. |
| CO | Central Office |
| Description: | Central location where all facilities inside a wire center terminate. |
| CUID | Common User ID |
| Description: | The 7-character unique user id for all FMT Users. |
| DLE | Digital Loop Electronics |

| | |
|---|---|
| Description: | Digital transmission equipment used to generate DS0, DS1 and DS3 signals etc. |
| EWO | Engineering Work Order |
| Description: | OSP authorization to perform construction work activity. |
| FITL | Fiber in the Loop |
| Description: | Communication platform that uses fiber to deliver services to the customer's curb. |
| FMT | Fiber Management Tool |
| Description: | The proposed module of OPEDS that is the focus of this document. |
| FOX | The Fiber Optic Xconnect system |
| Description: | A system used by Inter-Office planners to track of Multiplexer (MUX)/LGX assignments. |
| HW | Hardwired |
| Description: | DLE equipment in place, but not active |
| IOF | InterOffice Planner |
| Description: | Planner responsible for planning and administering facilities between Central Offices. |
| IP | Long Term Planner |
| Description: | Planner that performs high-level district fiber optic route planning. |
| IPID | Item of Plant Identification |
| Description: | Capitalized material identification number. |
| LATA | Local Access Toll Area |
| Description: | Local calling area controlled by local access provider. |
| FACILITY PLANNERS | Loop Capacity Manager |
| Description: | Planner Responsible for non-Central Office locations and facilities. |
| LEIM | The Loop Equipment Inventory Module |
| Description: | The corporate repository of OSP Digital Loop Electronic data. |
| LFACS | The Loop Facility Assignment Control System |
| Description: | The system used to monitor and assign facilities. The system monitors the copper network, but also has fiber and equipment information. LFACS stores fiber assignment information for some, but not all, Wire Centers. The data in LFACS mirrors the data in LEIM. |
| LGX | Light Guide Cross Connect |
| Description: | Termination equipment for fiber optic cables and jumpers. |
| LMU | Loop Make Up |
| Description: | Loop distance and cable characteristics associated with a specific cable pair. |
| MUX | Multiplexer |
| Description: | DLE equipment used to aggregate or segregate digital signals. |
| NMLI | Native Mode LAN Interconnection |
| Description: | MUX and fiber connections between LANS |
| ONU | Optical Node Unit |
| Description: | OSP termination point for FITL distribution fiber at the customer's location. |
| OPEDS | Outside Plant Engineering Design System |
| Description: | A system Outside Plant facilities and landbase. |
| OSP | Outside Plant Engineer |
| Description: | Engineers responsible for all facilities not in a Central Office. |
| OTDR | Optical Time Domain Reflectometer |
| Description: | Equipment used to test fiber spans with an optical test. |
| PG | Pair Gain |
| Description: | Designation assigned to DS0 counts derived by DLE. |
| RSDC | Regional Design Source Code |
| Description: | Code used to order DLE equipment via OSPCM (Outside Plant Construction Management System) instead of TEO. |
| ROW | Right of Way |
| Description: | Municipal-owned property associated with public infrastructure. |
| RT | Remote Terminal |
| Description: | DLE location outside of a central office. |
| SCID | Sonet Circuit Identification |
| Description: | Unique identification given to SONET systems. |
| SONET | Synchronous Optical Network |
| Description: | A type of fiber optic network that requires the two endpoints to synchronize data transmission. |
| TEO | Telephone Equipment Order |
| Description: | Form used to order DLE from outside company. |
| TIRKS | Trunks Inventory Record Keeping System |
| Description: | The corporate repository of InterOffice digital equipment and digital circuits. |

12 Further Details with Respect to Methods, Systems and Computer Program Products for Planning Resources Based on Primary and Alternate Location Relief Strategies FMTs and systems for planning resources based on location relief strategies have been described above in accordance with some embodiments of the present invention. This section more generally describes the methods, systems and computer program products for planning resources based on primary and alternate location relief strategies according to some other embodiments of the present invention.

Figure 18:
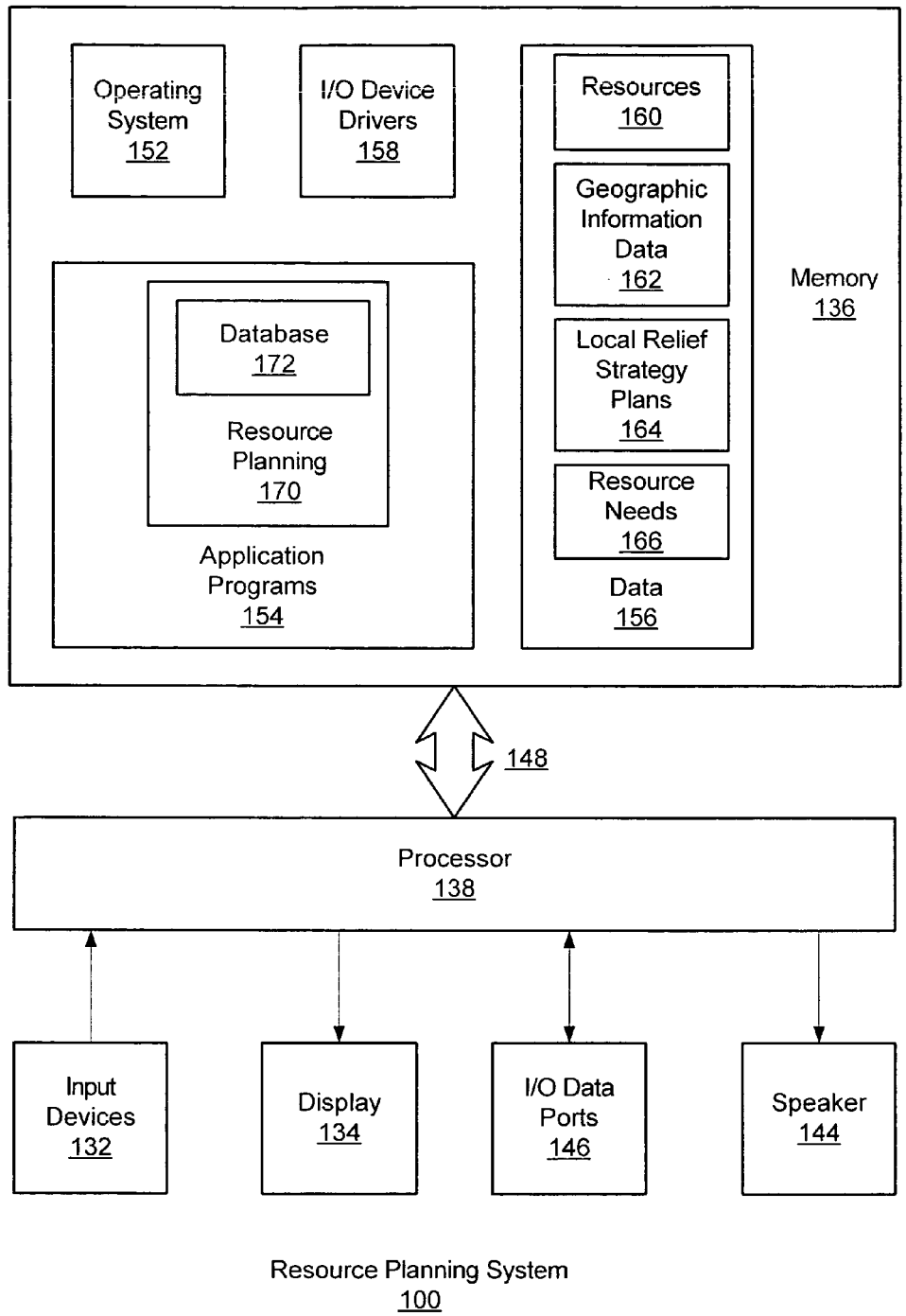
FIG. 18 is a block diagram of a resource planning system suitable for use in embodiments of the present invention.

FIG. 18 is a block diagram of a resource planning system 100 and associated methods and computer program products in accordance with some embodiments of the present invention. The data processing system 100 typically includes input device(s) 132 such as a keyboard or keypad, a display 134, and a memory 136 that communicate with a processor 138 via an address/data bus 148. The processor 138 can be any commercially available or custom microprocessor. The data processing system 100 may further include a speaker 144 and I/O data ports 146 that also communicate with the processor 138. The I/O data ports 146 can be used to transfer information between the data processing system 100 and another computer system and/or a network. These components may be conventional components, such as those used in many conventional data processing systems, which may be configured to operate as described herein.

The memory 136 is representative of the overall hierarchy of memory devices containing the software and data used to implement the functionality of the resource planning system 100. As shown in FIG. 18, the memory 136 may include several categories of software and data used in the resource planning system 100: an operating system 152; application programs 154; input/output (I/O) device drivers 158; and data 156. As will be appreciated by those of skill in the art, the operating system 152 may be any operating system suitable for use with a resource planning system, such as OS/2, AIX, System390 or Z/OS from International Business Machines Corporation, Armonk, N.Y., Windows95, Windows98, Windows2000 or WindowsXP from Microsoft Corporation, Redmond, Wash., Unix or Linux. The I/O device drivers 158 typically include software routines accessed through the operating system 152 by the application programs 154 to communicate with devices such as the I/O data port(s) 146 and certain memory 136 components. The application programs 154 are illustrative of the programs that implement the various features of the resource planning system 100 and preferably include at least one application which supports operations according to embodiments of the present invention. Finally, the data 156 represents the static and dynamic data used by the application programs 154, the operating system 152, the I/O device drivers 158, and other software programs that may reside in the memory 136.

As is further seen in FIG. 18, the data 156 can include data sets that define resources 160, geographic information 162, and location relief strategy plans 164, and that may also define resource needs data sets 166. The geographic information data 162 may define roads, buildings, and/or topographical information, such as was discussed above. The resource data 160 may define the location, type, number, performance, cost, availability and/or other characteristics of resources, such as was discussed above. The defined resources may include, but not be limited to, central offices and fiber optic and electrical communication lines. The resource data 160 may define where resources are presently located relative to the geographic information data.

The resource needs data sets 166 may define one or more resource capacity needs that are associated with geographic locations. For example, one of the resource needs data sets 166 may define a number of communication lines and/or communication bandwidth that is presently needed or projected to be needed at a defined geographic location. The term "location" as used herein can include a defined geographic point, such as a mail address or latitude and longitude coordinates, and can also include a geographic area. The LRS plan data sets 164 may define one or more LRS plans that are associated with each of the resource needs data sets 166. For example, one of the LRS plan data sets 164 may define a number of resources, such as resources for carrying telecommunications (e.g., fiber optic communication lines and/or electrical communication lines), gas lines, water lines, cable television lines, and/or electrical lines, that may be installed and/or retired at a geographic location on a defined date in an attempt to satisfy the resource needs defined by one of the resource needs data sets 166.

More than one of the LRS plan data sets 164 may be associated with one of the resource needs data sets 166. When more than one of the LRS plan data sets 164 are associated with one of the resource needs data sets 166, one of them may be defined as a primary LRS plan and the others may be defined as an alternate LRS plan. The primary LRS plan may correspond to what a Long Term Planner perceives as a preferred way of satisfying the associated resource need, while the alternate LRS plans may correspond to what are perceived as less preferred ways. Accordingly, a preferred LRS plan and one or more alternate LRS plans may be defined in the LRS plan data sets 164 and associated with each resource need defined in the resource needs data sets 166. Such association of preferred LRS plan and alternate LRS plans with a resource need may allow a Long Term Planner to define many different resource plans for meeting a resource need, and to designate a preferred resource plan while maintaining the other LRS plans for further use (e.g., documentation and/or analysis).

The application programs 154 can include a resource planning application 170, which may include a database 172. Although the database application 172 is illustrated as part of the resource planning application 170, for purposes of illustration only, in some other embodiments of the present invention the functionality of the database application 172 may be at least partially outside the resource planning application 172. The database application 172 may be any conventional database application that performs conventional data functions such as, for example, Oracle, Microsoft Access, or a custom database application. The resource planning application 170 can import data sets, including existing resource, geographic data, LRS plans, and/or resource needs, from the data portion 156 of the memory 136 into the database 172.

The resource planning application 170 can be one or more GIS tools that can allow a planner to define and associate resources with geographic features in digitized maps. The resource planning application 170 may allow a user to at least partially define and/or evaluate the resources 160, the geographic information 162, the resource needs 166, and/or the location relief strategy plan 164. For example, the resource planning application 170 may allow a user to associate one more LRS plans 164 with one of the resource needs 166, and to define which of the associated LRS plans 164 is a primary LRS plan and/or which are alternate LRS plans. When a plurality of the LRS plans are associated with a resource need, the LRS plans may be prioritized (e.g., ranked). A highest priority one of the LRS plans may then be defined as a primary LRS plan, and the other LRS plan(s) may be defined as alternate LRS plans. In some embodiments of the present invention, only one of the LRS plans 164 that are associated with one of the resource needs 166 can be defined as a primary LRS plan.

The resource planning application 170 also generates a resource plan based on the primary LRS plan and/or the alternate LRS plan. The generated resource plan may be generated by, for example, displaying on the display 134 the resources that presently exist in a defined geographical area, as defined by the resource data sets 160, and the primary LRS plan and/or alternate LRS plan. The displayed resources and plans may be overlaid on a map formed by a relevant potion of the geographical information data 162. A resource planner or other user may use the input devices 132 to select which of the LRS plans 164 are included in the resource plan. For example, a resource plan may be generated based on the primary LRS plans, or it may be generated based on selected ones of the primary LRS plans and/or alternate LRS plans. A user may also define access privileges for the LRS plans, such as public or private, which may be used by the resource planning application 170 to limit access of one or more of the LRS plans to users who satisfy the defined access privileges.

The resource planning application 170 may generate a resource plan that combines all or selected ones of the primary LRS plans and/or alternate LRS plans for more than one of the defined resource needs 166, and/or the resource planning application 170 may generate a different resource plan for each of the defined resource needs 166.

Figure 19:
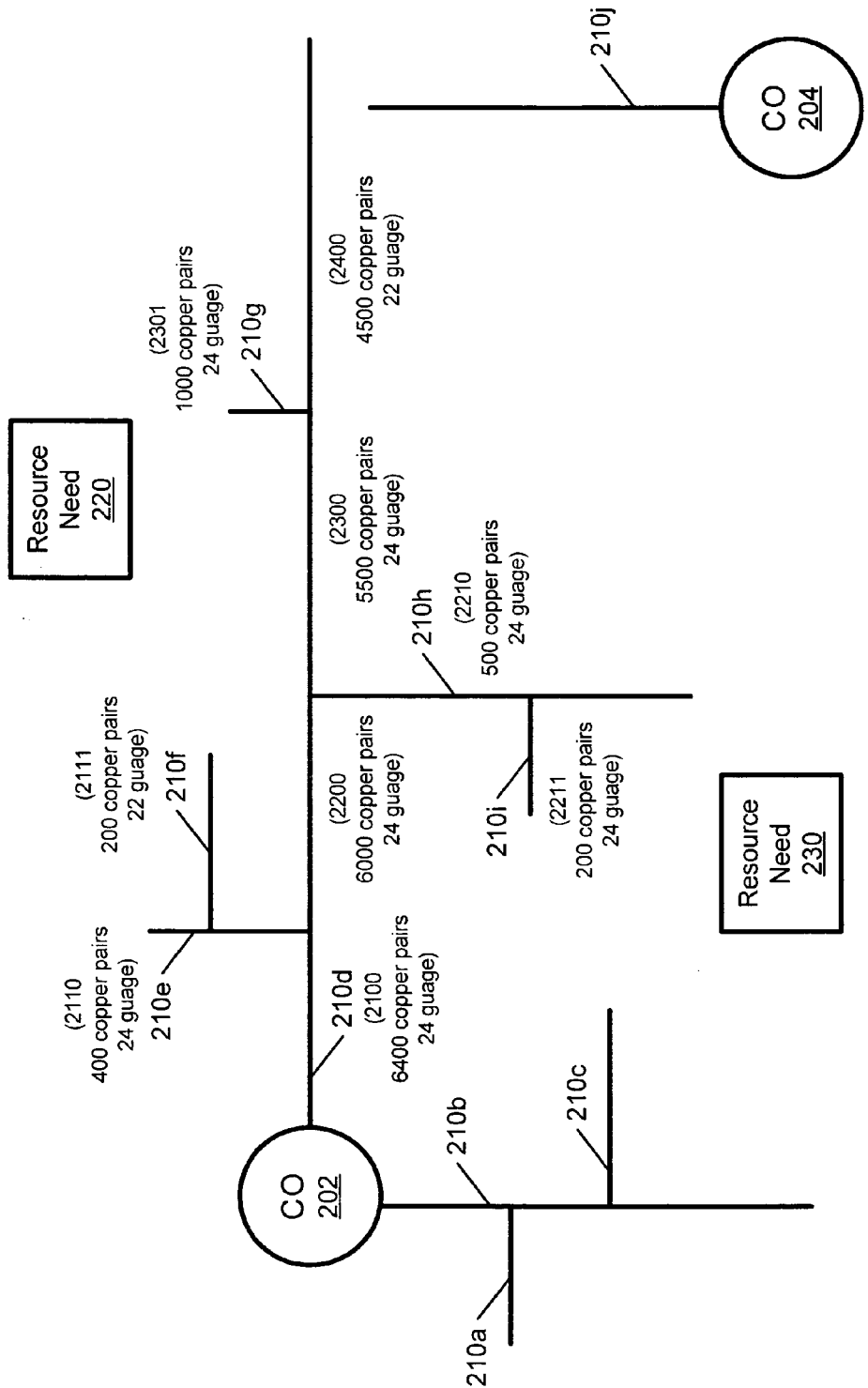
FIG. 19 depicts an exemplary display of existing resources and resource needs.

Reference is now made to FIG. 19, which illustrates existing resources and two resource needs 220 and 230 as they may be displayed by a resource planning system according to some embodiments of the present invention. The existing resources include two central offices (COs) 202 and 204 and electrical communication lines 210*a-j* that are communicatively connected to the central offices 202 and 204. Each of the electrical communication lines 210*a-j* include defined characteristics that include a reference number (i.e., 2XXX), a planned installation date (i.e., 2004 or 2005), the number of copper pairs in the line, the gauge (i.e., thickness) of the copper pairs, and the connections between, and relative locations, of the lines 210*a-j* and the central offices 202 and 204. Each of the resource needs 220 and 230 have been defined for a geographic position relative to the existing resources. A user, such as a resource planner, may then use the resource planning system to define and compare LRS plans that may satisfy the defined resource needs 220 and 230.

Figure 20:
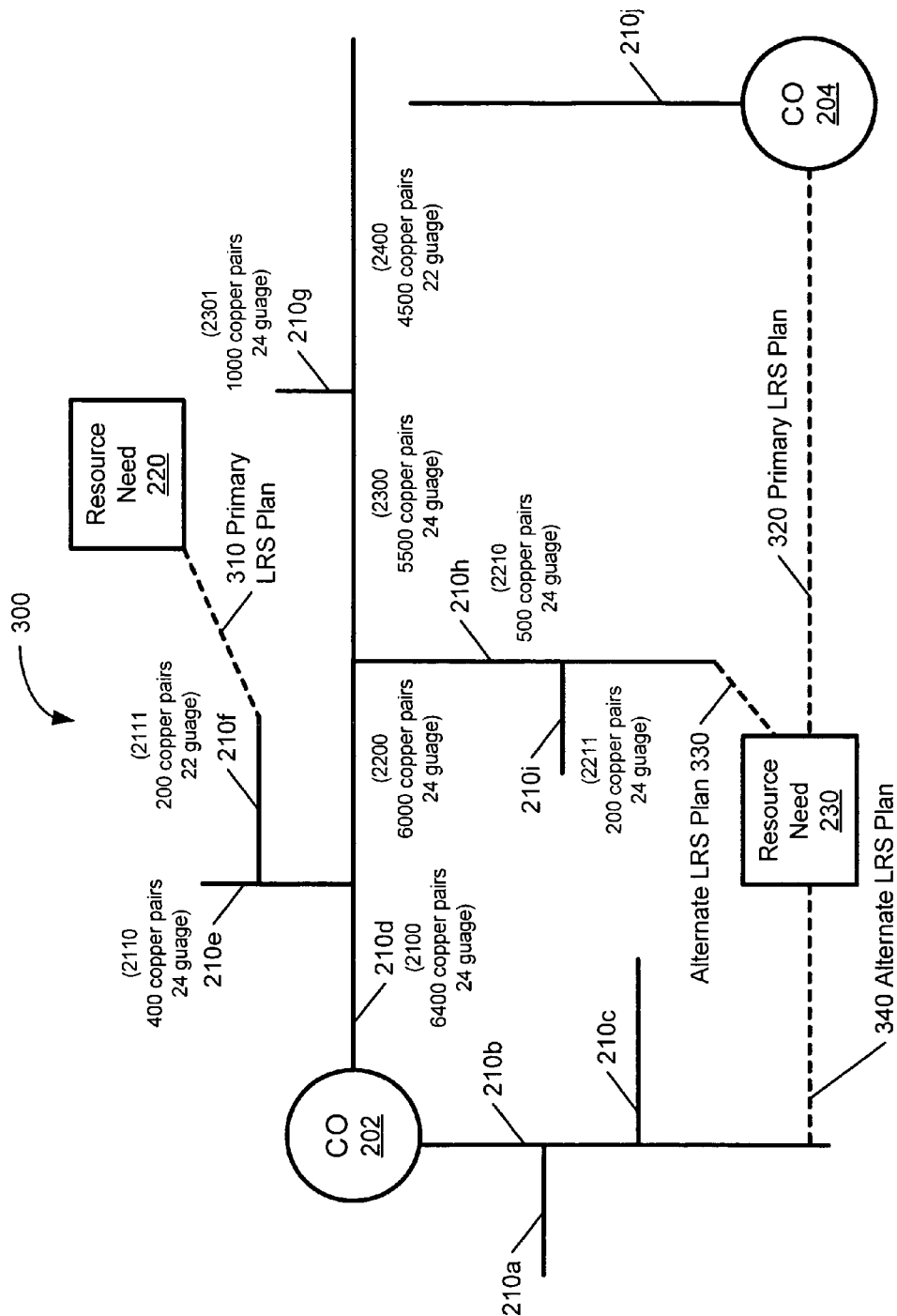
FIG. 20 depicts an exemplary resource plan that displays primary LRS plans and alternate LRS plans responsive to the resource needs shown in FIG. 2.

An example resource plan 300 is illustrated in FIG. 20 that combines the existing resources and defined primary and alternate LRS plans responsive to the resource needs 220 and 230. One primary LRS plan 310 has been defined and associated with the resource need 220. One primary LRS plan 320 and two alternate LRS plans 330 and 340, which are proposed alternative plans, have been defined and associated with the other resource need 230. The primary LRS plan 310 defines a planned connection from the communication line 210*f* to the resource need 220 in the year 2005. The primary LRS plan 320 defines a planned connection from the central office 204 to the resource need 230 in the year 2004. The alternative LRS plan 330 defines a connection from the communication line 210*h* to the resource need 230 in the year 2005, and the other alternative LRS plan 340 defines a connection from the communication line 210*b* to the resource need 230 in the year 2004.

Figure 21:
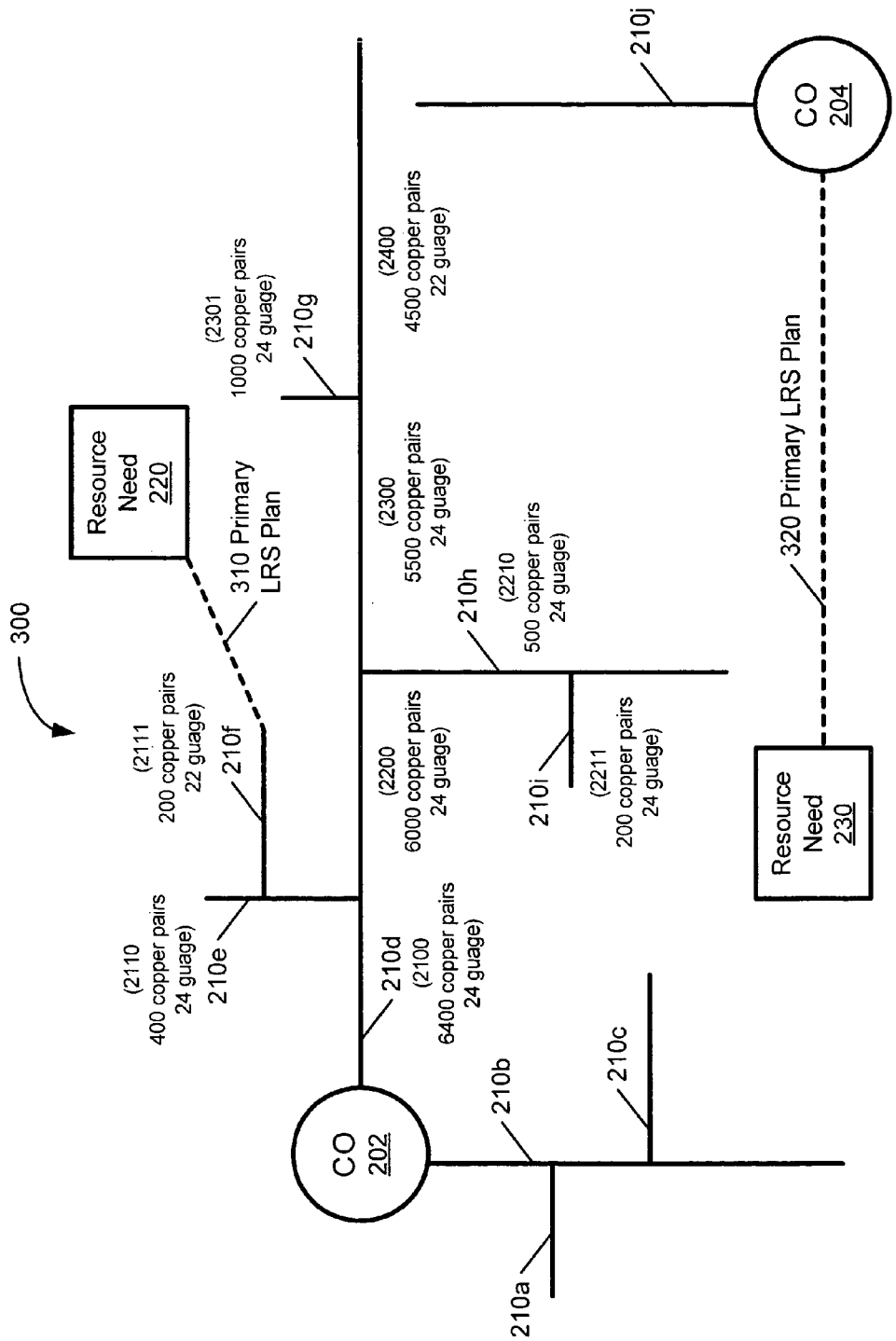
FIG. 21 depicts an exemplary resource plan that displays only primary LRS plans responsive to the resource needs shown in FIG. 2.

According to some embodiments of the present invention, a user may select which of the primary and/or alternate LRS plans are to be displayed with the existing resources. For example, with reference to FIG. 21, the resource plan 300 has been illustrated with the primary LRS plans 310 and 320 shown, and the alternative LRS plans 330 and 340 (FIG. 20) hidden. Accordingly, a user may view only the primary LRS plans and hide any alternate plans. A user may similarly filter what information in a resource plan is displayed based on attributes that are associated with the LRS plans, such as when LRS plans are expected to be completed, whether resources associated with LRS plans are direct buried (e.g., buried in the ground without a conduit), buried within a conduit, and/or suspended on a utility pole. A user may thereby selectively view what resources can be available by a particular date and/or based on other attributes that are associated with the resources. The resource plan(s) may be overlaid on geographic information, such as the geographic maps that are illustrated and described above.

A resource management system may alternatively, or additionally, generate reports on existing and/or planned resources relative to dates and/or needs. The resource management system may also summarize the individual and/or combined characteristics of the existing and/or planned resources, including location, type, number, performance, cost, availability and/or other characteristics of resources, such as those discussed above.

A user may thereby define and/or evaluate in the resource planning system one or more resource needs, and may then define and/or compare one or more LRS plans that may be used to address the resource needs. A user may also change the designation of a LRS plan, such as from primary to alternate or vice-versa. More than one LRS plan may be associated with a resource, and the LRS plans may be relatively defined as primary and alternate plans. By maintaining the alternative LRS plans associated with a resource need, in addition to the primary LRS plans, the resource planning system may document for later use why a particular LRS plan was selected.

Although the resource planning application 170, the database 172, and the components of the data 156 of memory 136 are illustrated in FIG. 18 as being part of a single resource planning system 100, as will be appreciated by those of skill in the art, the illustrated functionality and data may be distributed across one or more resource planning systems. For example, the functionality of the database 172 and the resource data 160 and geographic information data 162 may be provided on one or more resource planning systems that are separate from the resource planning system that provides the functionality of the resource planning application 170, the local relief strategy plan data 164, and/or resource needs data 166. It will also be appreciated that various applications could be incorporated into some other logical division of the resource planning system 100. Thus, the present invention should not be construed as limited to the configuration of FIG. 18, but is intended to encompass any arrangement, division of functions between resource planning systems and/or configuration capable of carrying out the operations described herein.

Figure 22:
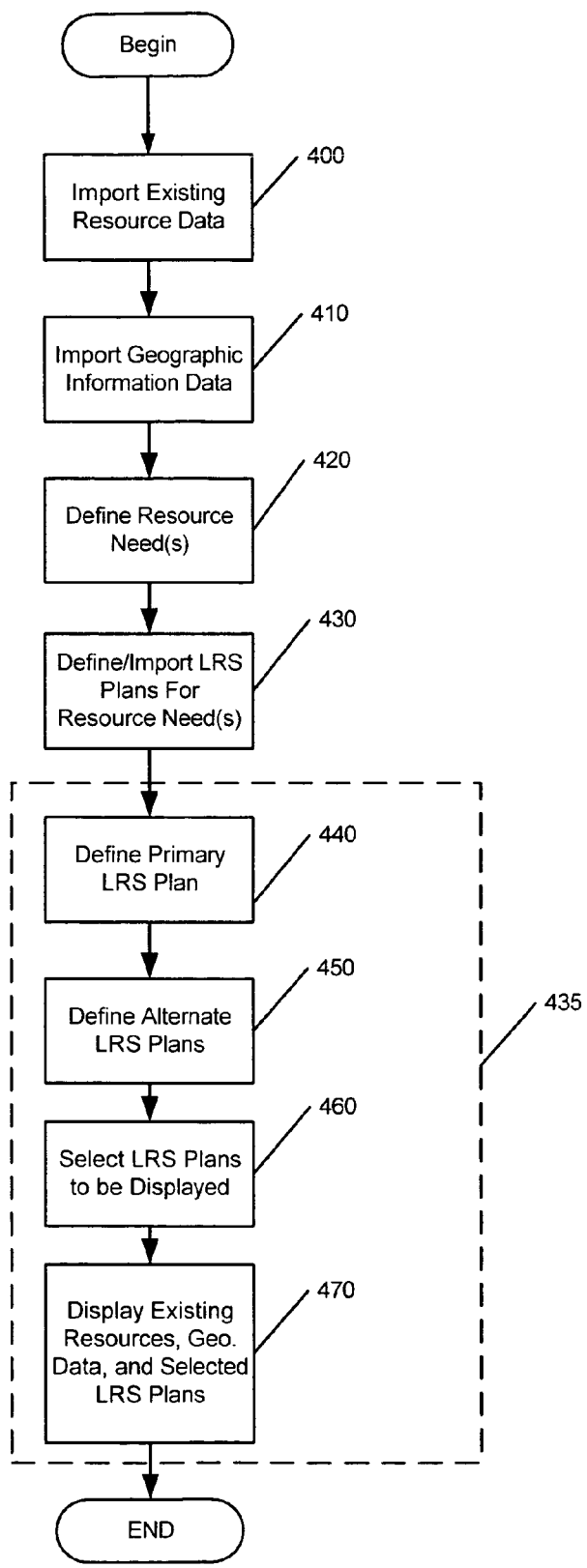
FIG. 22 is a flowchart illustrating operations for planning resources based one or more resource needs according to various embodiments of the present invention.

Reference is now made to FIG. 22 which illustrates a flowchart of operations that may be used to planning resource according to various embodiments of the present invention. At Block 400, existing resource that are associated with a defined geographic location are imported into the resource management application. At Block 410, geographic information that is associated with a defined geographic location is imported into the resource management application. At Block 420, resources needs are defined. At Block 430, LRS plans that are defined and associated with a resource need and/or are imported into the resource management application. At Block 440, one of the LRS plans is defined as a primary LRS plan, and, at Block 450, other ones of the LRS plans are defined as alternate LRS plans. As will be appreciated, the defined/imported LRS plans may be defined by a default alternate/primary designation so that a user may only need to change the default designation(s) for the defined/imported LRS plans so as distinguish the primary LRS plan from the alternate LRS plans. Accordingly, Block 440 or Block 450 may thereby be eliminated in some embodiments of the present invention. At Block 460, a user may select which LRS plans that are and/or are not to be displayed. At Block 470, the LRS plans may be displayed with the resource need(s), the existing resources and/or the geographic information to a user. The operations 440-470 can be referred to by the dashed Block 435 as exemplary operations for generating a resource plan according to various embodiments of the present invention.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A computer-based method of planning resources based on a resource need, the method comprising:
   performing operations as follows on a processor;
   importing into a resource planning application that executes on a resource planning system a plurality of location relief strategy plan data sets for installing and retiring apparatus resources in a defined geographic region, wherein one of the location relief strategy plan data sets is defined as a primary location relief strategy plan for installing and retiring apparatus resources in the defined geographic region and one other one of the location relief strategy plan data sets is defined as an alternate location relief strategy plan for installing and retiring apparatus resources in the defined geographic region, and the primary location relief strategy plan and the alternate location relief strategy plans are maintained in a memory of the resource planning system;
   generating within the resource planning application a resource plan based on the primary location relief strategy plan and the alternate location relief strategy plan;
   displaying on a display device a graphical representation of the primary location relief strategy plan overlaid on a geographic map of the defined region without displaying a graphical representation of the alternative location relief strategy plan in response to receiving a first user input and displaying on the display device a combination of a graphical representation of the primary location relief strategy plan and a graphical representation of the alternative location relief strategy plan overlaid on the geographic map of the defined region in response to receiving a different second user input; and initiating installation, retirement, and repair of one of the apparatus resources based on the resource plan;

wherein the apparatus resources comprise part of a network infrastructure that is to provide services for multiple entities; and wherein initiating repair of one of the apparatus resources comprises determining a location of damage to a fiber optic asset based on the resource plan and optical time-domain reflectormeter information.

2. The method of claim 1, further comprising:
prioritizing the location relief strategy plan data sets;
selecting the highest priority location relief strategy plan data set as the primary location relief strategy plan; and
designating the one other of the location relief strategy plan data sets as the alternate location relief strategy plan.

3. The method of claim 1, further comprising:
changing the location relief strategy plan data set that is defined as a primary location relief strategy plan to be defined as an alternate location relief strategy plan; and
changing one of the other location relief strategy plan data sets that is defined as an alternate location relief strategy plan to be defined as a primary location relief strategy plan.

4. The method of claim 1, wherein generating a resource plan based on the primary location relief strategy plan and the alternate location relief strategy plan comprises selectively displaying one of the primary location relief strategy plan or and the alternate location relief strategy plan based on an input selection from a user.

5. The method of claim 1, further comprising:
importing into the resource planning application a plurality of location relief strategy plan data sets that are associated with a plurality of resource needs, wherein only one of the location relief strategy plan data sets associated with each of the resource needs is defined as the primary location relief strategy plan; and
generating within the resource planning application a resource plan for each of the resource needs based on the associated primary location relief strategy plan and the associated alternate location relief strategy plan.

6. The method of claim 5, wherein a plurality of the location relief strategy plan data sets associated with one of the resource needs are defined as alternate location relief strategy plans.

7. The method of claim 5, wherein generating a resource plan for each of the resource needs comprises generating each of the resource plans based only on user selected ones of the associated location relief strategy plan data sets.

8. The method of claim 5, wherein generating a resource plan for each of the resource needs comprises generating each of the resource plans based only on the associated primary location relief strategy plans.

9. The method of claim 5, wherein generating a resource plan for each of the resource needs comprises generating each of the resource plans based on the associated primary location relief strategy plan and user selected ones of the associated alternate location relief strategy plans.

10. The method of claim 1, further comprising:
toggling back and forth between the displaying of the graphical representation of the primary location relief strategy plan and the displaying the combination of the graphical representation of the primary location relief strategy plan and the alternative location relief strategy plan responsive to alternating first and second user inputs.

11. The method of claim 1, further comprising:
displaying, on the display device as an overlay on the geographic map of the defined region, the graphical representation of the primary location relief strategy plan for installing and retiring apparatus resources for carrying telecommunications in the defined geographic region without displaying a graphical representation of the alternative location relief strategy plan in response to a first user input;

displaying, on the display device as an overlay on the geographic map of the defined region, a combination of a graphical representation of the primary location relief strategy plan for installing and the retiring apparatus resources in the defined geographic region and a graphical representation of the alternative location relief strategy plan for installing and retiring the apparatus resources for carrying telecommunications in the defined geographic region in response to a different second user input; and toggling back and forth between the displaying of the graphical representation of the primary location relief strategy plan and the displaying the combination of the graphical representation of the primary location relief strategy plan and the alternative location relief strategy plan responsive to alternating first and second user inputs.

12. The method of claim 11, further comprising:
displaying, on the display device as an overlay on the geographic map of the defined region, the graphical representation of the primary location relief strategy plan for installing and retiring a number of fiber optic communication lines and electrical communication lines in the defined geographic region without displaying a graphical representation of the alternative location relief strategy plan in response to a first user input;

displaying, on the display device as an overlay on the geographic map of the defined region, a combination of a graphical representation of the primary location relief strategy plan for installing and retiring the number of fiber optic communication lines and electrical communication lines in the defined geographic region and a graphical representation of the alternative location relief strategy plan for installing and retiring the apparatus resources for carrying telecommunications in the defined geographic region in response to a different second user input; and toggling back and forth between the displaying of the graphical representation of the primary location relief strategy plan and the displaying the combination of the graphical representation of the primary location relief strategy plan and the alternative location relief strategy plan responsive to alternating first and second user inputs.

13. The method of claim 1, further comprising:
displaying, on the display device as an overlay on the geographic map of the defined region, the graphical representation of the primary location relief strategy plan for installing and retiring a number of gas lines, electrical lines, and water lines in the defined geographic region without displaying a graphical representation of the alternative location relief strategy plan in response to a first user input;

displaying, on the display device as an overlay on the geographic map of the defined region, a combination of a graphical representation of the primary location relief strategy plan for installing the number of gas lines, electrical lines, and water lines in the defined geographic region and a graphical representation of the alternative location relief strategy plan for installing and retiring apparatus resources for carrying telecommunications in the defined geographic region in response to a different second user input; and toggling back and forth between the displaying of the graphical representation of the primary location relief strategy plan and the displaying the combination of the graphical representation of the primary location relief strategy plan and the alternative location relief strategy plan responsive to alternating first and second user inputs.

14. The method of claim 1, wherein the primary location relief strategy plan and the alternate location relief strategy plan each correspond to a plan for installing and retiring cable television lines at a geographic location.

15. A resource planning system comprising:
a computer processor; and
a non-transitory memory comprising computer readable program code that when executed by the computer processor causes the computer processor to perform operations comprising:
importing into a resource planning application that executes on the computer processor a plurality of location relief strategy plan data sets for installing and retiring apparatus resources in a defined geographic region, wherein one of the location relief strategy plan data sets is defined as a primary location relief strategy plan for installing and retiring apparatus resources in the defined geographic region and one other one of the location relief strategy plan data sets is defined as an alternate location relief strategy plan for installing and retiring apparatus resources in the defined geographic region, and the primary location relief strategy plan and the alternate location relief strategy plans are maintained in the memory;
generating within the resource planning application a resource plan based on the primary location relief strategy plan and the alternate location relief strategy plan;
displaying on a display device a graphical representation of the primary location relief strategy plan overlaid on a geographic map of the defined region without displaying a graphical representation of the alternative location relief strategy plan in response to receiving a first user input and displaying on the display device a combination of a graphical representation of the primary location relief strategy plan and a graphical representation of the alternative location relief strategy plan overlaid on the geographic map of the defined region in response to receiving a different second user input; and
initiating installation, retirement, and repair of one of the apparatus resources based on the resource plan;
wherein the apparatus resources comprise part of a network infrastructure that is to provide services for multiple entities; and
wherein initiating repair of one of the apparatus resources comprises determining a location of damage to a fiber optic asset based on the resource plan and optical time-domain reflector information.

16. The resource planning system of claim 15, wherein the operations further comprise:
importing into the resource planning application a plurality of location relief strategy plan data sets that are associated with a plurality of resource needs, wherein only one of the location relief strategy plan data sets associated with each of the resource needs is defined as a primary location relief strategy plan and a plurality of the location relief strategy plan data sets associated with some of the resource needs are defined as alternate location relief strategy plans; and
generating within the resource planning application a resource plan for each of the resource needs by displaying, via the display, the primary location relief strategy plan and the alternate location relief strategy plans based on a user selection signal.

17. The resource planning system of claim 16, wherein the operations further comprise:
generating through the resource planning application a resource plan for each of the resource needs by displaying the primary location relief strategy plan and selectively displaying the alternate location relief strategy plans based on the user selection signal.

18. A computer program product for planning resources based on a resource need, the computer program product comprising program code embodied in a non-transitory computer-readable storage medium that when executed by a computer processor causes the processor to perform operations comprising:
importing into a resource planning application that executes on the computer processor a plurality of location relief strategy plan data sets for installing and retiring apparatus resources in a defined geographic region, wherein one of the location relief strategy plan data sets is defined as a primary location relief strategy plan for installing and retiring apparatus resources in the defined geographic region and one other one of the location relief strategy plan data sets is defined as an alternate location relief strategy plan for installing and retiring apparatus resources in the defined geographic region, and the primary location relief strategy plan and the alternate location relief strategy plans are maintained in a memory of the resource planning system;
generating within the resource planning application a resource plan based on the primary location relief strategy plan and the alternate location relief strategy plan;
displaying on a display device a graphical representation of the primary location relief strategy plan overlaid on a geographic map of the defined region without displaying a graphical representation of the alternative location relief strategy plan in response to receiving a first user input and displaying on the display device a combination of a graphical representation of the primary location relief strategy plan and a graphical representation of the alternative location relief strategy plan overlaid on the geographic map of the defined region in response to receiving a different second user input; and
initiating installation, retirement, and repair of one of the apparatus resources based on the resource plan;
wherein the apparatus resources comprise part of a network infrastructure that is to provide services for multiple entities; and
wherein initiating repair of one of the apparatus resources comprises determining a location of damage to a fiber optic asset based on the resource plan and optical time-domain reflectometer information.

19. The computer program product according to claim 18, wherein a plurality of the location relief strategy plan data sets that are associated with the resource need are defined as alternate location relief strategy plans, and the operations further comprise:

displaying one of the location relief strategy plans among the primary location relief strategy plan and the plurality of alternate location relief strategy plans that are associated with the resource need based on a user selection.

\* \* \* \* \*

UNITED STATES PATENT AND TRADEMARK OFFICE
CERTIFICATE OF CORRECTION

PATENT NO. : 9,245,241 B2  Page 1 of 1
APPLICATION NO. : 10/885191
DATED : January 26, 2016
INVENTOR(S) : Mansfield et al.

It is certified that error appears in the above-identified patent and that said Letters Patent is hereby corrected as shown below:

In the Claims:
Column 107, Claim 4, Lines 34 - 35: Please correct "plan or and the"
to read -- plan and the --

Signed and Sealed this
Twenty-sixth Day of April, 2016

Michelle K. Lee
*Director of the United States Patent and Trademark Office*